US010306235B2

(12) United States Patent
Ikai et al.

(10) Patent No.: US 10,306,235 B2

(45) Date of Patent: May 28, 2019

(54) IMAGE DECODING APPARATUS, IMAGE CODING APPARATUS, AND PREDICTION-VECTOR DERIVING DEVICE

(71) Applicant: SHARP KABUSHIKI KAISHA, Sakai, Osaka (JP)

(72) Inventors: Tomohiro Ikai, Sakai (JP); Takeshi Tsukuba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 103 days.

(21) Appl. No.: 15/547,663

(22) PCT Filed: Jan. 28, 2016

(86) PCT No.: PCT/JP2016/052532

§ 371 (c)(1),
(2) Date: Jul. 31, 2017

(87) PCT Pub. No.: WO2016/125685

PCT Pub. Date: Aug. 11, 2016

(65) Prior Publication Data

US 2018/0041762 A1 Feb. 8, 2018

(30) Foreign Application Priority Data

Feb. 2, 2015 (JP) ................................ 2015-018412

(51) Int. Cl.
*H04N 19/30* (2014.01)
*H04N 19/31* (2014.01)
(Continued)

(52) U.S. Cl.
CPC ......... *H04N 19/159* (2014.11); *H04N 19/105* (2014.11); *H04N 19/172* (2014.11);
(Continued)

(58) Field of Classification Search
None
See application file for complete search history.

(56) References Cited

U.S. PATENT DOCUMENTS

2017/0078697 A1* 3/2017 Lee ...................... H04N 19/119
2017/0142442 A1* 5/2017 Tsukuba ............... H04N 19/597
(Continued)

OTHER PUBLICATIONS

Tech et al., "3D-HEVC Draft Text 6", Joint Collaborative Team on 3D Video Coding Extensions of ITU-T SG 16 WP 3 and ISO/IEC JTC 1 S/C 29/WG 11, JCT3V-J1001-v6, 10th Meeting: Strasbourg, FR, Dec. 6, 2014, 99 pages.

*Primary Examiner* — William C Vaughn, Jr.
*Assistant Examiner* — Lindsay J Uhl
(74) *Attorney, Agent, or Firm* — Birch, Stewart, Kolasch & Birch, LLP

(57) ABSTRACT

Motion-vector deriving processing using inter-view shift prediction according to the related art makes processing for determining a reference position complicated. In a sequence parameter set, it is not possible to independently set an ON/OFF flag of a texture extension tool and an ON/OFF flag of a depth extension tool. Additionally, even in a case in which only one of an intra SDC wedge segmentation flag IntraSdcWedgeFlag and an intra contour segmentation flag IntraContourFlag is 1, depth_intra_mode_flag for selecting one of the wedge segmentation mode and the contour segmentation mode is unnecessarily decoded.
A prediction-vector deriving device derives the coordinates of a reference block of an inter-view merge candidate IV from the sum of the top-left coordinates of a target block, half the size of the target block, and a disparity vector of the target block which is converted into the integer precision. In this case, the value of the sum is normalized to a multiple of 8 or a multiple of 16. The prediction-vector deriving device derives the coordinates of a reference block of an inter-view
(Continued)

shift merge candidate IVShift from the sum of the top-left coordinates of a target block, the size of the target block, a predetermined constant of 0 to 4, and a disparity vector of the target block which is converted into the integer precision. In this case, the value of the sum is normalized to a multiple of 8 or a multiple of 16. Then, from the motion vectors positioned at the derived coordinates of the reference blocks, the prediction-vector deriving device derives a motion vector of the inter-view merge candidate IV and a motion vector of the inter-view shift merge candidate IVShift.

5 Claims, 25 Drawing Sheets

(51) Int. Cl.

| | |
|---|---|
| ***H04N 19/33*** | (2014.01) |
| ***H04N 19/52*** | (2014.01) |
| ***H04N 19/59*** | (2014.01) |
| ***H04N 19/70*** | (2014.01) |
| ***H04N 19/105*** | (2014.01) |
| ***H04N 19/159*** | (2014.01) |
| ***H04N 19/172*** | (2014.01) |
| ***H04N 19/587*** | (2014.01) |
| ***H04N 19/597*** | (2014.01) |

(52) U.S. Cl.
CPC ............. *H04N 19/31* (2014.11); *H04N 19/33* (2014.11); *H04N 19/52* (2014.11); *H04N 19/587* (2014.11); *H04N 19/59* (2014.11); *H04N 19/597* (2014.11); *H04N 19/70* (2014.11); *H04N 19/30* (2014.11)

(56) References Cited

U.S. PATENT DOCUMENTS

| | | | | |
|---|---|---|---|---|
| 2017/0214939 | A1* | 7/2017 | Lee ...................... | H04N 19/593 |
| 2017/0251224 | A1* | 8/2017 | Lee ...................... | H04N 19/597 |

* cited by examiner

FIG. 15

| | K | -1 | | | | 0 | | | | 1 | | | | 2 | | | | 3 | | | | 4 | | | |
|---|---|---|---|---|---|---|---|---|---|---|---|---|---|---|---|---|---|---|---|---|---|---|---|---|---|
| nPbW | MVDisp[0] | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift |
| 4 | 0 | 2 | 3 | 0 | 0 | 2 | 4 | 0 | 0 | 2 | 5 | 0 | 0 | 2 | 6 | 0 | 0 | 2 | 7 | 0 | 0 | 2 | 8 | 0 | 8 |
| 4 | 1 | 2 | 3 | 0 | 0 | 2 | 4 | 0 | 0 | 2 | 5 | 0 | 0 | 2 | 6 | 0 | 0 | 2 | 7 | 0 | 0 | 2 | 8 | 0 | 8 |
| 4 | 2 | 3 | 4 | 0 | 0 | 3 | 5 | 0 | 0 | 3 | 6 | 0 | 0 | 3 | 7 | 0 | 0 | 3 | 8 | 0 | 8 | 3 | 9 | 0 | 8 |
| 4 | 3 | 3 | 4 | 0 | 0 | 3 | 5 | 0 | 0 | 3 | 6 | 0 | 0 | 3 | 7 | 0 | 0 | 3 | 8 | 0 | 8 | 3 | 9 | 0 | 8 |
| 4 | 4 | 3 | 4 | 0 | 0 | 3 | 5 | 0 | 0 | 3 | 6 | 0 | 0 | 3 | 7 | 0 | 0 | 3 | 8 | 0 | 8 | 3 | 9 | 0 | 8 |
| 4 | 5 | 3 | 4 | 0 | 0 | 3 | 5 | 0 | 0 | 3 | 6 | 0 | 0 | 3 | 7 | 0 | 0 | 3 | 8 | 0 | 8 | 3 | 9 | 0 | 8 |
| 4 | 6 | 4 | 5 | 0 | 0 | 4 | 6 | 0 | 0 | 4 | 7 | 0 | 0 | 4 | 8 | 0 | 8 | 4 | 9 | 0 | 8 | 4 | 10 | 0 | 8 |
| 4 | 7 | 4 | 5 | 0 | 0 | 4 | 6 | 0 | 0 | 4 | 7 | 0 | 0 | 4 | 8 | 0 | 8 | 4 | 9 | 0 | 8 | 4 | 10 | 0 | 8 |
| 4 | 8 | 4 | 5 | 0 | 0 | 4 | 6 | 0 | 0 | 4 | 7 | 0 | 0 | 4 | 8 | 0 | 8 | 4 | 9 | 0 | 8 | 4 | 10 | 0 | 8 |
| 4 | 9 | 4 | 5 | 0 | 0 | 4 | 6 | 0 | 0 | 4 | 7 | 0 | 0 | 4 | 8 | 0 | 8 | 4 | 9 | 0 | 8 | 4 | 10 | 0 | 8 |
| 4 | 10 | 5 | 6 | 0 | 0 | 5 | 7 | 0 | 0 | 5 | 8 | 0 | 8 | 5 | 9 | 0 | 8 | 5 | 10 | 0 | 8 | 5 | 11 | 0 | 8 |
| 4 | 11 | 5 | 6 | 0 | 0 | 5 | 7 | 0 | 0 | 5 | 8 | 0 | 8 | 5 | 9 | 0 | 8 | 5 | 10 | 0 | 8 | 5 | 11 | 0 | 8 |
| 4 | 12 | 5 | 6 | 0 | 0 | 5 | 7 | 0 | 0 | 5 | 8 | 0 | 8 | 5 | 9 | 0 | 8 | 5 | 10 | 0 | 8 | 5 | 11 | 0 | 8 |
| 4 | 13 | 5 | 6 | 0 | 0 | 5 | 7 | 0 | 0 | 5 | 8 | 0 | 8 | 5 | 9 | 0 | 8 | 5 | 10 | 0 | 8 | 5 | 11 | 0 | 8 |
| 4 | 14 | 6 | 7 | 0 | 0 | 6 | 8 | 0 | 8 | 6 | 9 | 0 | 8 | 6 | 10 | 0 | 8 | 6 | 11 | 0 | 8 | 6 | 12 | 0 | 8 |
| 4 | 15 | 6 | 7 | 0 | 0 | 6 | 8 | 0 | 8 | 6 | 9 | 0 | 8 | 6 | 10 | 0 | 8 | 6 | 11 | 0 | 8 | 6 | 12 | 0 | 8 |
| nPbW | MVDisp[0] | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift | xRefFullIV | xRefFullIVShift | xRefIV | xRefIVShift |
| 8 | 0 | 4 | 7 | 0 | 0 | 4 | 8 | 0 | 8 | 4 | 9 | 0 | 8 | 4 | 10 | 0 | 8 | 4 | 11 | 0 | 8 | 4 | 12 | 0 | 8 |
| 8 | 1 | 4 | 7 | 0 | 0 | 4 | 8 | 0 | 8 | 4 | 9 | 0 | 8 | 4 | 10 | 0 | 8 | 4 | 11 | 0 | 8 | 4 | 12 | 0 | 8 |
| 8 | 2 | 5 | 8 | 0 | 8 | 5 | 9 | 0 | 8 | 5 | 10 | 0 | 8 | 5 | 11 | 0 | 8 | 5 | 12 | 0 | 8 | 5 | 13 | 0 | 8 |
| 8 | 3 | 5 | 8 | 0 | 8 | 5 | 9 | 0 | 8 | 5 | 10 | 0 | 8 | 5 | 11 | 0 | 8 | 5 | 12 | 0 | 8 | 5 | 13 | 0 | 8 |
| 8 | 4 | 5 | 8 | 0 | 8 | 5 | 9 | 0 | 8 | 5 | 10 | 0 | 8 | 5 | 11 | 0 | 8 | 5 | 12 | 0 | 8 | 5 | 13 | 0 | 8 |
| 8 | 5 | 5 | 8 | 0 | 8 | 5 | 9 | 0 | 8 | 5 | 10 | 0 | 8 | 5 | 11 | 0 | 8 | 5 | 12 | 0 | 8 | 5 | 13 | 0 | 8 |
| 8 | 6 | 6 | 9 | 0 | 8 | 6 | 10 | 0 | 8 | 6 | 11 | 0 | 8 | 6 | 12 | 0 | 8 | 6 | 13 | 0 | 8 | 6 | 14 | 0 | 8 |
| 8 | 7 | 6 | 9 | 0 | 8 | 6 | 10 | 0 | 8 | 6 | 11 | 0 | 8 | 6 | 12 | 0 | 8 | 6 | 13 | 0 | 8 | 6 | 14 | 0 | 8 |
| 8 | 8 | 6 | 9 | 0 | 8 | 6 | 10 | 0 | 8 | 6 | 11 | 0 | 8 | 6 | 12 | 0 | 8 | 6 | 13 | 0 | 8 | 6 | 14 | 0 | 8 |
| 8 | 9 | 6 | 9 | 0 | 8 | 6 | 10 | 0 | 8 | 6 | 11 | 0 | 8 | 6 | 12 | 0 | 8 | 6 | 13 | 0 | 8 | 6 | 14 | 0 | 8 |
| 8 | 10 | 7 | 10 | 0 | 8 | 7 | 11 | 0 | 8 | 7 | 12 | 0 | 8 | 7 | 13 | 0 | 8 | 7 | 14 | 0 | 8 | 7 | 15 | 0 | 8 |
| 8 | 11 | 7 | 10 | 0 | 8 | 7 | 11 | 0 | 8 | 7 | 12 | 0 | 8 | 7 | 13 | 0 | 8 | 7 | 14 | 0 | 8 | 7 | 15 | 0 | 8 |
| 8 | 12 | 7 | 10 | 0 | 8 | 7 | 11 | 0 | 8 | 7 | 12 | 0 | 8 | 7 | 13 | 0 | 8 | 7 | 14 | 0 | 8 | 7 | 15 | 0 | 8 |
| 8 | 13 | 7 | 10 | 0 | 8 | 7 | 11 | 0 | 8 | 7 | 12 | 0 | 8 | 7 | 13 | 0 | 8 | 7 | 14 | 0 | 8 | 7 | 15 | 0 | 8 |
| 8 | 14 | 8 | 11 | 8 | 8 | 8 | 12 | 8 | 8 | 8 | 13 | 8 | 8 | 8 | 14 | 8 | 8 | 8 | 15 | 8 | 8 | 8 | 16 | 8 | 16 |
| 8 | 15 | 8 | 11 | 8 | 8 | 8 | 12 | 8 | 8 | 8 | 13 | 8 | 8 | 8 | 14 | 8 | 8 | 8 | 15 | 8 | 8 | 8 | 16 | 8 | 16 |

FIG. 16

| sps_3d_extension( ) { | **Descriptor** | |
|---|---|---|
| for( d = 0; d <= 1; d++ ) { | | |
| **3d_sps_param_present_flag[ d ]** | u(1) | ← SN0001 |
| if (3d_sps_param_present_flag[ d ]){ | | |
| **iv_mv_pred_flag[ d ]** | u(1) | SN0002 |
| **iv_mv_scaling_flag[ d ]** | u(1) | SN0002 |
| if( d = = 0 ) { | | |
| **log2_sub_pb_size_minus3[ d ]** | ue(v) | SN0003 |
| **iv_res_pred_flag[ d ]** | u(1) | SN0003 |
| **depth_refinement_flag[ d ]** | u(1) | SN0003 |
| **view_synthesis_pred_flag[ d ]** | u(1) | SN0003 |
| **depth_based_blk_part_flag[ d ]** | u(1) | SN0003 |
| } else { | | |
| **mpi_flag[ d ]** | u(1) | SN0004 |
| **log2_mpi_sub_pb_size_minus3[ d ]** | ue(v) | SN0004 |
| **intra_contour_flag[ d ]** | u(1) | SN0004 |
| **intra_sdc_wedge_flag[ d ]** | u(1) | SN0004 |
| **qt_pred_flag[ d ]** | u(1) | SN0004 |
| **inter_sdc_flag[ d ]** | u(1) | SN0004 |
| **intra_single_flag[ d ]** | u(1) | SN0004 |
| } | | |
| } | | |
| } | | |
| } | | |

| coding_unit( x0, y0, log2CbSize , ctDepth) { | Descriptor | |
|---|---|---|
| … | | |
| if( sdcEnableFlag ) | | SYN00 |
| **sdc_flag[ x0 ][ y0 ]** | ae(v) | |
| if( PredMode[ x0 ][ y0 ] = = MODE_INTRA ) { | | |
| if( PartMode = = PART_2Nx2N && pcm_enabled_flag && log2CbSize >= Log2MinIpcmCbSizeY && log2CbSize <= Log2MaxIpcmCbSizeY ) | | |
| … | | |
| pbOffset = ( PartMode = = PART_NxN ) ? ( nCbS / 2 ) : nCbS | | |
| log2PbSize = log2CbSize – ( ( PartMode = = PART_NxN ) ? 1 : 0 ) | | |
| for( j = 0; j < nCbS; j = j + pbOffset ) | | |
| for( i = 0; i < nCbS; i = i + pbOffset ) { | | |
| if( IntraSdcWedgeFlag \|\| IntraContourFlag ) | | SYN01 |
| intra_mode_ext(x0 + i, y0+j, log2PbSize) | | |
| if( dim_not_present_flag[x0 + i][y0 + j] ) | | |
| **prev_intra_luma_pred_flag[ x0 + i ][ y0 + j ]** | ae(v) | |
| } | | SYN02 |
| for( j = 0; j < nCbS; j = j + pbOffset ) | | |
| for( i = 0; i < nCbS; i = i + pbOffset ) | | |
| if( dim_not_present_flag[ x0 + i ][y0 + j ] ){ | | |
| if( prev_intra_luma_pred_flag[ x0 + i ][ y0 + j ] ) | | SYN03 |
| **mpm_idx[ x0 + i ][ y0 + j ]** | ae(v) | |
| else | | |
| **rem_intra_luma_pred_mode[ x0 + i ][ y0 + j ]** | ae(v) | SYN04 |
| } | | |
| … | | |
| } | | |
| } else { | | |
| cu_extension(x0, y0) | | |
| … | | |
| } | | |

(b)

| intra_mode_ext( x0 , y0 , log2PbSize ) { | Descriptor | |
|---|---|---|
| if ( logPbSize < 6 ) | | |
| **dim_not_present_flag[ x0 ][ y0 ]** | ae(v) | SYN01A |
| if ( !dim_not_present_flag[ x0 ][ y0 ] ) | | |
| **depth_intra_mode_flag[ x0 ][ y0 ]** | ae(v) | SYN01B |
| if( DepthIntraMode[ x0 ][ y0 ] = = INTRA_DEP_DMM_WFULL ) | | |
| **wedge_full_tab_idx[ x0 ][ y0 ]** | ae(v) | SYN01C |
| } | | |

FIG. 18

| intra_mode_ext( x0 , y0 , log2PbSize ) { | Descriptor | |
|---|---|---|
| if ( logPbSize < 6 ) | | |
| **dim_not_present_flag[ x0 ][ y0 ]** | ae(v) | SYN01A |
| if ( !dim_not_present_flag[ x0 ][ y0 ] && IntraSdcWedgeFlag && IntraContourFlag ) | | SYN01B+ |
| **depth_intra_mode_flag[ x0 ][ y0 ]** | ae(v) | |
| if( DepthIntraMode[ x0 ][ y0 ] = = INTRA_DEP_DMM_WFULL ) | | SYN01C |
| **wedge_full_tab_idx[ x0 ][ y0 ]** | ae(v) | |
| } | | |

FIG. 20

| Intra prediction mode (PredModeIntra) | Intra Prediction Method |
|---|---|
| 0 | INTRA_PLANAR |
| 1 | INTRA_DC |
| 2..34 | INTRA_ANGULAR (INTRA_ANGULAR2..INTRA_ANGULAR34) |
| 35 | INTRA_WEDGE |
| 36 | INTRA_CONTOUR |

FIG. 25

| sps_3d_extension( ) { | **Descriptor** |
|---|---|
| for( d = 0; d <= 1; d++ ) { | |
| **iv_mv_pred_flag**[ d ] | u(1) |
| **iv_mv_scaling_flag**[ d ] | u(1) |
| if( d = = 0 ) { | |
| **log2_sub_pb_size_minus3**[ d ] | ue(v) |
| **iv_res_pred_flag**[ d ] | u(1) |
| **depth_refinement_flag**[ d ] | u(1) |
| **view_synthesis_pred_flag**[ d ] | u(1) |
| **depth_based_blk_part_flag**[ d ] | u(1) |
| } else { | |
| **mpi_flag**[ d ] | u(1) |
| **log2_mpi_sub_pb_size_minus3**[ d ] | ue(v) |
| **intra_contour_flag**[ d ] | u(1) |
| **intra_sdc_wedge_flag**[ d ] | u(1) |
| **qt_pred_flag**[ d ] | u(1) |
| **inter_sdc_flag**[ d ] | u(1) |
| **intra_single_flag**[ d ] | u(1) |
| } | |
| } | |
| } | |

IMAGE DECODING APPARATUS, IMAGE CODING APPARATUS, AND PREDICTION-VECTOR DERIVING DEVICE

TECHNICAL FIELD

The present invention relates to an image decoding apparatus, an image coding apparatus, and a prediction-vector deriving device.

BACKGROUND ART

As multiple-viewpoint image coding technologies, a disparity predictive coding method and a decoding method associated with this coding method have been proposed. In the disparity predictive coding method, the amount of information is reduced by predicting a disparity between multiple viewpoint images when coding the multiple viewpoint images. A vector representing a disparity between viewpoint images is called a displacement vector. A displacement vector is a two-dimensional vector having an element in the horizontal direction (x component) and an element in the vertical direction (y component), and is calculated for each block, which is one of regions divided from one image. To obtain multiple viewpoint images, cameras disposed for individual viewpoints are usually utilized. In multiple-viewpoint coding, each viewpoint image is coded as an individual layer of multiple layers. A coding method for a video image constituted by multiple layers is generally called scalable coding or hierarchy coding. In scalable coding, high-efficiency coding is implemented by performing inter-layer prediction. A layer which is not subjected to inter-layer prediction but serves as a base is called a base layer, and the other layers are called enhancement layers. Scalable coding in which layers are constituted by viewpoint images is called view scalable coding. In scalable coding, a base layer is also called a base view, while an enhancement layer is also called a non-base view. In view scalable coding, scalable coding in which layers are constituted by texture layers (image layers) and depth layers (distance image layers) is called three-dimensional scalable coding.

Apart from view scalable coding, other examples of scalable coding are spatial scalable coding (processing a low-resolution picture as a base layer and a high-resolution picture as an enhancement layer) and SNR scalable coding (processing a low image-quality picture as a base layer and a high-resolution picture as an enhancement layer). In scalable coding, a base layer picture, for example, may be used as a reference picture when coding an enhancement layer picture.

In HEVC, a technique for reusing prediction information concerning processed blocks, which is called a merge mode, is known. In the merge mode, from a merge candidate list in which merge candidates are constructed as elements, an element specified by a merge index (merge_index) is selected as a prediction parameter, thereby deriving a prediction parameter of a prediction unit.

As a technology for using a motion vector of a different layer (different view) from a target layer for predicting a motion vector of the target layer, inter-layer motion prediction (inter-view motion prediction) is known. In inter-layer motion prediction, motion prediction is performed by referring to a motion vector of a picture having a viewpoint different from that of a target picture. NPL 1 discloses inter-view prediction (IV prediction) and inter-view shift prediction (IVShift prediction) for determining a reference position for inter-layer motion prediction. In inter-view prediction (IV prediction), reference is made to a motion vector at a position determined by adding a displacement equal to a disparity vector to the center position of a target layer. Inter-view shift prediction (IVShift prediction), reference is made to a motion vector at a position determined by adding a displacement equal to a disparity vector which has been adjusted by the size of a target block to the center position of a target layer.

NPL 1 also discloses the following technology. In a sequence parameter set (SPS), an ON/OFF flag of a texture extension tool for such as residual prediction, and an ON/OFF flag of a depth extension tool for such as wedgelet segmentation prediction and contour segmentation prediction are defined, and the ON/OFF flags are sequentially decoded and coded by using a loop variable.

CITATION LIST

Non Patent Literature

NPL 1: G. Tech, K. Wegner, Y. Chen, S. Yea, "3D-HEVC Draft Text 6", JCT3V-J1001 _v6, JCT-3V 10th Meeting: Strasbourg, FR, 18-24 Oct. 2014 (disclosed on Dec. 6, 2014)

SUMMARY OF INVENTION

Technical Problem

In prediction-vector deriving processing using inter-view shift prediction (IVShift) disclosed in NPL 1, a reference position in a reference picture is determined by using a disparity vector which has been adjusted by the size of a prediction unit. Thus, processing becomes complicated, unlike inter-view prediction (IV).

In the sequence parameter set described in NPL 1, it is not possible to independently set an ON/OFF flag of the texture extension tool and an ON/OFF flag of the depth extension tool.

In the technology disclosed in NPL 1, even in a case in which only one of the intra SDC wedge segmentation flag IntraSdcWedgeFlag and the intra contour segmentation flag IntraContourFlag is 1, depth_intra_mode_flag for selecting one of the wedge segmentation mode and the contour segmentation mode is decoded. Flags are thus unnecessarily decoded.

Solution to Problem

One aspect of the present invention is an image decoding apparatus including: a receiver that receives a sequence parameter set (SPS) and coded data, the sequence parameter set (SPS) at least including a first flag indicating whether an intra contour mode will be used and a second flag indicating whether an intra wedge mode will be used, the coded data at least including a third flag indicating whether one of the intra contour mode and the intra wedge mode will be used for a prediction unit; a decoder that decodes at least one of the first flag, the second flag, and the third flag; and a predicting section that performs prediction by using a fourth flag which specifies one of the intra contour mode and the intra wedge mode. If a value of the first flag is 1, and if a value of the second flag is 1, and if a value of the third flag indicates that one of the intra contour mode and the intra wedge mode will be used for a prediction unit, the decoder decodes the fourth flag from the coded data. If the fourth flag is not included in the coded data, the fourth flag is derived from logical operation between the first flag and the second flag.

One aspect of the present invention is an image decoding method including at least: a step of receiving a sequence parameter set (SPS) and coded data, the sequence parameter set (SPS) at least including a first flag indicating whether an intra contour mode will be used and a second flag indicating whether an intra wedge mode will be used, the coded data at least including a third flag indicating whether one of the intra contour mode and the intra wedge mode will be used for a prediction unit; a step of decoding at least one of the first flag, the second flag, and the third flag; and a step of performing prediction by using a fourth flag which specifies one of the intra contour mode and the intra wedge mode. If a value of the first flag is 1, and if a value of the second flag is 1, and if a value of the third flag indicates that one of the intra contour mode and the intra wedge mode will be used for a prediction unit, the step of decoding decodes the fourth flag from the coded data. If the fourth flag is not included in the coded data, the fourth flag is derived from logical operation between the first flag and the second flag.

One aspect of the present invention is an image coding apparatus including: a receiver that receives a sequence parameter set (SPS) and coded data, the sequence parameter set (SPS) at least including a first flag indicating whether an intra contour mode will be used and a second flag indicating whether an intra wedge mode will be used, the coded data at least including a third flag indicating whether one of the intra contour mode and the intra wedge mode will be used for a prediction unit; a decoder that decodes at least one of the first flag, the second flag, and the third flag; and a predicting section that performs prediction by using a fourth flag which specifies one of the intra contour mode and the intra wedge mode. If a value of the first flag is 1, and if a value of the second flag is 1, and if a value of the third flag indicates that one of the intra contour mode and the intra wedge mode will be used for a prediction unit, the decoder decodes the fourth flag from the coded data. If the fourth flag is not included in the coded data, the fourth flag is derived from logical operation between the first flag and the second flag.

Advantageous Effects of Invention

In motion-vector deriving processing using inter-view shift prediction (IVShift) according to the present invention, a reference position in a reference picture can be derived without changing a disparity vector. Processing can thus be simplified.

According to the present invention, it is possible to independently set an ON/OFF flag of a texture extension tool and an ON/OFF flag of a depth extension tool.

According to the present invention, in a case in which one of the intra SDC wedge segmentation flag IntraSdcWedgeFlag and the intra contour segmentation flag IntraContourFlag is 1, the corresponding one of the wedge segmentation mode and the contour segmentation mode can be derived without decoding depth_intra_mode_flag for selecting one of the wedge segmentation mode and the contour segmentation mode. Thus, flags are not unnecessarily decoded.

BRIEF DESCRIPTION OF DRAWINGS

FIG. 4(*a*) through FIG. 4(*h*) respectively illustrate partitions modes of 2N×2N, 2N×N, 2N×nU, 2N×nD, N×2N, nL×2N, nR×2N, and N×N.

FIG. 15 is a diagram for explaining the influence of a constant K on an inter-view shift merge candidate IVShift according to this embodiment.

FIG. 16 illustrates the syntax configuration of a sequence parameter set extension sps_3d_extension according to this embodiment.

FIG. 17 illustrates the syntax configuration of a prediction parameter and an intra extension prediction parameter according to this embodiment.

FIG. 18 illustrates the syntax configuration of a modified example of an intra extension prediction parameter intra_mode_ext( ) according to this embodiment.

FIG. 20 illustrates a prediction mode predModeIntra according to this embodiment.

FIG. 25 illustrates the syntax configuration of a parameter set according to a comparative example.

DESCRIPTION OF EMBODIMENTS

An embodiment of the present invention will be described below with reference to the drawings.

Figure 2:
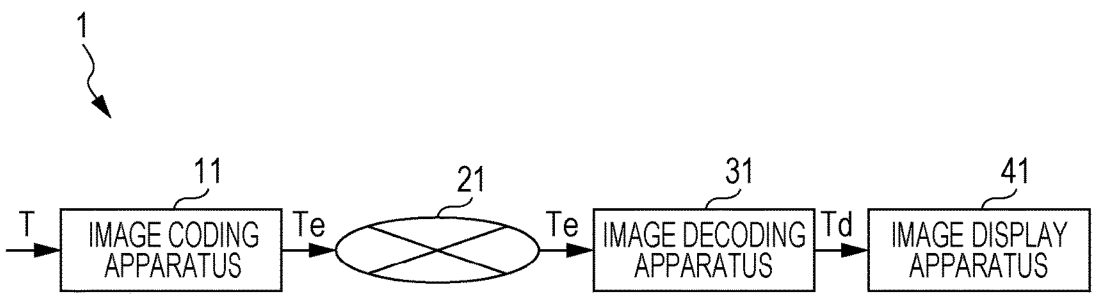
FIG. 2 is a schematic diagram illustrating the configuration of an image transmission system according to an embodiment of the present invention.

FIG. 2 is a schematic diagram illustrating the configuration of an image transmission system 1 according this embodiment.

The image transmission system 1 is a system which transmits codes generated as a result of coding multiple layer images and displays an image generated as a result of decoding the transmitted codes. The image transmission system 1 includes an image coding apparatus 11, a network 21, an image decoding apparatus 31, and an image display apparatus 41.

A signal T indicating multiple layer images (also called texture images) is input into the image coding apparatus 11. A layer image is an image which is viewed or captured with a certain resolution and at a certain viewpoint. In view scalable coding in which a three-dimensional image is coded by using multiple layer images, each of the layer images is called a viewpoint image. In this case, a viewpoint corresponds to a position or an observation point of a capturing device. For example, multiple viewpoint images are images captured by capturing devices disposed on the right and left sides of an object. The image coding apparatus 11 codes layer images indicated by this signal so as to generate a coded stream Te (coded data). Details of the coded stream Te will be discussed later. A viewpoint image is a two-dimensional image (planar image) observed at a certain viewpoint. The viewpoint image is represented by, for example, a luminance value or a color signal value of each of the pixels arranged on a two-dimensional plane. Hereinafter, one viewpoint image or a signal indicating this viewpoint image is called a picture. When spatial scalable coding is performed by using multiple layer images, these multiple layer images are constituted by a base layer image having a low resolution and an enhancement layer image having a high resolution. When SNR scalable coding is performed by using multiple layer images, these multiple layer images are constituted by a base layer image having a low image quality and an enhancement layer image having a high image quality. View scalable coding, spatial scalable coding, and SNR scalable coding may be combined in a desired manner to perform coding. In this embodiment, coding and decoding of multiple layer images including at least a base layer image and an image other than the base layer image (enhancement layer image) will be discussed. Among multiple layers, concerning two layers having a reference relationship (dependency relationship) in an image or a coding parameter, an image which is referred to by another image is called a first layer image, while an image which refers to the first layer image is called a second layer image. For example, if an enhancement layer image (other than a base layer) is coded by referring to the base layer, the base layer image serves as the first layer image, and the enhancement layer image serves as the second layer image. Examples of the enhancement layer image are a depth image and an image having a viewpoint other than a base view.

The depth image (also called a depth map and a "distance image") is a signal value (also called a "depth value" or "depth") indicating a distance of an object or a background contained in an object space from a viewpoint (such as a viewpoint of a capturing device). The depth image is an image signal indicating a signal value (pixel value) of each of the pixels arranged on a two-dimensional plane. The pixels forming a depth image are associated with pixels forming a viewpoint image. The depth map thus serves as a guide for representing an object space three-dimensionally by using viewpoint images, which serve as a base image signal, generated by projecting the object space on a two-dimensional plane.

The network 21 transmits the coded stream Te generated by the image coding apparatus 11 to the image decoding apparatus 31. The network 21 is the Internet, a WAN (Wide Area Network), a LAN (Local Area Network), or a combination thereof. The network 21 is not necessarily a duplex communication network, and may be a simplex or duplex communication network for transmitting broadcast waves of digital terrestrial broadcasting or satellite broadcasting, for example. The network 21 may be replaced by a storage medium, such as a DVD (Digital Versatile Disc) or a BD (Blue-ray Disc), on which the coded stream Te is recorded.

The image decoding apparatus 31 decodes each of the layer images forming the coded stream Te transmitted via the network 21 so as to generate multiple decoded layer images Td (decoded viewpoint images Td).

The image display apparatus 41 displays all or some of the multiple decoded layer images Td generated by the image decoding apparatus 31. In the case of view scalable coding, for example, if the image display apparatus 41 displays all the multiple decoded layer images Td, a three-dimensional image (stereoscopic image) or a free viewpoint image is displayed, and if the image display apparatus 41 displays some of the multiple decoded layer images Td, a two-dimensional image is displayed. The image display apparatus 41 includes a display device, such as a liquid crystal display or an organic EL (Electro-luminescence) display. In the case of spatial scalable coding and SNR scalable coding, if the image decoding apparatus 31 and the image display apparatus 41 have a high processing capability, the image display apparatus 41 displays an enhancement layer image having a high image quality, and if the image decoding apparatus 31 and the image display apparatus 41 have only a low processing capability, the image display apparatus 41 displays a base layer image, which does not require a high processing capability and a high display capability required for an enhancement layer.

<Structure of Coded Stream Te>

Prior to a detailed description of the image coding apparatus 11 and the image decoding apparatus 31 according to this embodiment, the data structure of the coded stream Te generated by the image coding apparatus 11 and decoded by the image decoding apparatus 31 will first be described.

Figure 3:
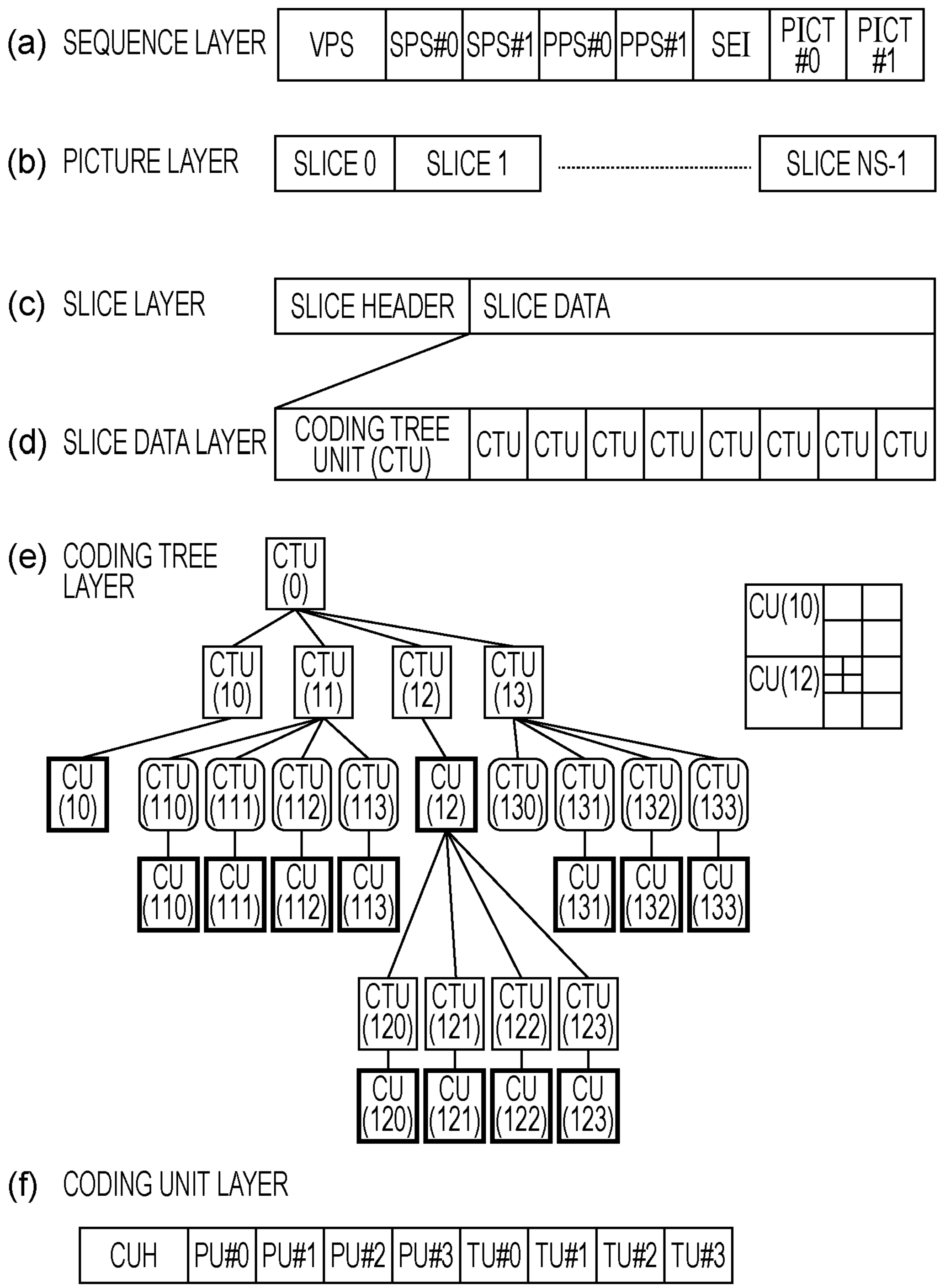
FIG. 3 illustrates the hierarchical structure of data of a coded stream according to this embodiment.

FIG. 3 illustrates the hierarchical structure of the data of the coded stream Te. The coded stream Te includes a sequence and multiple pictures forming the sequence by way of example. FIG. 3(*a*) illustrates a sequence layer which defines a sequence SEQ; FIG. 3(*b*) illustrates a picture layer which defines a picture PICT; FIG. 3(*c*) illustrates a slice layer which defines a slice S; FIG. 3(*d*) illustrates a slice data layer which defines slice data; FIG. 3(*e*) illustrates a coding tree layer which defines coding tree units included in the slice data; and FIG. 3(*f*) illustrates a coding unit layer which defines a coding unit (CU) included in the coding tree.

(Sequence Layer)

The sequence layer defines a set of data items to be referred to by the image decoding apparatus 31 for decoding a sequence SEQ to be processed (hereinafter will also be called a target sequence). As shown in FIG. 3(*a*), the sequence SEQ has a video parameter set, sequence parameter sets SPS, picture parameter sets PPS, pictures PICT, and supplemental enhancement information SEI. The value subsequent to # indicates the layer ID. FIG. 3 shows an example in which coded data items of #0 and #1, that is, layer 0 and layer 1, are included. However, the types and the number of layers are not restricted to this example.

In the case of a video image constituted by multiple layers, the video parameter set VPS defines a set of common coding parameters used for multiple video images and a set of coding parameters used for multiple layers forming a video image and the individual layers.

The sequence parameter set SPS defines a set of coding parameters to be referred to by the image decoding apparatus 31 for decoding a target sequence. The sequence parameter set SPS defines the width and the height of a picture, for example.

The picture parameter set PPS defines a set of coding parameters to be referred to by the image decoding apparatus 31 for decoding each of the pictures in the target sequence.

The picture parameter set PPS includes a base value (pic_init_qp_minus26) of a quantization step size used for decoding a picture and a flag (weighted_pred_flag) indicating whether weighted prediction will be applied. Multiple PPSs may be included. In this case, one of the multiple PPSs is selected from a picture in the target sequence.

(Picture Layer)

The picture layer defines a set of data items to be referred to by the image decoding apparatus 31 for decoding a picture PICT to be processed (hereinafter will also be called a target picture). As shown in FIG. 3(*b*), the picture PICT includes slices S0 through SNS−1 (NS indicates the total number of slices included in the picture PICT).

If it is not necessary to distinguish the slices S0 through SNS−1 from each other, the numbers appended to the reference signs may be omitted. Other items of data included in the coded stream Te having numbers appended to the reference signs, which will be discussed below, will also be treated in a similar manner.

(Slice Layer)

The slice layer defines a set of data items to be referred to by the image decoding apparatus 31 for decoding a slice S to be processed (hereinafter will also be called a target slice). As shown in FIG. 3(*c*), the slice S includes a slice header SH and slice data SDATA.

The slice header SH includes a set of coding parameters to be referred to by the image decoding apparatus 31 for determining a decoding method for a target slice. Slice type specifying information (slice_type) which specifies a slice type is one of coding parameters included in the slice header SH.

Examples of slice types that can be specified by the slice type specifying information are (1) I slices coded by using only intra prediction, (2) P slices coded by using uni-directional prediction or intra prediction, and (3) B slices coded by using uni-directional prediction, bi-directional prediction, or intra prediction.

The slice header SH may include a reference (pic_parameter_set_id) to a picture parameter set PPS included in the above-described sequence layer.

(Slice Data Layer)

The slice data layer defines a set of data items to be referred to by the image decoding apparatus 31 for decoding slice data SDATA to be processed. As shown in FIG. 3(*d*), the slice data SDATA includes coding tree blocks (CTBs). The CTB is a block of a fixed size (64×64, for example) forming a slice, and may be called a largest coding unit (LCU).

(Coding Tree Layer)

As shown in FIG. 3(*e*), the coding tree layer defines a set of data items to be referred to by the image decoding apparatus 31 for decoding a coding tree block to be processed. A coding tree unit is partitioned by using recursive quadtree partitioning. Nodes having a tree structure obtained by recursive quadtree partitioning are called a coding tree. Nodes in a quadtree are coding tree units, and a coding tree block itself is defined as the highest CTU. A CTU includes a split flag (split_flag), and if split_flag indicates 1, the CTU is split into four coding tree units CTU. If split_flag indicates 0, the coding tree unit CTU is split into four coding units. The coding unit CU is a leaf node included in the coding tree layer, and is not split any further in this layer. The coding unit CU is a basic unit for coding processing.

When the size of the coding tree block CTB is 64×64 pixels, the size of the coding unit CU is one of 64×64 pixels, 32×32 pixels, 16×16 pixels, and 8×8 pixels.

(Coding Unit Layer)

As shown in FIG. 3(*f*), the coding unit layer defines a set of data items to be referred to by the image decoding apparatus 31 for decoding a coding unit to be processed. More specifically, a coding unit is constituted by a CU header CUH, prediction units, a transform tree, and a CU header CUF. The CU header CUH defines whether the coding unit is a unit using intra prediction or a unit using inter prediction. The CU header CUH includes a residual prediction index iv_res_pred_weight_idx and an illumination compensation flag ic_flag. The residual prediction index iv_res_pred_weight_idx indicates a weight used for residual prediction (or whether residual prediction will be performed). The illumination compensation flag ic_flag indicates whether illumination compensation prediction will be performed. The coding unit serves as a root of a prediction unit (PU) and a transform tree (TT). The CU header CUF is included between the prediction unit and the transform tree or subsequent to the transform tree.

In terms of a prediction unit, the coding unit is split into one or multiple prediction blocks, and the position and the size of each prediction block are defined. In other words, a prediction block is a single region forming the coding unit, or multiple prediction blocks are regions forming the coding unit which do not overlap each other. The prediction unit includes one or multiple prediction blocks obtained by splitting the coding unit.

Prediction processing is performed for each prediction block. Hereinafter, a prediction block, which is a unit for prediction, will also be called a prediction unit. More precisely, prediction is performed for each color component unit. Hereinafter, a block for each color component, such as a luminance prediction block or a chrominance prediction block, will be called a prediction block, while blocks for multiple color components (luminance prediction blocks and chrominance prediction blocks) will collectively be called a prediction unit. A block for which an index indicating the type of color component cIdx (colour_component Idx) is 0 is a luminance block (luminance prediction block). The luminance block is usually indicated as L or Y. A block for which cIdx is 1 is a Cb chrominance block (chrominance prediction block). A block for which cIdx is 2 is a Cr chrominance block (chrominance prediction block).

Broadly speaking, there are two split types for a prediction unit, that is, one type for intra prediction and the other type for inter prediction. Intra prediction is prediction processing within the same picture, while inter prediction is prediction processing between different pictures (between different display times or between different layer images, for example).

In the case of intra prediction, examples of the partition mode are 2N×2N (the same size as that of a coding unit) and N×N.

In the case of inter prediction, the partition mode is coded by a partition mode part_mode for coded data.

Examples of the partition mode specified by the partition mode part_mode are the following eight patterns when the size of a target CU is 2N×2N pixels: four symmetric partition modes (symmetric splittings) of 2N×2N pixels, 2N×N pixels, N×2N pixels, and N×N pixels, and four asymmetric partition modes (AMP: asymmetric motion partitions) of 2N×nU pixels, 2N×nD pixels, nL×2N pixels, and nR×2N pixels. N denotes 2m (m is an integer of 1 or greater). Hereinafter, a prediction block partitioned in the asymmetric partition mode will also be called an AMP block. The partition function is one of 1, 2, and 4, and thus, the number of PUs included in a CU is one to four. These PUs will be sequentially represented by PU0, PU1, PU2, and PU3.

Figure 4:
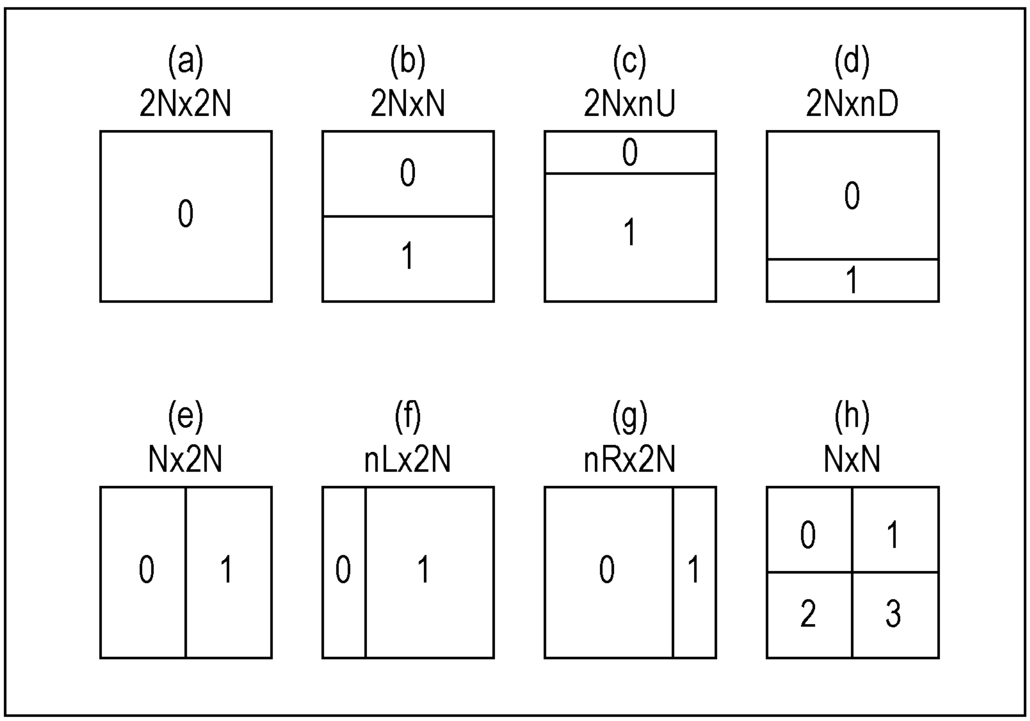
FIG. 4 illustrates partition mode patterns.

FIG. 4(*a*) through FIG. 4(*h*) specifically illustrate boundary positions of PUs in a CU in the individual partition modes.

FIG. 4(*a*) illustrates a 2N×2N partition mode in which a CU is not partitioned. FIG. 4(*b*) illustrates a partition pattern when the partition mode is a 2N×N mode. FIG. 4(*e*) illustrates a partition pattern when the partition mode is an N×2N mode. FIG. 4(*h*) illustrates a partition pattern when the partition mode is an N×N mode.

FIG. 4(*c*), FIG. 4(*d*), FIG. 4(*f*), and FIG. 4(*g*) illustrate partition patterns in the asymmetric partition modes (AMP). FIG. 4(*c*) illustrates a partition pattern when the partition mode is a 2N×nU mode. FIG. 4(*d*) illustrates a partition pattern when the partition mode is a 2N×nD mode. FIG. 4(*f*) illustrates a partition pattern when the partition mode is an nL×2N mode. FIG. 4(*g*) illustrates a partition pattern when the partition mode is an nR×2N mode.

In FIG. 4(*a*) through FIG. 4(*h*), the numbers indicated in the regions are ID numbers for the regions, and processing is performed on the regions in order of the ID numbers. That is, the ID numbers represent the scanning order for the regions.

Concerning prediction blocks used for inter prediction, among the above-described eight partition modes, seven partition modes other than the N×N mode (FIG. 4(*h*)) are defined.

The specific value of N is defined by the size of a CU to which a corresponding PU belongs. The specific values of nU, nD, nL, and nR are determined by the value of N. For example, a CU having 32×32 pixels can be split into inter prediction blocks of 32×32 pixels, 32×16 pixels, 16×32 pixels, 32×16 pixels, 32×8 pixels, 32×24 pixels, 8×32 pixels, and 24×32 pixels.

In terms of a transform tree, the coding unit is split into one or multiple transform blocks, and the position and the size of each transform block are defined. In other words, a transform block is a single region forming the coding unit, or multiple transform blocks are regions forming the coding unit which do not overlap each other. The transform tree includes one or multiple transform blocks obtained by splitting the coding unit.

Partitioning of a coding unit in a transform tree may be performed by assigning a region of the same size as that of the coding unit as a transform block or by performing recursive quadtree partitioning, as in partitioning of the above-described tree block.

Transform processing is performed on each transform block. The transform block, which is a unit of transform, will also be called a transform unit (TU).

TT information TTI is information concerning a TT included in a CU. In other words, the TT information TTI is a set of information items concerning one or multiple TUs included in a TT and is referred to by the video image decoding apparatus 1 when decoding residual data. Hereinafter, a TU will also be called a transform block.

The TT information TTI includes TT split information SP_TU, which specifies a partition pattern used for splitting a target CU into transform blocks, and items of TU information $TUI_1$ through $TUI_{NT}$ (NT is the total number of transform blocks included in the target CU).

More specifically, the TT split information SP_TU is information for determining the configuration and the size of each TU included in the target CU and the position of each TU within the target CU. For example, the TT split information SP_TU may be represented by information (split_transform unit_flag) indicating whether a target node will be split and information (trafoDepth) indicating the depth of the splitting of the target node.

TU split information SP_TU also includes information indicating whether each TU has a non-zero transform coefficient. For example, non-zero coefficient presence information (coded block flag (CBF)) for each TU is set. A CBF is set for each color space, that is, a CBF concerning the luminance luma is called cbf_luma, a CBF concerning the chrominance Cb is called cbf_cb, and a CBF concerning the chrominance Cr is called cbf_cr. The non-zero coefficient presence information (also be called rqt_root_flag or no_residual_data_flag) for multiple TUs is included in the TU split information SP_TU. An SDC flag sdc_flag is included in the TU split information SP_TU. The SDC flag sdc_flag indicates whether predicted-residual DC information (DC offset information) representing the average (DC) of the predicted residuals will be coded for one region or for every group of multiple regions in a TU, in other words, whether region-wise DC coding will be performed, instead of coding the non-zero transform coefficient for each TU. Region-wise DC coding is also called segment-wise DC coding (SDC). In particular, region-wise DC coding in intra prediction is called intra SDC, while region-wise DC coding in inter prediction is called inter SDC. If region-wise DC coding is applied, the CU size, PU size, and TU size may be equal to each other.

(Prediction Parameter)

A predicted image of a prediction unit is derived by using prediction parameters appended to the prediction unit. Prediction parameters include prediction parameters for intra prediction and prediction parameters for inter prediction. Prediction parameters for inter prediction (inter prediction parameters) will be discussed below. Inter prediction parameters are constituted by prediction use flags predFlagL0 and predFlagL1, reference picture indexes refIdxL0 and refIdxL1, and vectors mvL0 and mvL1. The prediction use flag predFlagL0 is a flag indicating whether a reference picture list called an L0 list will be used. The prediction use flag predFlagL1 is a flag indicating whether a reference picture list called an L1 list will be used. If the prediction use flag indicates 1, the corresponding reference picture list is used. In this specification, "a flag indicating whether XX will be established" means that XX is established if the flag indicates 1 and that XX is not established if the flag indicates 0. In logical NOT and logical AND, 1 means "true" and 0 means "false". This definition will also be applied to the following description in the specification. In actual devices and methods, however, other values may be used as a true value and a false value. Using of the two reference picture lists, that is, (predFlagL0, predFlagL1)=(1, 1), corresponds to bi-prediction. Using of one of the reference picture lists, that is, (predFlagL0, predFlagL1)=(1, 0) or (predFlagL0, predFlagL1)=(0, 1), corresponds to uni-prediction. Information concerning the prediction use flags may also be represented by an inter prediction identifier inter_pred_idc, which will be discussed later. Typically, prediction use flags are used in a predicted image generator and a prediction parameter memory, which will be discussed later. When decoding, from coded data, information indicating which reference picture list will be used, the inter prediction identifier inter_pred_idc is typically used.

Examples of syntax elements for deriving inter prediction parameters included in coded data are a partition mode part_mode, a merge flag merge_flag, a merge index merge_idx, an inter prediction identifier inter_pred_idc, a reference picture index refIdxLX, a prediction vector flag mvp_LX_flag, and a difference vector mvdLX. LX is a notation which is used when L0 prediction and L1 prediction are not distinguished from each other. Replacing of LX by L0 or L1 makes it possible to distinguish a parameter for the L0 list and a parameter for the L1 list from each other. This definition will also be applied to the following description in the specification. For example, refIdxL0 is a reference picture index used for L0 prediction, refIdxL1 is a reference picture index used for L1 prediction, and refIdx (refIdxLX) is a notation to be used when refIdxL0 and refIdxL1 are not distinguished from each other.

(Example of Reference Picture List)

Figure 5:
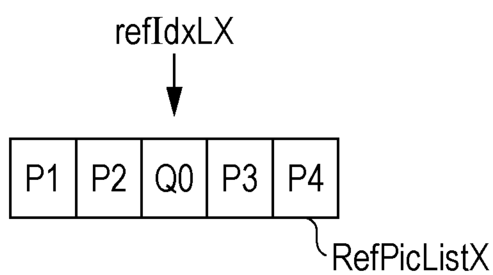
FIG. 5 is a conceptual diagram illustrating an example of a reference picture list.

An example of a reference picture list will now be discussed below. The reference picture list is a list of reference pictures stored in a reference picture memory 306. FIG. 5 is a conceptual diagram illustrating an example of a reference picture list RefPicListX. In the reference picture list RefPicListX, horizontally aligned five rectangles indicate reference pictures. Reference signs indicated sequentially from the left to the right, P1, P2, Q0, P3, and P4, represent reference pictures. P in P1, for example, indicates a viewpoint P, while Q in Q0 indicates a viewpoint Q different from the viewpoint P. The numbers appended to P and Q represent the picture order count (POC). The down arrow right under refIdxLX indicates that the reference picture index refIdxLX is an index referring to the reference picture Q0 in the reference picture memory 306.

(Examples of Reference Picture)

Figure 6:
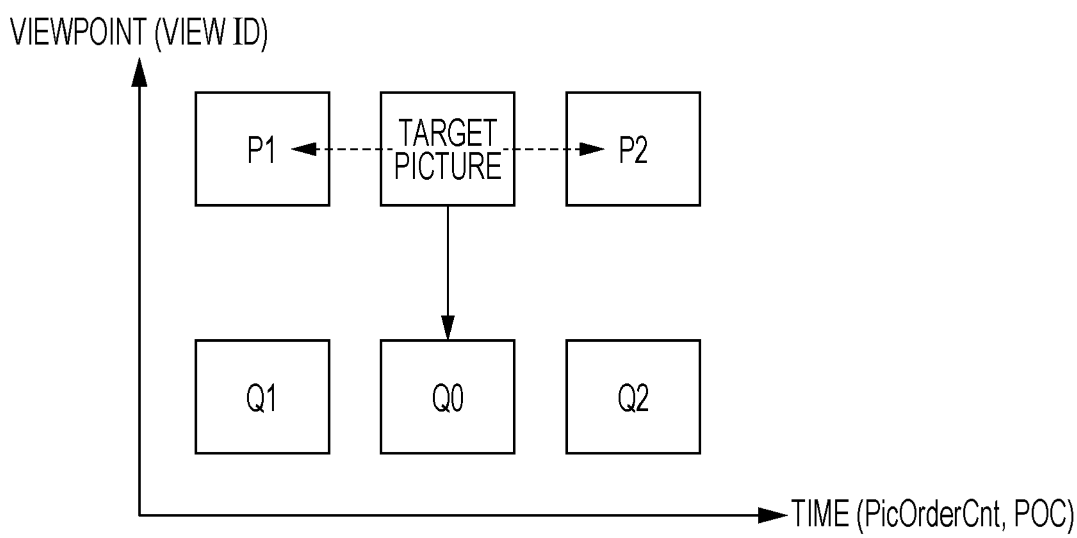
FIG. 6 is a conceptual diagram illustrating examples of reference pictures.

Examples of reference pictures used for deriving a vector will now be discussed below. FIG. 6 is a conceptual diagram illustrating examples of reference pictures. In FIG. 6, the horizontal axis indicates the display time, while the vertical axis indicates the viewpoint. The rectangles in two columns and three rows (a total of six rectangles) shown in FIG. 6 are pictures. Among the six rectangles, the second rectangle from the left in the bottom row is a picture to be decoded (target picture), and the remaining five rectangles are reference pictures. The reference picture Q0 indicated by the up arrow from the target picture is a picture having the same display time as that of the target picture and having a viewpoint (view ID) different from that of the target picture. In displacement prediction using the target picture as a base picture, the reference picture Q0 is used. The reference picture P1 indicated by the left arrow from the target picture is a past picture having the same viewpoint as that of the target picture. The reference picture P2 indicated by the right arrow from the target picture is a future picture having the same viewpoint as that of the target picture. In motion prediction using the target picture as a base picture, the reference picture P1 or P2 is used.

(Inter Prediction Identifier and Prediction Use Flag)

The inter prediction identifier inter_pred_idc and each of the prediction use flags predFlagL0 and predFlagL1 are mutually transformable by using the following equations:

$$inter\_pred\_idc=(predFlagL1<<1)+predFlagL0$$

$$preFlagL0=inter\_pred\_idc\ \&\ 1$$

$$preFlagL1=inter\_pred\_idc>>1$$

where >> denotes right shift and <<denotes left shift. As an inter prediction parameter, the prediction use flags predFlagL0 and predFlagL1 may be used, or the inter prediction identifier inter_pred_idc may be used. In the following description in the specification, when making determination using the prediction use flags predFlagL0 and predFlagL1, the inter prediction identifier inter_pred_idc may be used instead of the prediction use flags predFlagL0 and predFlagL1. Conversely, when making a determination using the inter prediction identifier inter_pred_idc, the prediction use flags predFlagL0 and predFlagL1 may be used instead of the inter prediction identifier inter_pred_idc.

(Merge Mode and AMVP Prediction)

Decoding (coding) methods for prediction parameters include a merge mode and an AMVP (Adaptive Motion Vector Prediction) mode. The merge_flag merge_flag is a flag for distinguishing the merge mode from the AMVP mode. In both of the merge mode and the AMVP mode, a prediction parameter of a target PU is derived by using prediction parameters of processed blocks. The merge mode is a mode in which a derived prediction parameter is directly used without including the prediction use flag predFlagLX (inter prediction identifier inter_pred_idc), the reference picture index refIdxLX, and the vector mvLX in coded data. The AMVP mode is a mode in which the inter prediction identifier inter_pred_idc, the reference picture index refIdxLX, and the vector mvLX are included in coded data. The vector mvLX is coded as the prediction vector flag mvp_LX_flag indicating a prediction vector and the difference vector (mvdLX).

The inter prediction identifier inter_pred_idc is data indicating the types and the number of reference pictures, and takes one of the values of Pred_L0, Pred_L1, Pred_BI. Pred_L0 indicates that a reference picture stored in a reference picture list called the L0 list will be used. Pred_L1 indicates that a reference picture stored in a reference picture list called the L1 list will be used. Pred_L0 and Pred_L1 both indicate that one reference picture will be used (uni-prediction). Prediction using the L0 list will be called L0 prediction. Prediction using the L1 list will be called L1 prediction. Pred_BI indicates that two reference pictures will be used (bi-prediction), that is, two reference pictures stored in the L0 list and in the L1 list will be used. The prediction vector flag mvp_LX_flag is an index indicating a prediction vector. The reference picture index refIdxLX is an index indicating a reference picture stored in a reference picture list. The merge index merge_idx is an index indicating which prediction parameter will be used as the prediction parameter of a prediction unit (target block) among prediction parameter candidates (merge candidates) derived from processed blocks.

(Motion Vector and Displacement Vector)

Vectors mvLX include motion vectors and displacement vectors (disparity vectors). A motion vector is a vector indicating a positional difference between the position of a block in a picture of a certain layer at a certain display time and the position of the corresponding block in the picture of the same layer at a different display time (adjacent, discrete time, for example). A displacement vector is a vector indicating a positional difference between the position of a block in a picture of a certain layer at a certain display time and the position of a corresponding block in a picture of a different layer at the same display time. Examples of a picture of a different layer are a picture having a different viewpoint and a picture having a different resolution level. A displacement vector indicating a disparity between pictures having different viewpoints is called a disparity vector. Hereinafter, if a motion vector and a displacement vector are not distinguished from each other, a vector will simply be called a vector mvLX. A prediction vector and a difference vector concerning a vector mvLX are called a prediction vector mvpLX and a difference vector mvdLX, respectively. A determination whether a vector mvLX and a difference vector mvdLX are motion vectors or displacement vectors may be made by using a reference picture index refIdxLX appended to a vector.

(Configuration of Image Decoding Apparatus)

Figure 7:
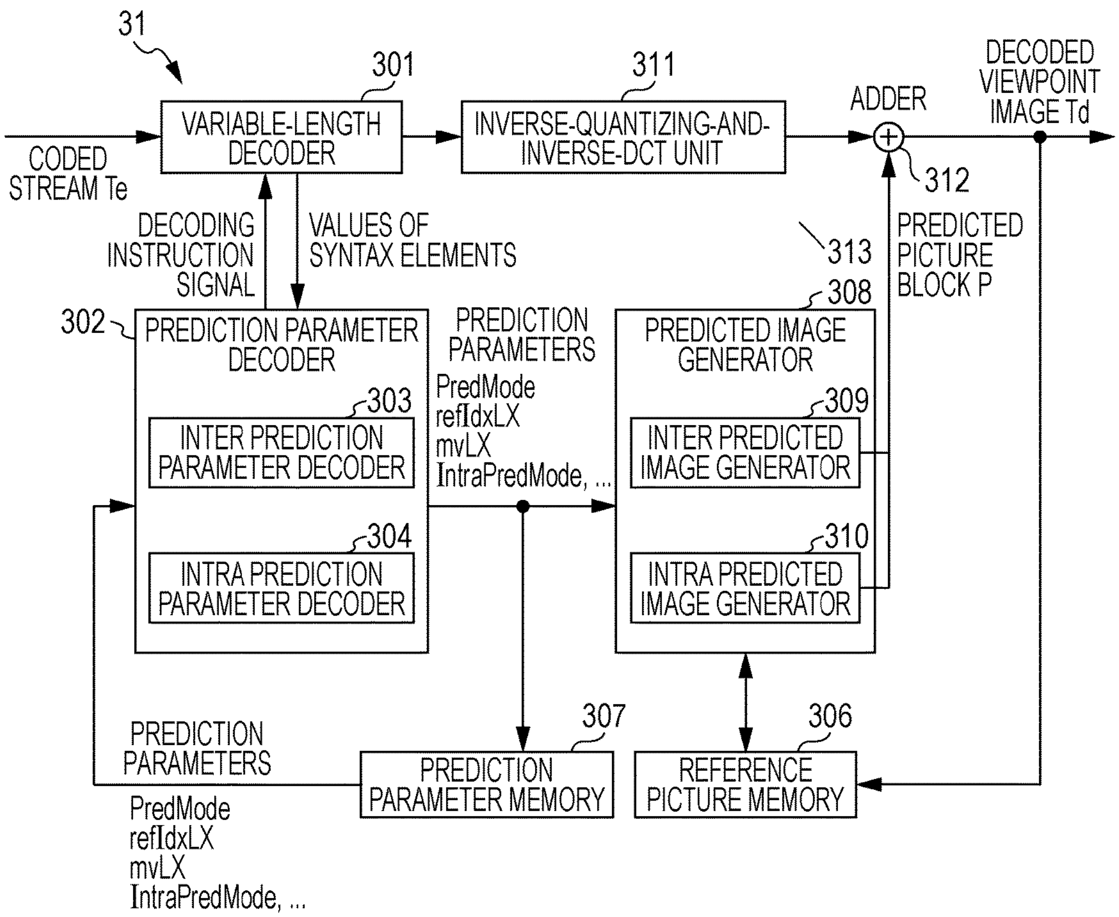
FIG. 7 is a schematic diagram illustrating the configuration of an image decoding apparatus 31 according to this embodiment.

The configuration of the image decoding apparatus 31 according to this embodiment will now be described below. FIG. 7 is a schematic diagram illustrating the configuration of the image decoding apparatus 31 according to this embodiment. The image decoding apparatus 31 includes a variable-length decoder 301, a prediction parameter decoder 302, a reference picture memory (a reference image storage unit and a frame memory) 306, a prediction parameter memory (a prediction parameter storage unit and a frame memory) 307, a predicted image generator 308, an inverse-quantizing-and-inverse-DCT unit 311, an adder 312, and a depth DV deriving unit 351, which is not shown.

The prediction parameter decoder 302 includes an inter prediction parameter decoder 303 and an intra prediction parameter decoder 304. The predicted image generator 308 includes an inter predicted image generator 309 and an intra predicted image generator 310.

The variable-length decoder 301 performs entropy decoding on a coded stream Te input from an external source so as to demultiplex and decode individual codes (syntax elements). Examples of the demultiplexed codes are prediction information for generating a predicted image and residual information for generating a difference image.

FIG. 16 illustrates the syntax configuration of a sequence parameter set extension sps_3d_extension. The sequence parameter set extension sps_3d_extension is part of a sequence parameter set. If an extension flag sps_3d_extension_flag of the default sequence parameter set indicates 1, the sequence parameter set extension sps_3d_extension is included in the sequence parameter set.

The variable-length decoder 301 decodes parameters including tool ON/OFF flags from the sequence parameter set extension sps_3d_extension. More specifically, the variable-length decoder 301 decodes a present flag 3d_sps_param_present_flag[d] indicated by SN0001 in the drawing for a loop variable d having a value of 0 to 1. The variable-length decoder 301 decodes corresponding syntax elements for a loop variable d (d=0 or d=1) for which the present flag 3d_sps_param_present_flag[d] is 1. That is, if the present_flag 3d_sps_param_present_flag[0] having d=0, which indicates that a target picture is a texture picture, is 1, the variable-length decoder 301 decodes texture-depth common parameters indicated by SN0002 in the drawing and texture parameters indicated by SN0003 in the drawing.

In this embodiment, the texture-depth common parameters are an inter-view prediction flag iv_my_pred_flag[d] and an inter-view scaling flag iv_my_scaling_flag[d]. The texture parameters are a sub-block size log 2_sub_pb_size_minus3[d], a residual prediction flag iv_res_pred_flag[d], a depth refinement flag depth_refinement_flag[d], a viewpoint synthesis prediction flag view_synthesis_pred_flag[d], and a depth-based block partition flag depth_based_blk_part_flag[d]. If the present flag 3d_sps_param_present_flag[1] having d=1, which indicates that a target picture is a depth picture, is 1, the variable-length decoder 301 decodes the texture-depth common parameters indicated by SN0002 in the drawing and depth parameters indicated by SN0004 in the drawing. As discussed above, the texture-depth common parameters are the inter-view prediction flag iv_mvypred_flag[d] and the inter-view scaling flag iv_my_scaling_flag[d]. The depth parameters are a motion parameter inheritance flag mpi_flag[d], a motion parameter inheritance sub-block size log 2 mpi_sub_pb_size_minus3[d], an intra contour segmentation flag intra_contour_flag[d], an intra SDC wedge segmentation flag intra_sdc_wedge_flag[d], a quadtree partition prediction flag qt_pred_flag[d], an inter SDC flag inter_sdc_flag[d], and an intra single mode flag intra_single_flag[d].

With the above-described configuration, if the texture present_flag 3d_sps_param_present_flag[0] is 1 and if the depth present_flag 3d_sps_param_present_flag[1] is 0, the variable-length decoder 301 only decodes parameters used for texture pictures, that is, the texture-depth common parameters and texture parameters (sub-block size log 2_sub_pb_size_minus3[d], residual prediction flag iv_res_pred_flag[d], depth refinement flag depth_refinement_flag[d], viewpoint synthesis prediction flag view_synthesis_pred_flag[d], and depth-based block partition flag depth_based_blk_part_flag[d]). If the texture present_flag 3d_sps_param_present_flag[0] is 0 and if the depth present_flag 3d_sps_param_present_flag[1] is 1, the variable-length decoder 301 only decodes parameters used for depth pictures, that is, the texture-depth common parameters and depth parameters (motion parameter inheritance flag mpi_flag[d], motion parameter inheritance sub-block size log 2 mpi_sub_pb_size_minus3[d], intra contour segmentation flag intra_contour_flag[d], intra SDC wedge segmentation flag intra_sdc_wedge_flag[d], quadtree partition prediction flag qt_pred_flag[d], inter SDC flag inter_sdc_flag[d], and intra single mode flag intra_single_flag[d]). If the texture present_flag 3d_sps_param_present_flag[0] is 1 and if the depth present flag 3d_sps_param_present_flag[1] is 1, the variable-length decoder 301 decode both of the texture parameters and the depth parameters.

The sequence parameter set extension sps_3d_extension includes both of the texture parameters and the depth parameters. Thus, by referring to the same sequence parameter set for texture pictures and depth pictures, ON/OFF flags can be set for both of the texture tools and the depth tools. To input it another way, it is possible to refer to (share) the single sequence parameter for both of texture pictures and depth pictures. Sharing of a parameter set is called parameter set sharing. In contrast, by the use of a sequence parameter set only having texture parameters or depth parameters, it is not possible to share such a single sequence parameter set for texture pictures and depth pictures. An explanation of the use of such a sequence parameter set will not be given in the present invention.

From the values of the decoded parameters (syntax elements), the variable-length decoder 301 then derives the following ON/OFF flags of the extension tools: an inter-view prediction flag IvMvPredFlag, an inter-view scaling flag IvMvScalingFlag, a residual prediction flag IvResPredFlag, a viewpoint synthesis prediction flag ViewSynthesisPredFlag, a depth-based block partition flag DepthBasedBlkPartFlag, a depth refinement flag DepthRefinementFlag, a motion parameter inheritance flag MpiFlag, an intra contour segmentation flag IntraContourFlag, an intra SDC wedge segmentation flag IntraSdcWedgeFlag, a quadtree partition prediction flag QtPredFlag, an inter SDC flag InterSdcFlag, an intra single prediction flag IntraSingleFlag, and a disparity derivation flag DisparityDerivationFlag. In the following syntax, to avoid the occurrence of unexpected errors in the decoding apparatus, the ON/OFF flags of the extension tools are derived from the syntax elements so that they will become 1 only when the layer ID of a target layer is greater than 0 (ON/OFF flags are derived so that a depth/texture extension tool will become 1 only when a depth picture or a texture picture is present). However, the values of the syntax elements may simply be used for the ON/OFF flags.

In this embodiment, a depth coding tool for performing block prediction by conducting region segmentation using a wedgelet pattern derived from a wedgelet pattern table is called DMM1 prediction (wedgelet segmentation prediction), while a depth coding tool for performing block prediction by conducting region segmentation using a wedgelet pattern derived from texture pixel values is called DMM4 prediction (contour segmentation prediction). The intra SDC wedge segmentation flag IntraSdcWedgeFlag is a flag for determining whether the DMM1 prediction (wedgelet segmentation prediction) tool will be used. The intra contour segmentation flag IntraContourFlag is a flag for determining whether the DMM4 prediction (contour segmentation prediction) tool will be used.

IvMvPredFlag=(nuh_layer_id>0) && NumRefListLayers[nuh_layer_id]>0 && iv_my_pred_flag[DepthFlag]

IvMvScalingFlag=(nuh_layer_id>0) && iv_my_scaling_flag[DepthFlag]

SubPbSize=1<<(nuh_layer_id>0? log 2_sub_pb_size_minus3[DepthFlag]+3: CtbLog2SizeY)

IvResPredFlag=(nuh_layer_id>0) && NumRefListLayers[nuh_layer_id]>0 && iv_res_pred_flag[DepthFlag]

ViewSynthesisPredFlag=(nuh_layer_id>0) && NumRefListLayers[nuh_layer_id]>0 && view_synthesis_pred_flag[DepthFlag] && depthOfRefViewsAvailFlag DepthBasedBlkPartFlag=(nuh_layer_id>0) && depth_based_blk_part_flag[DepthFlag] && depthOfRefViewsAvailFlag DepthRefinementFlag=(nuh_layer_id>0) && depth_refinement_flag[DepthFlag] && depthOfRefViewsAvailFlag MpiFlag=(nuh_layer_id>0) && mpi_flag[DepthFlag] && textOfCurViewAvailFlag MpiSubPbSize=1<<(log 2_mpi_sub_pb_size_minus3 [DepthFlag]+3)

IntraContourFlag=(nuh_layer_id>0) && intra_contour_flag[DepthFlag] && textOfCurViewAvailFlag IntraSdcWedgeFlag=(nuh_layer_id>0) && intra_sdc_wedge_flag[DepthFlag]

QtPredFlag=(nuh_layer_id>0) && qt_pred_flag[DepthFlag]&& textOfCurViewAvailFlag

InterSdcFlag=(nuh_layer_id>0) && inter_sdc_flag[DepthFlag]

IntraSingleFlag=(nuh_layer_id>0) && intra_single_flag[DepthFlag]

DisparityDerivationFlag=IvMvPredFlag||IvResPredFlag||ViewSynthesisPredFlag||DepthBasedBlkPartFlag where nuh_layer_id is the layer ID of a target layer, NumRefListLayers[nuh_layer_id] is the number of reference layers for a target layer, depthOfRefViewsAvailFlag is a flag indicating whether a corresponding depth picture is present in a target layer, and textOfCurViewAvailFlag is a flag indicating whether a texture corresponding picture is present in a target layer. In the above-described syntax, if iv_my_pred_flag[DepthFlag] is 0, IvMvPredFlag is 0, if iv_my_scaling_flag[DepthFlag] is 0, IvMvScalingFlag is 0, if iv_res_ pred_flag[DepthFlag] is 0, IvResPredFlag is 0, if view_synthesis_pred_flag[DepthFlag] is 0, ViewSynthesisPredFlag is 0, if depth_based_blk_part_flag[DepthFlag] is 0, DepthBasedBlkPartFlag is 0, if depth_refinement_flag [DepthFlag] is 0, DepthRefinementFlag is, if mpi_flag [DepthFlag] is 0, MpiFlag is 0, if intra_contour_flag[DepthFlag] is 0, IntraContourFlag is 0, if intra_sdc_wedge_flag [DepthFlag] is 0, IntraSdcWedgeFlag is 0, if qt_pred_flag [DepthFlag] is 0, QtPredFlag is 0, if inter_sdc_flag [DepthFlag] is 0, InterSdcFlag is 0, and if intra_single_flag [DepthFlag] is 0, IntraSingleFlag is 0.

With the configuration of the sequence parameter set extension sps_3d_extension according to this embodiment, the decoding apparatus decodes parameters (syntax elements) in a parameter set corresponding to each of the values of 0 to 1 of the loop coefficient d. The decoding apparatus decodes the present_flag 3d_sps_param_present_flag[k] indicating whether parameters (syntax elements) corresponding to each value of the loop variable d are present in the parameter set (sequence parameter set extension). If the present_flag 3d_sps_param_present_flag[d] is 1, the decoding apparatus decodes the parameters (syntax elements) corresponding to the loop variable d.

In the image decoding apparatus 31 of this embodiment, when decoding a syntax set in the parameter set corresponding to each of the values of 0 to 1 of the loop coefficient d, the variable-length decoder 301 decodes the present flag 3d_sps_param_present_flag[k] indicating whether the syntax set corresponding to each value of the loop variable d is present in the above-described parameters. If the present flag 3d_sps_param_present_flag[k] is 1, the variable-length decoder 301 decodes the syntax set corresponding to the loop variable d. This makes it possible to independently turn ON or OFF a tool used for texture pictures by using the present_flag 3d_sps_param_present_flag[0] and turn ON or OFF a tool used for texture pictures by using the present_flag 3d_sps_param_present_flag[1].

The variable-length decoder 301 of the image decoding apparatus 31 decodes a syntax set indicating ON/OFF flags of tools. When decoding parameters in accordance with each of the values of 0 to 1 of the loop variable d, the variable-length decoder 301 decodes an ON/OFF flag of a texture extension tool if d is 0, and decodes an ON/OFF flag of a depth extension tool if d is 1. More specifically, the variable-length decoder 301 decodes at least the viewpoint synthesis prediction flag view_synthesis_pred_flag if d is 0, and decodes at least the intra SDC wedge segmentation flag intra_sdc_wedge_flag if d is 1.

With the above-described configuration, when the same parameter set is not used for texture pictures and depth pictures, but a texture parameter set is used for texture pictures and a depth parameter set is used for depth pictures, parameters used only for texture pictures or parameters used only for depth pictures can be decoded.

(Sequence Parameter Set Extension sps_3d_extension of Comparative Example)

FIG. 25 illustrates the syntax configuration of a parameter set of a comparative example. In the syntax configuration of the comparative example, a present flag 3d_sps_param_present_flag[d] corresponding to each of the values of the loop variable d is not included. Accordingly, when using a parameter set to be used (referred to) only by texture pictures, decoding of both of the parameters used for texture pictures and the parameters used for depth pictures is necessary. Unnecessary codes are thus generated in parameters used for depth pictures. Additionally, parameters used for depth pictures are mixed with those used for texture pictures in coded data, and decoding of such coded data may become confusing. A decoding apparatus also requires an extra storage memory for storing such unnecessary parameters.

Similarly, in the comparative example, when using a parameter set to be used (referred to) only by depth pictures, decoding of both of the parameters used for texture pictures and the parameters used for depth pictures is necessary. Redundant codes are thus generated in parameters used for texture pictures. With the configuration of this embodiment, however, parameters used only for texture pictures or parameters used only for depth pictures are decoded. That is, if the present_flag 3d_sps_param_present_flag[0] for a texture extension tool is 1 and if the present_flag 3d_sps_param_present_flag[1] for a depth extension tool is 0, decoding of parameters used for depth pictures is not necessary.

Similarly, if the present flag 3d_sps_param_present_flag [0] for a texture extension tool is 0 and if the present_flag 3d_sps_param_present_flag[1] for a depth extension tool is 1, decoding of parameters used for texture pictures is not necessary, and parameters used only for depth pictures can be defined.

The variable-length decoder 301 outputs some of the demultiplexed codes to the prediction parameter decoder 302. Examples of the demultiplexed codes output to the prediction parameter decoder 302 are a prediction mode PredMode, a partition mode part_mode, a merge_flag merge_flag, a merge index merge_idx, an inter prediction identifier inter_pred_idc, a reference picture index refIdxLX, a prediction vector flag mvp_LX_flag, a difference vector mvdLX, a residual prediction index iv_res_pred_weight_idx, an illumination compensation flag ic_flag, a depth intra extension absence flag dim_not_present_flag, a depth intra prediction mode flag depth_intra_mode_flag, and a wedge pattern index wedge_full_tab_idx. Control is performed to determine which codes will be decoded, based on an instruction from the prediction parameter decoder 302. The variable-length decoder 301 outputs a quantized coefficient to the inverse-quantizing-and-inverse-DCT unit 311. This quantized coefficient is an coefficient obtained by performing DCT (Discrete Cosine Transform) on a residual signal and by quantizing the resulting signal when performing coding processing. The variable-length decoder 301 outputs a depth DV transform table DepthToDisparityB to the depth DV deriving unit 351. The depth DV transform table DepthToDisparityB is a table for transforming pixel values of a depth image into disparities representing displacements between viewpoint images. An element DepthToDisparityB[d] in the depth DV transform table DepthToDisparityB can be found by the following equations using a scale cp_scale, an offset cp_off, and the scale precision cp_precision.

log 2 Div=BitDepthY−1+cp_precision offset=(cp_off<<BitDepthY)+((1<<log 2 Div)>>1)

scale=cp_scale

DepthToDisparityB[d]=(scale*d+offset)>>log 2 Div

The parameters cp_scale, cp_off, and cp_precision are decoded from a parameter set in the coded data for each reference viewpoint. BitDepthY represents the bit depth of a pixel value corresponding to a luminance signal, and the bit depth is 8, for example.

The prediction parameter decoder 302 receives some of the codes from the variable-length decoder 301 as input. The prediction parameter decoder 302 decodes prediction parameters corresponding to the prediction mode represented by the prediction mode PredMode, which is one of the codes. The prediction parameter decoder 302 outputs the prediction mode PredMode and the decoded prediction parameters to the prediction parameter memory 307 and the predicted image generator 308.

The inter prediction parameter decoder 303 decodes inter prediction parameters, based on the codes input from the variable-length decoder 301, by referring to the prediction parameters stored in the prediction parameter memory 307. The inter prediction parameter decoder 303 outputs the decoded inter prediction parameters to the predicted image generator 308 and also stores the decoded inter prediction parameters in the prediction parameter memory 307. Details of the inter prediction parameter decoder 303 will be discussed later.

The intra prediction parameter decoder 304 decodes intra prediction parameters, based on the codes input from the variable-length decoder 301, by referring to the prediction parameters stored in the prediction parameter memory 307. The intra prediction parameters are parameters used for predicting picture blocks within one picture, and an example of the intra prediction parameters is an intra prediction mode IntraPredMode. The intra prediction parameter decoder 304 outputs the decoded intra prediction parameters to the predicted image generator 308 and also stores the decoded intra prediction parameters in the prediction parameter memory 307.

The reference picture memory 306 stores decoded picture blocks recSamples generated by the adder 312 at locations corresponding to the decoded picture blocks.

The prediction parameter memory 307 stores prediction parameters at predetermined locations according to the picture and the block to be decoded. More specifically, the prediction parameter memory 307 stores inter prediction parameters decoded by the inter prediction parameter decoder 303, intra prediction parameters decoded by the intra prediction parameter decoder 304, and the prediction mode PredMode demultiplexed by the variable-length decoder 301. Examples of the inter prediction parameters to be stored are the prediction use flag predFlagLX, the reference picture index refIIdxLX, and the vector mvLX.

The predicted image generator 308 receives the prediction mode PredMode and the prediction parameters from the prediction parameter decoder 302. The predicted image generator 308 reads reference pictures from the reference picture memory 306. The predicted image generator 308 generates predicted picture blocks preSamples (predicted image) corresponding to the prediction mode represented by the prediction mode PredMode by using the received prediction parameters and the read reference pictures.

If the prediction mode PredMode indicates the inter prediction mode, the inter predicted image generator 309 generates predicted picture blocks predSamples by performing inter prediction using the inter prediction parameters input from the inter prediction parameter decoder 303 and the read reference pictures. The predicted picture blocks predSamples correspond to a prediction unit PU. As discussed above, a PU corresponds to part of a picture constituted by multiple pixels, and forms a unit of prediction processing. That is, a PU corresponds to a group of target blocks on which prediction processing is performed at one time.

The inter predicted image generator 309 reads from the reference picture memory 306 a reference picture block located at a position indicated by the vector mvLX based on the prediction unit. The inter predicted image generator 309 reads such a reference picture block from the reference picture RefPicListLX[refIdxLX] represented by the reference picture index refIdxLX in the reference picture list RefPicListLX for which the prediction use flag predFlagLX is 1. The inter predicted image generator 309 performs motion compensation on the read reference picture blocks so as to generate predicted picture blocks predSamplesLX. The inter predicted image generator 309 also generates predicted picture blocks predSamples from predicted picture blocks predSamplesL0 and predSamplesL0 derived from the reference pictures in the individual reference picture lists by performing weighted prediction, and outputs the generated predicted picture blocks predSamples to the adder 312.

If the prediction mode PredMode indicates the intra prediction mode, the intra predicted image generator 310 performs intra prediction by using the intra prediction parameters input from the intra prediction parameter decoder 304 and the read reference pictures. More specifically, the intra predicted image generator 310 selects, from among decoded blocks of a picture to be decoded, reference picture blocks positioned within a predetermined range from a prediction unit, and reads the selected reference picture blocks from the reference picture memory 306. The predetermined range is a range of neighboring blocks positioned on the left, top left, top, and top right sides of a target block, for example. The predetermined range varies depending on the intra prediction mode.

The intra predicted image generator 310 performs prediction by using the read reference picture blocks corresponding to the prediction mode represented by the intra prediction mode IntraPredMode so as to generate predicted picture blocks predSamples. The intra predicted image generator 310 then outputs the generated predicted picture blocks predSamples to the adder 312.

The inverse-quantizing-and-inverse-DCT unit 311 inverse-quantizes the quantized coefficient input from the variable-length decoder 301 so as to find a DCT coefficient. The inverse-quantizing-and-inverse-DCT unit 311 performs inverse-DCT (Inverse Discrete Cosine Transform) on the DCT coefficient so as to calculate a decoded residual signal. The inverse-quantizing-and-inverse-DCT unit 311 outputs the calculated decoded residual signal to the adder 312.

The adder 312 adds, for each pixel, the predicted picture blocks predSamples input from the inter predicted image generator 309 and the intra predicted image generator 310 and the signal value resSamples of the decoded residual signal input from the inverse-quantizing-and-inverse-DCT unit 311 so as to generate decoded picture blocks recSamples. The adder 312 outputs the generated decoded picture blocks recSamples to the reference picture memory 306. Multiple decoded picture blocks are integrated with each other for each picture. A loop filter, such as a deblocking filter and an adaptive offset filter, is applied to the decoded picture. The decoded picture is output to the exterior as a decoded layer image Td.

The variable-length decoder 301 decodes an SDC flag sdc_flag if sdcEnableFlag is 1, as indicated by SYN00 in FIG. 17. The flag sdcEnableFlag is derived from the following equations.

```
if (CuPredMode==MODE_INTRA)

sdcEnableFlag=(inter_sdc_flag &&
    PartMode==PART_2N×2N)

else if (CuPredMode==MODE_INTRA)

sdcEnableFlag=(intra_sdc_wedge_flag &&
    PartMode==PART_2N×2N)

else

sdcEnableFalg=0
```

That is, in a case in which the prediction mode CuPredMode[x0] [y0] is inter prediction MODE INTER, sdcEnableFlag is set to be 1 if InterSdcFlag is true (1) and if the partition mode PartMode is 2N×2N. Otherwise, if the prediction mode CuPredMode[x0] [y0] is intra prediction MODE_INTRA, the value of (IntraSdcWedgeFlag is true (1) and the partition mode PartMode is 2N×2N) is set in sdcEnableFlag. Otherwise, sdcEnableFlag is set to be 0.

With the above-described configuration, in accordance with the depth ON/OFF flags InterSdcFlag and IntraSdcWedgeFlag derived from the depth syntax elements inter_sdc_flag and intra_sdc_wedge_flag of the sequence parameter set extension, the decoding of a flag sdc_flag indicating whether the SDC mode will be valid can be controlled. If both of inter_sdc_flag and intra_sdc_wedge_flag are 0, sdc_flag is not decoded, and the SDC mode is invalid. If both of inter_sdc_flag and intra_sdc_wedge_flag are 1 and if the picture is a depth picture and the depth picture is usable, InterSdcFlag and IntraSdcWedgeFlag become 1, and sdc_flag is decoded if the partition mode is 2N×2N.

In the case of IntraSdcWedgeFlag||IntraContourFlag (at least one of IntraSdcWedgeFlag and IntraContourFlag is 1), as indicated by SYN01 in FIG. 17, the variable-length decoder 301 decodes the intra prediction mode extension intra_mode_ext( ). IntraSdcWedgeFlag is a flag of the depth coding tool indicating whether DMM1 prediction will be enabled (DMM1 prediction mode enable/disable flag). IntraContourFlag is a flag indicating whether DMM4 will be enabled.

With the above-described configuration, in accordance with the depth ON/OFF flags IntraSdcWedgeFlag and IntraContourFlag derived from inter_sdc_flag and intra_contour_flag, which are parameters (syntax elements) used for depth pictures in the sequence parameter set extension, the decoding of the intra prediction mode extension intra_mode_ext( ) can be controlled.

(1) If IntraSdcWedgeFlag and IntraContourFlag are both 0, the intra prediction mode extension intra_mode_ext( ) is not decoded. In this case, neither of DMM1 prediction nor DMM4 prediction is performed.

(2) If IntraSdcWedgeFlag is 0 and if IntraContourFlag is 1, in the intra prediction mode extension intra_mode_ext( ), the syntax elements concerning DMM1 are not decoded. In this case, DMM1 prediction is not performed.

(3) If IntraContourFlag is 0 and if IntraSdcWedgeFlag is 1, in the intra prediction mode extension intra_mode_ext( ), the syntax elements concerning DMM4 are not decoded. In this case, DMM4 prediction is not performed.

If the size of a target PU is 32×32 or smaller (logPbSize<6), the variable-length decoder 301 decodes the depth intra extension absence flag dim_not_present_flag (SYN01A in FIG. 17(*b*)). If the size of a target PU is greater than 32×32, the variable-length decoder 301 assumes that the value of the depth intra extension absence flag dim_not_present_flag is 1 (depth intra extension is not performed). The depth intra extension absence flag dim_not_present_flag is a flag indicating whether depth intra prediction will be performed. If the value of dim_not_present_flag is 1, depth intra extension is not used, and a known intra prediction method of one of intra prediction mode numbers '0' to '34' (DC prediction, planar prediction, and angular prediction) is used for the target PU. If the value of dim_not_present_flag is 1, the variable-length decoder 301 does not decode the depth intra prediction mode flag depth_intra_mode_flag concerning the target PU (depth_intra_mode_flag is not included in coded data). If the value of dim_not_present_flag is 0, this means that the depth intra extension will be used, and the variable-length decoder 301 decodes the depth intra prediction mode flag depth_intra_mode_flag.

If the decoded depth intra extension absence flag dim_not_present_flag is 0, the variable-length decoder 301 decodes depth_intra_mode_flag and derives the depth intra mode DepthIntraMode for the target PU according to the following equation.

DepthIntraMode[x0][y0]=dim_not_present_flag[x0][y0]?−1:depth_intra_mode_flag[x0][y0]

If DepthIntraMode is −1, this flag indicates that prediction (in this case, angular prediction, DC prediction, or planar prediction) other than extension prediction will be performed. If DepthIntraMode is 0, this flag indicates that DMM1 prediction (INTRA_DEP_WEDGE, INTRA_WEDGE), that is, region segmentation using a wedgelet pattern stored in a wedgelet pattern table, will be performed. If DepthIntraMode is 1, this flag indicates that DMM4 prediction (INTRA_DEP_CONTOUR, INTRA_CONTOUR), that is, region segmentation by using a texture contour, will be performed.

That is, if the depth intra extension absence flag dim_not_present_flag is 1, it means that DMM prediction will not be performed, and the variable-length decoder 301 thus sets −1 in the depth intra mode DepthIntraMode. If the depth intra extension absence flag is 0, the variable-length decoder 301 decodes the depth intra prediction mode flag depth_intra_mode_flag indicated by SYN01B in FIG. 17 so as to set depth_intra_mode_flag in DepthIntraMode.

DepthIntraMode[x0][y0]=dim_not_present_flag[x0][y0]?−1:depth_intra_mode_flag[x0][y0]

(Another Configuration of Variable-length Decoder 301)

The intra extension prediction parameter intra_mode_ext( ) decoded by the variable-length decoder 301 is not restricted to the configuration shown in FIG. 17, but may be the configuration shown in FIG. 18. FIG. 18 illustrates a modified example of the intra extension prediction parameter intra_mode_ext( ).

When decoding the intra extension prediction parameter intra_mode_ext( ) in the modified example, in the case of (!dim_not_present_flag[x0] [y0] && IntraSdcWedgeFlag && IntraContourFlag), that is, if dim_not_present_flag is 0, and if IntraSdcWedgeFlag is 1, and if IntraContourFlag is 1, the variable-length decoder 301 decodes depth_intra_mode_flag included in the coded data. Otherwise (if dim_not_present_flag is 1, or if IntraSdcWedgeFlag is 0, or if IntraContourFlag is 1), depth_intra_mode_flag is not included in the coded data, and the variable-length decoder 301 derives the value of dim_not_present_flag based on IntraSdcWedgeFlag and IntraContourFlag according to the following equation, instead of decoding depth_intra_mode_flag in the coded data.

depth_intra_mode_flag[x0][y0]=!IntraSdcWedgeFlag||IntraContourFlag

Alternatively, the following equation may be used.

depth_intra_mode_flag[x0][y0]=IntraSdcWedgeFlag||!IntraContourFlag

Alternatively, if depth_intra_mode_flag is not included in the coded data, the variable-length decoder 301 may derive depth_intra_mode_flag based on IntraSdcWedgeFlag according to the following equation.

depth_intra_mode_flag[x0][y0]=IntraSdcWedgeFlag

Alternatively, if depth_intra_mode_flag is not included in the coded data, the variable-length decoder 301 may derive depth_intra_mode_flag based on IntraContourFlag according to the following equation.

depth_intra_mode_flag[x0][y0]=IntraContourFlag

Alternatively, if depth_intra_mode_flag is not included in the coded data, the variable-length decoder 301 may derive depth_intra_mode_flag based on IntraSdcWedgeFlag and IntraContourFlag according to the following equation.

depth_intra_mode_flag[x0][y0]=IntraContourFlag?1:(IntraSdcWedgeFlag?0:−1)

Alternatively, if depth_intra_mode_flag is not included in the coded data, the variable-length decoder 301 may derive depth_intra_mode_flag based on IntraSdcWedgeFlag and IntraContourFlag according to the following equation.

depth_intra_mode_flag[x0][y0]=IntraSdcWedgeFlag?0:(IntraContourFlag?1:−1)

If only one of IntraSdcWedgeFlag and IntraContourFlag is 1, only one of DMM1 prediction (INTRA_DEP_WEDGE) for performing region segmentation by using a wedgelet pattern or DMM4 prediction (INTRA_DEP_CONTOUR) for performing region segmentation by using texture is performed. Thus, the flag depth_intra_mode_flag for selecting one of the two DMM prediction modes is redundant.

In the modified example shown in FIG. 18, the variable-length decoder 301 does not decode depth_intra_mode_flag in the coded data if one of IntraSdcWedgeFlag and IntraContourFlag is 1. Consequently, redundant codes are not decoded. If depth_intra_mode_flag is not included in the coded data, instead of decoding the coded data, the variable-length decoder 301 can derive the value of depth_intra_mode_flag by executing logical operation between IntraSdcWedgeFlag and IntraContourFlag (or logical operation on IntraSdcWedgeFlag or logical operation on IntraContourFlag). That is, in the case of the absence of depth_intra_mode_flag in the coded data, it is still possible to derive DepthIntraMode. Even in the case of the absence of depth_intra_mode_flag in the coded data, DepthIntraMode (depth_intra_mode_flag) used for decoding processing does not become an indefinite value, and an undefined error which would occur in the worst case, such as crashing of processing, can be avoided.

The variable-length decoder 301 may derive DepthIntraMode according to one of the following equations.

DepthIntraMode[x0][y0]=dim_not_present_flag[x0][y0]?−1:(IntraContourFlag && IntraSdcWedgeFlag?depth_intra_mode_flag:(!IntraSdcWedgeFlag||IntraContourFlag)

DepthIntraMode[x0][y0]=dim_not_present_flag[x0][y0]?−1:(IntraContourFlag?1:(IntraSdcWedgeFlag?0depth_intra_mode_flag))

DepthIntraMode[x0][y0]=dim_not_present_flag[x0][y0]?−1:(intraSdcWedgeFlag?0:(IntraContourFlag?1:depth_intra_mode_flag))

With the configuration in the above-described modified example, if depth_intra_mode_flag is not included in the coded data, instead of decoding the coded data, the variable-length decoder 301 can derive the value of DepthIntraMode by executing logical operation among dim_not_present_flag, IntraSdcWedgeFlag, IntraContourFlag (or logical operation on IntraSdcWedgeFlag or logical operation on IntraContourFlag). That is, even in the case of the absence of depth_intra_mode_flag in the coded data, DepthIntraMode used for decoding processing does not become an indefinite value, and an undefined error which would occur in the worst case, such as crashing of processing, can be avoided.

As described above, in this embodiment, the image decoding apparatus 31 includes the variable-length decoder 301 that decodes IntraSdcWedgeFlag, IntraContourFlag, dim_not_present_flag, and depth_intra_mode_flag and a DMM predicting section 145T that performs DMM prediction. If dim_not_present_flag is 0 and if IntraSdcWedgeFlag is 1, and if IntraContourFlag is 1, the variable-length decoder 301 decodes depth_intra_mode_flag included in the coded data. If depth_intra_mode_flag is not included in the coded data, the variable-length decoder 301 derives depth_intra_mode_flag by executing logical operation between IntraSdcWedgeFlag and IntraContourFlag. If depth_intra_mode_flag is not included in the coded data, the variable-length decoder 301 may alternatively derive depth_intra_mode_flag by executing logical operation of !IntraSdcWedgeFlag||IntraContourFlag. The image decoding apparatus 31 includes the variable-length decoder 301 that decodes IntraSdcWedgeFlag, IntraContourFlag, dim_not_present_flag, and depth_intra_mode_flag and a DMM predicting section that performs DMM prediction. If dim_not_present_flag is 0 and if IntraSdcWedgeFlag is 1, and if IntraContourFlag is 1, the variable-length decoder 301 decodes depth_intra_mode_flag included in the coded data. The variable-length decoder 301 may derive DepthIntraMode according to logical equations concerning dim_not_present_flag, IntraContourFlag, and IntraSdcWedgeFlag and from dim_not_present_flag. The variable-length decoder 301 may alternatively derive DepthIntraMode from the equation:

DepthIntraMode=dim_not_present_flag[x0][y0]?−1:(IntraContourFlag && IntraSdcWedgeFlag?depth_intra_mode_flag:(!IntraSdcWedgeFlag||IntraContourFlag).

(Case in which Depth Intra Mode is 0)

If the depth intra mode DepthIntraMode is 0, that is, if depth intra prediction is DMM1 prediction, the variable-length decoder 301 sets a prediction mode number (INTRA_WEDGE) representing DMM1 prediction in the prediction mode predModeIntra. The variable-length decoder 301 also decodes the wedge pattern index wedge_full_tab_idx that specifies a wedge pattern, which is a partition pattern for a PU. The variable-length decoder 301 also sets 1 in a DMM flag DmmFlag. If the DMM flag is 1, it indicates that DMM1 prediction will be used. If the DMM flag is 0, it indicates that DMM4 prediction will be used.

(Case in which Depth Intra Mode is 1)

If the depth intra mode DepthIntraMode is 1, that is, if depth intra prediction is DMM4 prediction, the variable-length decoder 301 sets a prediction mode number (INTRA_CONTOUR) indicating DMM1 prediction in the prediction mode predModeIntra. The variable-length decoder 301 also sets 0 in the DMM flag DmmFlag.

(Case in which Depth Intra Extension Absence Flag is 0)

If the depth intra extension absence flag dim_not_present_flag is 0, the variable-length decoder 301 decodes an MPM flag mpm flag indicating whether the intra prediction mode for a target PU coincides with an estimated prediction mode MPM. If the MPM flag is 1, it indicates that the intra prediction mode for the target PU coincides with the estimated prediction mode MPM. If the MPM flag is 0, it indicates that the intra prediction mode for the target PU is one of the prediction modes having prediction mode numbers of '0' to '34' (DC prediction, planar prediction, and angular prediction) other than the estimated prediction mode MPM.

If the MPM flag is 1, the variable-length decoder 301 also decodes an MPM index mpm_idx that specifies the estimated prediction mode MP, and sets the estimated prediction mode specified by the MPM index mpm_idx in the prediction mode predModeIntra.

If the MPM flag is 0, the variable-length decoder 301 also decodes an index rem_idx that specifies a prediction mode other than MPM, and sets one of the prediction mode numbers of '0' to '34' (DC prediction, planar prediction, and angular prediction) specified by the index rem_idx, other than the estimated prediction mode MPM, in the prediction mode predModeIntra.

(DC Offset Information)

The variable-length decoder 301 also includes a DC offset information decoder 111, which is not shown, and decodes DC offset information included in a target CU by using the DC offset information decoder 111.

More specifically, the DC offset information decoder 111 derives an intra-CU DC offset information presence flag cuDepthDcPresentFlag indicating whether DC offset information is present within a target CU according to the following equation.

cuDepthDcPresentFlag=(sdc_flag||(CuPredMode==MODE_INTRA))

That is, if the SDC flag sdc_flag is 1 or if the prediction type information CuPredMode indicates intra prediction, the intra-CU DC offset information presence flag is set to be 1 (true). Otherwise (if SDC flag is 0 (false) and if the prediction type information CuPredMode indicates inter prediction), the intra-CU DC offset information presence flag is set to be 0 (false). If the intra-CU DC offset information presence flag is 1, it indicates that DC offset information is present in a target CU. If the intra-CU DC offset information presence flag is 0, it indicates that DC offset information is not present in a target CU.

If the intra-CU DC offset information presence flag is 1, the DC offset information decoder 111 then decodes DC offset information. The DC offset information is used for correcting, for each PU within the target CU, a depth prediction value of one or multiple regions divided from the corresponding PU.

More specifically, the DC offset information decoder 111 first derives an intra-PU DC offset information presence flag puDepthDcPresentFlag indicating whether DC offset information is present within a target PU according to the following equation.

puDepthDcPresentFlag=(DepthIntraMode||sdc_flag)

That is, if the DMM flag for a target PU is 1 or if the SDC flag is 1, the intra-PU DC offset information presence flag is set to be 1 (true). Otherwise (DepthIntraMode==0 && sdc_flag==0), the intra-PU DC offset information presence flag is set to be 0 (false). If the intra-PU DC offset information presence flag is 1, it indicates that DC offset information is present in a target PU. If the intra-PU DC offset information presence flag is 0, it indicates that DC offset information is not present in a target PU.

The DC offset information decoder 111 derives the number of segmented regions dcNumSeg in a target PU, according to the following equation, based on the DMM flag for the target PU.

dcNumSeg=DmmFlag?2:1

That is, if the DMM flag is 1, the number of segmented regions dcNumSeg for the target PU is set to be 2. If the DMM flag is 0, dcNumSeg is set to be 1. X? Y:Z is a ternary operator that selects Y if X is true (other than 0) and selects Z if X is false (0).

The DC offset information decoder 111 derives the DC offset value DcOffset[i] corresponding to the segment region Ri (i=0 . . . dcNumSeg−1) within each PU, according to the following equation, based on DC offset information (DC offset information presence flag depth_dc flag, DC offset absolute value depth_dc_abs[i], and DC offset code depth_dc_sign_flag[i]), and the number of segmented regions dcNumSeg.

DcOffset[i]=!depth_dc_offset_flag?0:(1−2*depth_dc_sign_flag[i])*(depth_dc_abs[i]+dcNumSeg−2)

That is, if the DC offset information presence flag is 0, the DC offset value DcOffset[i] corresponding to the segment region Ri is set to be 0. If the DC offset information presence flag is 1, the DC offset value DcOffset[i] corresponding to the segment region Ri is set, based on depth_dc_sign_flag[i], depth_dc_abs[i], and the number of segmented regions dcNumSeg.

The equation for deriving the DC offset value is not restricted to the above-described equation, and may be modified to a feasible equation. The DC offset value may be derived according to the following equation, for example.

DcOffset[i]=(1−2*depth_dc_sign_flag[i])*(depth_dc_abs[i]+dcNumSeg−2)

(Details of Intra Predicted Image Generator)

Figure 19:
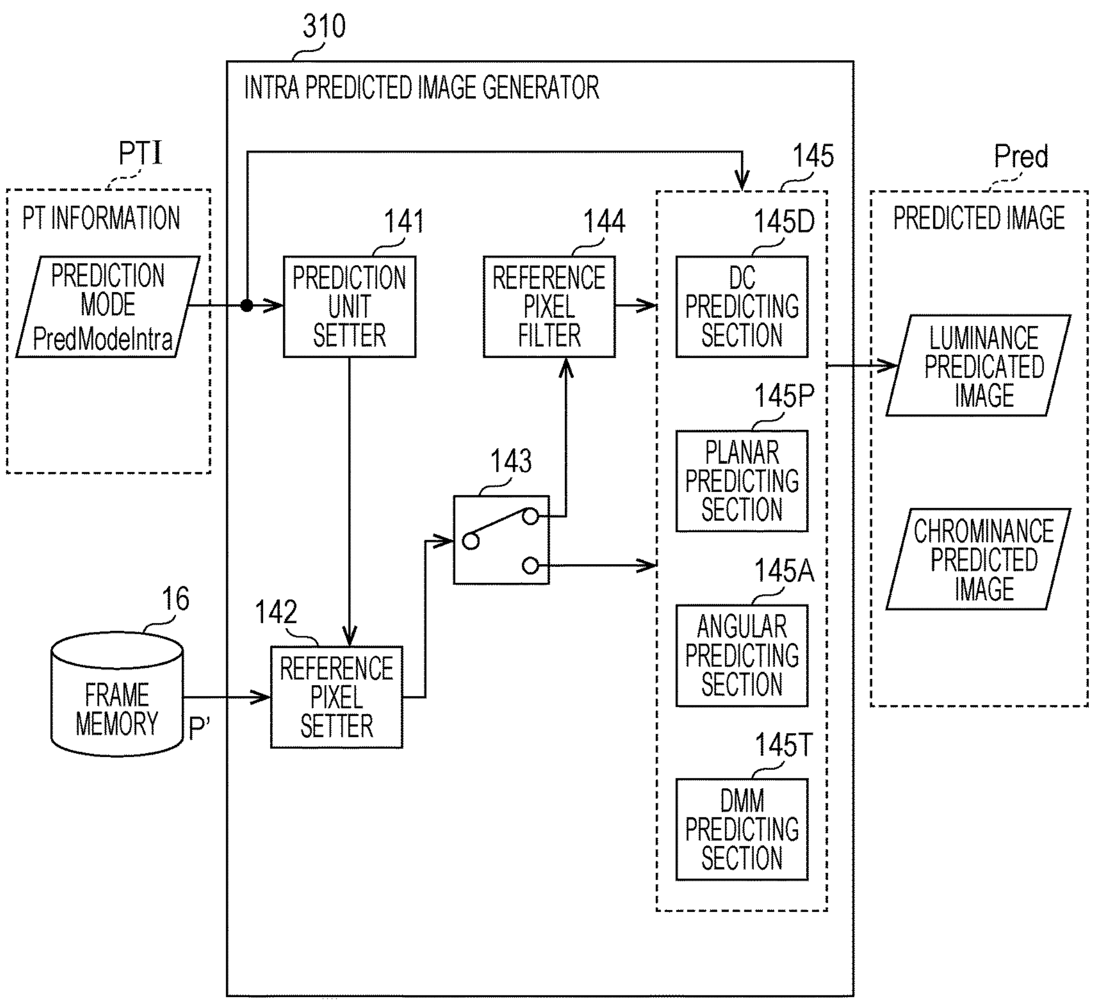
FIG. 19 is a functional block diagram illustrating an example of the configuration of an intra predicted image generator 310 according to this embodiment.

The configuration of the intra predicted image generator 310 will be described below in greater detail with reference to FIG. 19. FIG. 19 is a functional block diagram illustrating an example of the configuration of the intra predicted image generator 310. In this example, among the functions of the intra predicted image generator 310, functional blocks related to the generation of predicted images of intra CUs are shown.

As shown in FIG. 19, the intra predicted image generator 310 includes a prediction unit setter 141, a reference pixel setter 142, a switch 143, a reference pixel filter 144, and a predicted-image deriving unit 145.

The prediction unit setter 141 sets one of PUs included in a target CU to be a target PU in a prescribed setting order, and outputs information concerning a target PU (target PU information). The target PU information at least includes information concerning the size nS of the target PU, the position of the target PU within the CU, and the index indicating the luminance or chrominance plane of the target PU (luminance/chrominance index cIdx).

The switch 143 outputs reference pixels to a corresponding destination, based on the luminance/chrominance index cIdx of the input target PU information and the prediction mode predModeIntra. More specifically, if the luminance/chrominance index cIdx is 0 (a target pixel is a luminance pixel) and if the prediction mode predModeIntra indicates one of 0 to 34 (if the prediction mode is planar prediction, DC prediction, or angular prediction (predModeIntra<35)), the switch 143 outputs the input reference pixels to the reference pixel filter 144. Otherwise, if the luminance/chrominance index cIdx is 1 (a target pixel is a chrominance pixel) or if the prediction mode predModeIntra is depth intra prediction (predModeIntra>=35)) assigned to the prediction mode number '35', the switch 143 outputs the input reference pixels to the predicted-image deriving unit 145.

The reference pixel filter 144 applies a filter to the values of the input reference pixels and outputs the resulting reference pixel values. More specifically, the reference pixel filter 144 determines whether a filter will be applied, based on the size of the target PU and the prediction mode predModeIntra.

The predicted-image deriving unit 145 generates a predicted image predSamples of the target PU, based on the input PU information (prediction mode predModeIntra, luminance/chrominance index cIdx, and PU size nS) and the reference pixel p[x] [y], and outputs the generated predicted image predSamples. Details of the predicted-image deriving unit 145 will be discussed below.

(Details of Predicted-Image Deriving Unit 145)

The predicted-image deriving unit 145 will now be discussed in detail. As shown in FIG. 19, the predicted-image deriving unit 145 includes a DC predicting section 145D, a planar predicting section 145P, an angular predicting section 145A, and a DMM predicting section 145T.

The predicted-image deriving unit 145 selects a prediction method used for generating a predicted image, based on the input prediction mode predModeIntra. The prediction method can be selected in accordance with the prediction mode associated with the prediction mode number of the input prediction mode predModeIntra, based on the definition shown in FIG. 20.

The predicted-image deriving unit 145 derives a predicted image in accordance with the selected prediction method. More specifically, the predicted-image deriving unit 145 derives a predicted image by using the planar predicting section 145P when the prediction method is planar prediction. The predicted-image deriving unit 145 derives a predicted image by using the DC predicting section 145D when the prediction method is DC prediction. The predicted-image deriving unit 145 derives a predicted image by using the angular predicting section 145A when the predicted method is angular prediction. The predicted-image deriving unit 145 derives a predicted image by using the DMM predicting section 145T when the prediction method is DMM prediction.

The DC predicting section 145D derives a DC prediction value corresponding to the average of the pixel values of the input reference pixels, and outputs a predicted image having this DC prediction value as the pixel value.

The planar predicting section 145P generates a predicted image by using a pixel value obtained by linearly adding multiple reference pixels in accordance with the distance from a target pixel, and outputs the generated predicted image.

[Angular Predicting Section 145A]

The angular predicting section 145A generates a predicted image within a target PU by using a reference pixel of a prediction direction (reference direction) corresponding to the input prediction mode predModeIntra, and outputs the generated predicted image. In processing for generating a predicted image by using angular prediction, the main reference pixel is set in accordance with the value of the prediction mode predModeIntra, and a predicted image is generated by referring to the main reference pixel for each line or each column of a PU.

[DMM Predicting Section 145T]

The DMM predicting section 145T generates a predicted image within a target PU, based on DMM prediction (Depth Modeling Mode, which is also called depth intra prediction) corresponding to the input prediction mode predModeIntra, and outputs the generated predicted image.

Prior to a detailed description of the DMM predicting section 145T, an overview of DMM prediction will first be discussed. The feature of the depth map is that the depth map largely has an edge region representing an object boundary and a flat region representing an object area (the depth value is substantially constant). Basically, in DMM prediction, by utilizing the image feature of the depth map, a target block is divided into two regions R0 and R1 along the edge of the object, and a wedgelet pattern WedgePattern[x] [y], which is pattern information indicating to which region each of the pixels belongs, is derived.

The wedgelet pattern WedgePattern[x] [y] is a matrix of a width and a height of a target block (target PU). 0 or 1 is set for each element (x, y) of the matrix, and the wedgelet pattern indicates to which one of the regions R0 and R1 each pixel of the target block belongs.

Figure 21:
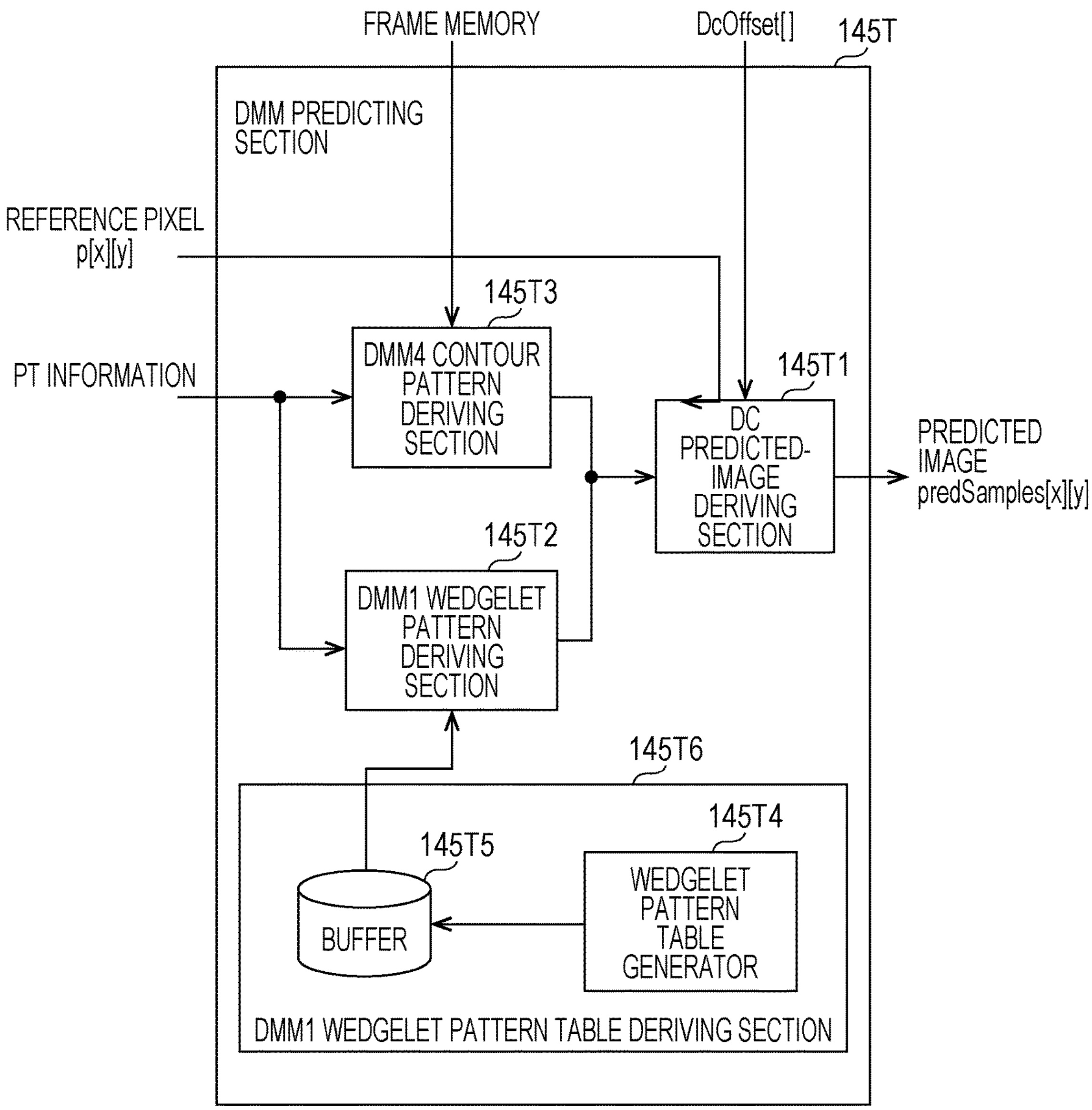
FIG. 21 illustrates the configuration of a DMM predicting section 145T according to this embodiment.

The configuration of the DMM predicting section 145T will be described below with reference to FIG. 21. FIG. 21 is a functional block diagram illustrating an example of the configuration of the DMM predicting section 145T. As shown in the drawing, the DMM predicting section 145T includes a DC predicted-image deriving section 145T1, a DMM1 wedgelet pattern deriving section 145T2, and a DMM4 contour pattern deriving section 145T3.

The DMM predicting section 145T starts wedgelet pattern generating means (DMM1 wedgelet pattern deriving section or DMM4 contour pattern deriving section) corresponding to the input prediction mode predModeIntra so as to generate a wedgelet pattern wedgePattern[x] [y] representing a segmentation pattern of a target PU. More specifically, if the prediction mode predModeIntra indicates prediction mode number '35', that is, in the case of the INTRA_DEP_WEDG mode, the DMM predicting section 145T starts the DMM1 wedgelet pattern deriving section 145T2. If the prediction mode predModeIntra indicates prediction mode number '36', that is, in the case of the INTRA_DEP_CONTOUR mode, the DMM predicting section 145T starts the DMM4 contour pattern deriving section 145T3. Then, the DMM predicting section 145T starts the DC predicted-image deriving section 145T1 and obtains a predicted image of the target PU.

[DC Predicted-Image Deriving Section 145T1]

Broadly speaking, the DC predicted-image deriving section 145T1 divides a target PU into two regions, based on the wedgelet pattern wedgePattern[x] [y] of the target PU, and derives a prediction value concerning the region R and a prediction value concerning the region R1, based on input PT information and a reference pixel p[x] [y]. The DC predicted-image deriving section 145T1 then sets the prediction values concerning the individual regions in the predicted image predSamples[x] [y].

[DMM1 Wedgelet Pattern Deriving Section 145T2]

The DMM1 wedgelet pattern deriving section 145T2 includes a DMM1 wedgelet pattern table deriving section 145T6, a buffer 145T5, and a wedgelet pattern table generator 145T4. Broadly, the DMM1 wedgelet pattern deriving section 145T2 starts the wedgelet pattern table generator 145T4 to generate a wedgelet pattern table WedgePatternTable according to the block size only when it is started for the first time. The DMM1 wedgelet pattern deriving section 145T2 then stores the generated wedgelet pattern table in the buffer 145T5. Then, based on the input size nS of the target PU and the wedgelet pattern index wedge_full_tab_idx, the DMM1 wedgelet pattern table deriving section 145T6 derives the wedgelet pattern wedgePattern[x] [y] from the wedgelet pattern table WedgePatternTable stored in the buffer 145T5, and outputs the wedgelet pattern wedgePattern[x] [y] to the DC predicted-image deriving section 145T1.

[Buffer 145T5]

The buffer 145T5 records the wedgelet pattern table WedgePatternTable according to the block size supplied from the wedgelet pattern table generator 145T4.

[DMM1 Wedgelet Pattern Table Deriving Section 145T6]

The DMM1 wedgelet pattern table deriving section 145T6 derives the wedgelet pattern wedgePattern[x] [y] to be applied to the target PU from the wedgelet pattern table WedgePatternTable stored in the buffer 145T, based on the input size nS of the target PU and the wedge pattern index wedge_full_tab_idx, and outputs the derived wedgelet pattern wedgePattern[x] [y] to the DC predicted-image deriving section 145T1.

wedgePattern[x][y]=WedgePatternTable[log 2(nS)] [wedge_full_tab_idx][x][y], with x=0 . . . nS−1, y=0 . . . nS−1 where log 2(nS) is a logarithm using 2, which is the size nS of the target PU, as a bottom.

[Wedgelet Pattern Table Generator 145T6]

The wedgelet pattern table generator 145T6 generates a wedgelet pattern corresponding to a start point S(xs, ys) and an end point E(xe, ye) of each of six wedge orientations wedgeOri(wedgeOri=0 . . . 5) according to the block size, and adds the generated wedgelet pattern to the wedgelet pattern table WedgePatternTable.

The wedgelet pattern table generator 145T6 is able to generate (1<<log 2BlkSize)×(1<<log 2BlkSize) wedgelet pattern tables WedgePatternTable according to the block size by using log 2BlkSize as a variable, in a range of log 2BlkSize=log 2(nMinS) . . . log 2(nMaxS).

[DMM4 Contour Pattern Deriving Section 145T3]

The DMM4 contour pattern deriving section 145T3 derives a wedgelet pattern wedgePattern[x] [y] indicating a segmentation pattern of a target PU, based on decoded luminance pixel values recTexPic of a viewpoint image TexturePic corresponding to the target PU on the depth map DepthPic, and outputs the derived wedgelet pattern wedgePattern[x] [y] to the DC predicted-image deriving section 145T1. Broadly, the DMM4 contour pattern deriving section derives the two regions R0 and R1 of the target PU on the depth map as a result of binarizing the target block of the corresponding viewpoint image TexturePic by using the average of the luminance values of the target block.

The DMM4 contour pattern deriving section 145T3 first reads from an external frame memory 16 a decoded luminance pixel value recTextPic of the corresponding block of a viewpoint image TexturePic corresponding to the target PU, and sets the read decoded luminance pixel value recTexPic in the reference pixel refSamples[x] [y] according to the following equation.

refSamples[x][y]=recTexPic[xB+x][yB+y], with x=0 . . . nS−1,y=0 . . . nS−1

Based on the reference pixel refSamples[x] [y], the DMM4 contour pattern deriving section 145T3 derives the threshold threshVals from the pixel values at the four corners of the corresponding block.

threshVal=(efSamples[0][0]+refSamples[0][nS−1]+refSamples[nS−1][0]+refSamples[nS−1][nS−1]>>2

Then, by referring to the derived threshold threshVal and the reference pixel refSamples[x] [y], the DMM4 contour pattern deriving section 145T3 derives the wedgelet pattern wedgePattern[x] [y] indicating the segmentation pattern of the target PU according to the following equation, and outputs the derived wedgelet pattern.

wedgePattern[x][y]=(refSamples[x][y]>threshVal)

That is, if the reference pixel refSamples[x] [y] is greater than the threshold threshVal, 1 is set in the element of the wedge pattern (x, y). If the reference pixel refSamples[x] [y] is equal to or smaller than the threshold threshVal, 0 is set in the element of the wedgelet pattern (x, y).

(Configuration of Inter Prediction Parameter Decoder)

Figure 8:
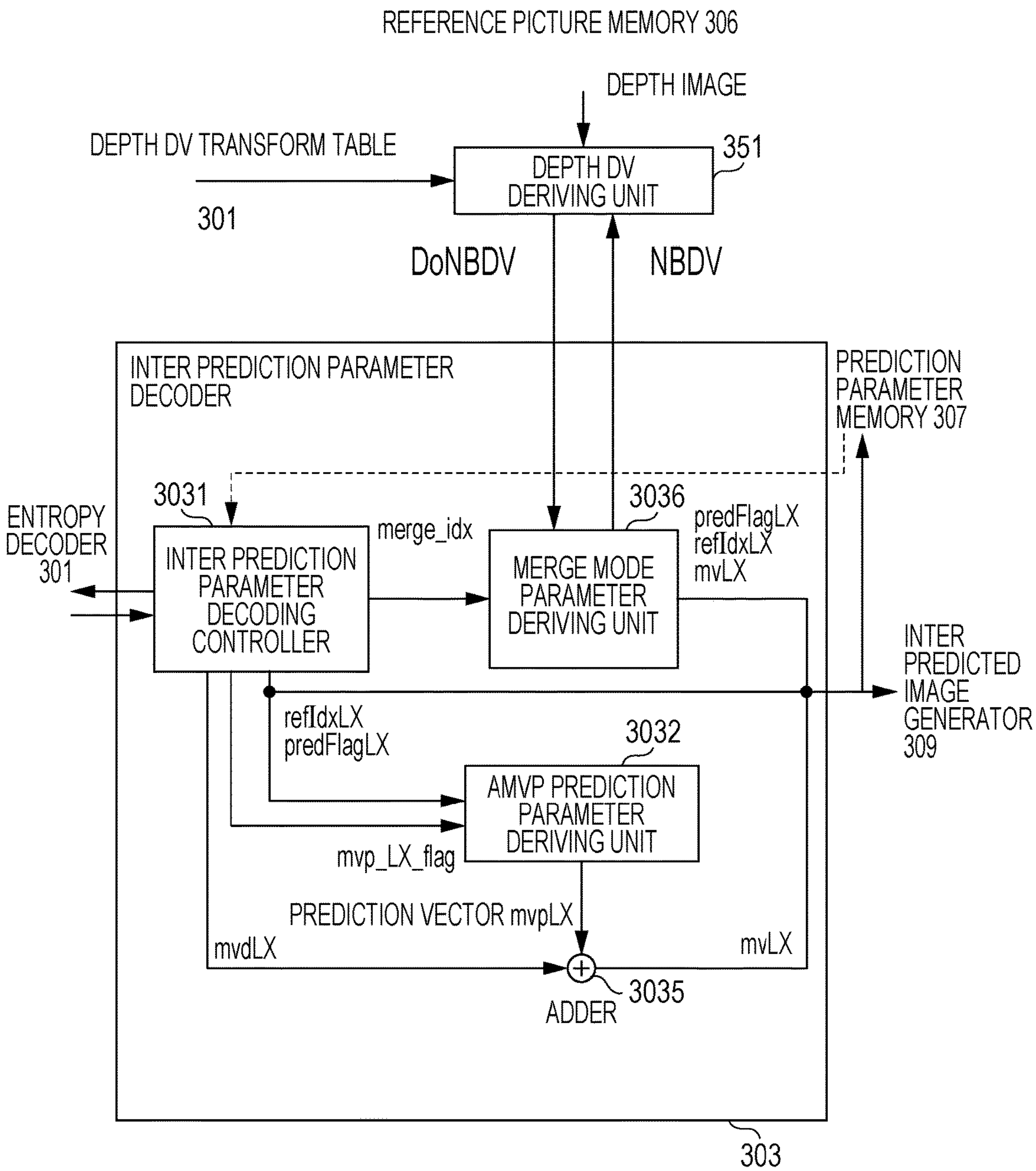
FIG. 8 is a schematic diagram illustrating the configuration of an inter prediction parameter decoder 303 according to this embodiment.

The configuration of the inter prediction parameter decoder 303 will now be described below. FIG. 8 is a schematic diagram illustrating the configuration of the inter prediction parameter decoder 303 according to this embodiment. The inter prediction parameter decoder 303 includes an inter prediction parameter decoding controller 3031, an AMVP prediction parameter deriving unit 3032, an adder 3035, a merge mode parameter deriving unit 3036, and a displacement deriving unit 30363.

The inter prediction parameter decoding controller 3031 instructs the variable-length decoder 301 to decode codes (syntax elements) related to inter prediction so as to extract codes (syntax elements) included in coded data, for example, a partition mode part_mode, a merge_flag merge_flag, a merge index merge_idx, an inter prediction identifier inter_pred_idc, a reference picture index refIdxLX, a prediction vector flag mvp_LX_flag, a difference vector mvdLX, a residual prediction index iv_res_pred_weight_idx, an illumination compensation flag ic_flag, and a DBBP flag dbbp_flag. When it is described that the inter prediction parameter decoding controller 3031 extracts a certain syntax element, it means that it instructs the variable-length decoder 301 to decode this syntax element from coded data and reads the decoded syntax element.

If the merge_flag merge_flag is 1, that is, if the prediction unit utilizes the merge mode, the inter prediction parameter decoding controller 3031 extracts the merge index merge_idx from the coded data. The inter prediction parameter decoding controller 3031 then outputs the extracted residual prediction index iv_res_pred_weight_idx, illumination compensation flag ic_flag, and merge index merge_idx to the merge mode parameter deriving unit 3036.

If the merge_flag merge_flag is 0, that is, if the prediction block utilizes the AMVP prediction mode, the inter prediction parameter decoding controller 3031 extracts the inter prediction identifier inter_pred_idc, the reference picture index refIdxLX, the prediction vector flag mvp_LX_flag, and the difference vector mvdLX from the coded data by using the variable-length decoder 301. The inter prediction parameter decoding controller 3031 outputs the prediction use flag predFlagLX derived from the extracted inter prediction identifier inter_pred_idc and the reference picture index refIdxLX to the AMVP prediction parameter deriving unit 3032 and the predicted image generator 308, and also stores the prediction use flag predFlagLX and the reference picture index refIdxLX in the prediction parameter memory 307. The inter prediction parameter decoding controller 3031 also outputs the extracted prediction vector flag mvp_LX_flag to the AMVP prediction parameter deriving unit 3032, and outputs the extracted difference flag mvdLX to the adder 3035.

The inter prediction parameter decoding controller 3031 decodes cu_skip_flag, pred_mode, and part_mode. The flag cu_skip_flag is a flag indicating whether a target CU will be skipped. If the target CU is skipped, PartMode is restricted to 2N×2N and the decoding of the partition mode part_mode is omitted. The partition mode part_mode decoded from the coded data is set in the partition mode PredMode.

The inter prediction parameter decoding controller 3031 also outputs a displacement vector (NBDV), which is derived when the inter prediction parameters are derived, and a VSP mode flag VspModeFlag indicating whether viewpoint synthesis prediction (VSP, ViewSynthesisPrediction) will be performed to the inter predicted image generator 309.

Figure 9:
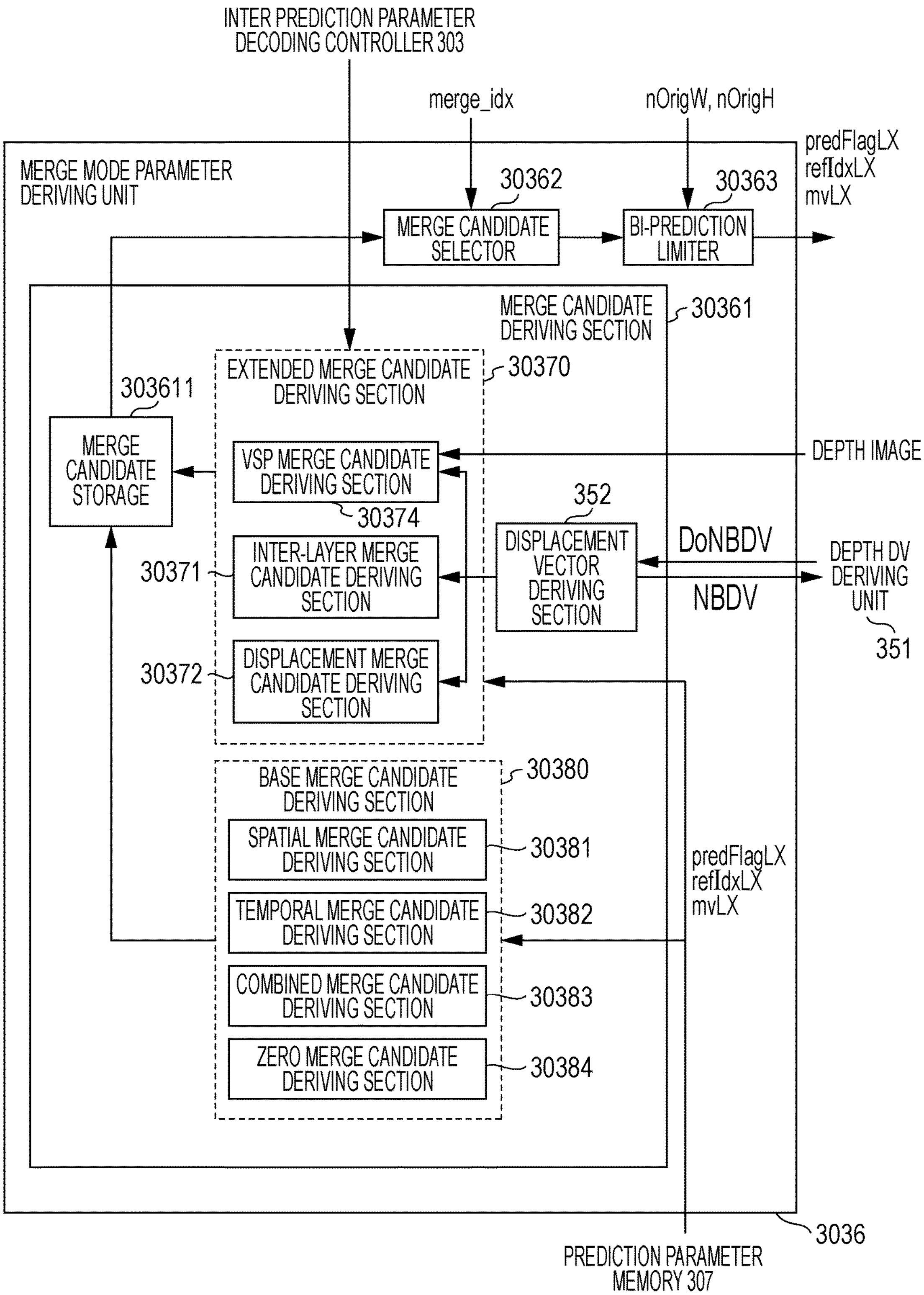
FIG. 9 is a schematic diagram illustrating the configuration of a merge mode parameter deriving unit 3036 according to this embodiment.

FIG. 9 is a schematic diagram illustrating the configuration of the merge mode parameter deriving unit 3036 (prediction-vector deriving device) according to this embodiment. The merge mode parameter deriving unit 3036 includes a merge candidate deriving section 30361, a merge candidate selector 30362, and a bi-prediction limiter 30363. The merge candidate deriving section 30361 includes a merge candidate storage 303611, an extended merge candidate deriving section 30370, and a base merge candidate deriving section 30380.

The merge candidate storage 303611 stores merge candidates input from the extended merge candidate deriving section 30370 and the base merge candidate deriving section 30380 in a merge candidate list mergeCandList. A merge candidate is constituted by a prediction use flag predFlagLX, a vector mvLX, and a reference picture index refIdxLX, and may also include a VSP mode flag VspModeFlag, a displacement vector MvDisp, and a layer ID RefViewIdx. In the merge candidate storage 303611, merge candidates stored in the merge candidate list mergeCandList are associated with indexes of 0, 1, 2, . . . , N from the head of the list.

Figure 10:
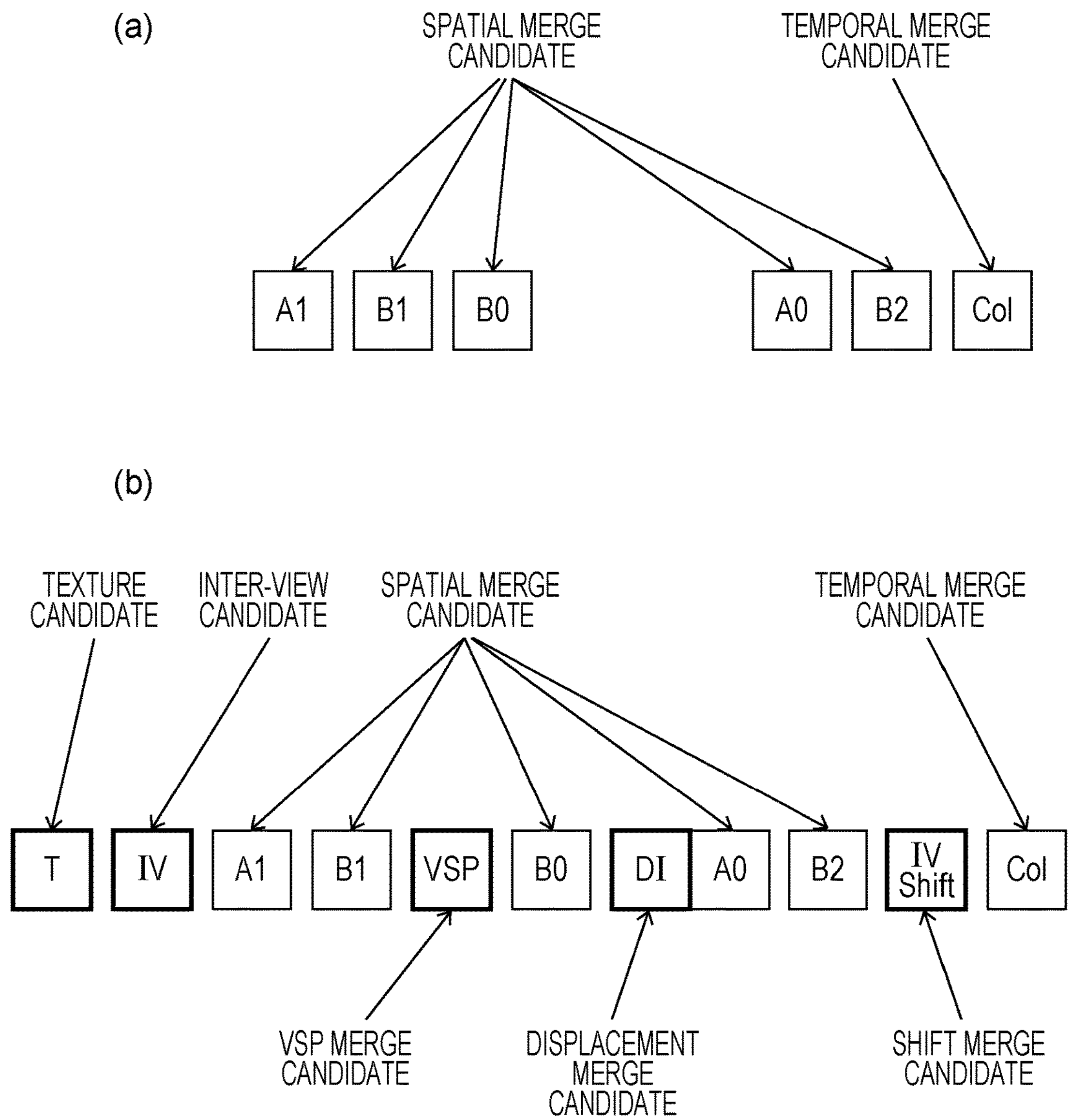
FIG. 10 illustrates examples of a merge candidate list.

FIG. 10 illustrates examples of the merge candidate list mergeCandList derived from the merge candidate deriving section 30361. FIG. 10(*a*) shows merge candidates derived by the merge candidate storage 303611 from a base layer (layer having a layer ID nal_unit_layer=0). If pruning processing (if two merge candidates have the same prediction parameter, one candidate is eliminated) is performed, the merge candidates are arranged as a spatial merge candidate (A1), a spatial merge candidate (B1), a spatial merge candidate (B0), a spatial merge candidate (A0), and a spatial merge candidate (B2) in a merge index order. The reference signs in the parentheses are nicknames of the merge candidates, which are associated with the positions of the reference blocks used for deriving a merge candidate if merge candidates are spatial merge candidates. After the spatial merge candidates shown in FIG. 10(*a*), combined merge candidates (combined bi-predictive merging candidates) and zero merge candidates (zero motion vector merging candidates) are arranged, though they are not shown in FIG. 10. These merge candidates, that is, the spatial merge candidates, temporal merge candidate, combined merge candidates, and zero merge candidates are derived by the base merge candidate deriving section 30380. FIG. 10(*b*) shows a merge candidate list (extended merge candidate list) derived by the merge candidate storage 303611 from an enhancement layer (layer having a layer ID nal_unit_layer!=0), which is a layer other than the base layer. The extended merge candidate list extMergeCandList includes a texture merge candidate (T), an inter-view merge candidate (IV), a spatial merge candidate (A1), a spatial merge candidate (B1), a VSP merge candidate (VSP), a spatial merge candidate (B0), a displacement merge candidate (D1), a spatial merge candidate (A0), a spatial merge candidate (B2), an inter-view shift merge candidate (IVShift), a displacement shift merge candidate (DIShift), and a temporal merge candidate (Col). The reference signs in the parentheses are nicknames of the merge candidates. After the temporal merge candidate (Col) shown in FIG. 10(*b*), combined merge candidates and zero merge candidates are arranged, though they are not shown in FIG. 10. In the drawing, the displacement shift merge candidate (DIShift) is not shown. A depth merge candidate (D) may be added after a texture merge candidate in the extended merge candidate list.

The merge mode parameter deriving unit 3036 constructs a base merge candidate list baseMergeCandidate[ ] and an extended merge candidate list extMergeCandidate[ ]. In the following description, the configuration in which the merge candidate storage 303611 included in the merge mode parameter deriving unit 3036 constructs the lists will be discussed. However, the component that constructs the lists is not restricted to the merge candidate storage 303611. For example, the merge candidate deriving section 30361 may derive merge candidate lists in addition to deriving of individual merge candidates.

The extended merge candidate list extMergeCandList and the base merge candidate list BaseMergeCandList are constructed by the following processing.

```
i=0
if(availableFlagT)
extMergeCandList[i++] = T
if(availableFlagIV && (!availableFlagT || differentMotion(T,
IV)))
extMergeCandList[i++] = IV
N = DepthFlag ? T : IV
if(availableFlagA1 && (!availableFlagN || differentMotion(N,
A1)))
extMergeCandList[i++] = A1
if(availableFlagB1 && (!availableFlagN || differentMotion(N,
B1)))
extMergeCandList[i++] = B1
if(availableFlagVSP && !(availableFlagA1 && VspModeFlag[xPb −
1][yPb + nPbH − 1]) && i < (5 + NumExtraMergeCand))
extMergeCandList[i++] = VSP Processing (A-1)
if(availableFlagB0)
extMergeCandList[i++] = B0
if(availableFlagDI && (!availableFlagA1 || differentMotion(A1,
DI)) && (!availableFlagB1 || differentMotion(B1, DI)) &&
i < (5 + NumExtraMergeCand)))
extMergeCandList[i++] = DI
if(availableFlagA0 && i < (5 + NumExtraMergeCand))
extMergeCandList[i++] = A0
if(availableFlagB2 && i < (5 + NumExtraMergeCand))
extMergeCandList[i++] = B2
```

-continued

```
if(availableFlagIVShift && i < (5 + NumExtraMergeCand) &&
(!availableFlagIV || differentMotion(IV, IVShift)))
extMergeCandList[i++] = IVShift
if(availableFlagDIShift && i < (5 + NumExtraMergeCand))
extMergeCandList[i++] = DIShift
j = 0
while(i < MaxNumMergeCand){
N = baseMergeCandList[j++]
if(N != A1 && N !=B1 && N !=B0 && N !=A0 && N !=B2)
extMergeCandList[i++] = N
}
```

In the above-described processing, availableFlagN indicates whether the merge candidate N is available. If the merge candidate N is available, 1 is set. If the merge candidate N is not available, 0 is set. In the above-described processing, differentMotion(N, M) is a function for identifying whether the merge candidate N and the merge candidate M have different items of motion information (different prediction parameters). If one of the prediction flag predFlag, the motion vector mvLX, and the reference index refIdx of L0 or L1 of the merge candidate N and a corresponding parameter of the merge candidate M are different, that is, if at least one of the following conditions is satisfied, differentMotion(N, M) is 1. Otherwise, differentMotion(N, M) is 0.

predFlagLXN !=predFlagLXM(X=0 . . . 1)

mvLXN!=mvLXM(X=0 . . . 1)

refIdxLXN !=refIdxLXM(X=0 . . . 1)

For example, (!availableFlagT||differentMotion(T, IV)) indicates that, if the texture merge candidate T is available (availableFlagT) and if the texture merge candidate T and the inter-view merge candidate IV have the same prediction parameter (differentMotion(T, IV)==0), pruning is performed so that the inter-view merge candidate IV will not be added to the extended merge candidate list. In the above-described processing expressed by equation F5, a merge candidate is added if the condition for not adding a merge candidate is negated. That is, if the texture merge candidate T is not available (!availableFlagT) or if the texture merge candidate T and the inter-view merge candidate IV have different prediction parameters (differentMotion(T, IV)), pruning is not performed, and the inter-view merge candidate IV is added to the extended merge candidate list.

As indicated by the above-described processing (A-1), the VSP candidate is added to the additional merge candidate list extMergeCandList if the viewpoint synthesis prediction available flag availableFlagVSP is 1 and if the condition that the available flag of A1 is 1 and VspModeFlag at the position A1 is 1 is negated. The viewpoint synthesis prediction available flag availableFlagVSP becomes 1 only when view_synthesis_pred_flag[DepthFlag], which is one of the ON/OFF flags of the texture extension tool decoded from the sequence parameter set extension, is 1 (when ViewSynthesisPredFlag is 1). Consequently, view_synthesis_pred_flag controls ON or OFF of a tool for determining whether VSP, which is viewpoint synthesis prediction, will be used for the merge candidate N.

(Merge Candidate Selection)

The merge candidate selector 30362 selects, from among the merge candidates stored in the merge candidate storage 303611, a merge candidate assigned to an index indicated by the merge index merge_idx input from the inter prediction parameter decoding controller 3031 as an inter prediction parameter of a target PU. That is, assuming that the merge candidate list is indicated by mergeCandList, the merge candidate selector 30362 selects the prediction parameter represented by mergeCandList[merge_idx] and outputs it to the bi-prediction limiter 30363.

More specifically, the merge candidate selector 30362 derives the merge candidate N represented by merge_idx from the base merge candidate list or the extended merge candidate list in accordance with the size (width nOrigPbW and height nOrigPbH) of a prediction unit.

If (nOrigPbW+nOrigPbH)==12),

N=baseMergeCandList[merge_idx]

else, ((nOrigPbW+nOrigPbH)!=12),

N=extMergeCandList[merge_idx]

That is, if the size of a PU is small, the base merge candidate list baseMergeCandidateList is used. Otherwise, the extended merge candidate list extMergeCandidateList is used.

The merge candidate selector 30362 determines whether the merge candidate N will be set as a VSP candidate by referring to the VSP mode flag VspModeFlag of a neighboring block. Additionally, for reference from a succeeding block, the merge candidate selector 30362 also sets a VSP mode flag VspModeFlag in the target block. More specifically, if the viewpoint synthesis prediction available flag availableFlagVSP is 1, and if the merge candidate N is a spatial merge candidate A1, and if the neighboring block A1 is a VSP block (if VspModeFlag[xPb−1] [yPb+nPbH−1] is 1), the merge candidate selector 30362 sets the merge candidate N of the target block to be a VSP candidate. The viewpoint synthesis prediction available flag availableFlagVSP is set by an ON/OFF flag of the texture extension tool decoded from the sequence parameter set extension. Thus, the ON/OFF operation of a tool for determining whether to use VSP, which is viewpoint synthesis prediction, for the merge candidate N is controlled by view_synthesis_pred_flag.

If the merge candidate N of the target block is a VSP candidate, the merge candidate selector 30362 sets 1 in the flag VspModeFlag, which indicates whether the merge candidate N in the target block is a merge candidate.

(Inter-View Merge Candidate)

An inter-view merge candidate is derived as a result of an inter-layer merge candidate deriving section 30371 (inter-view merge candidate deriving section) reading prediction parameters such as a motion vector from a reference block of a reference picture ivRefPic having the same POC as a target picture and having a different view ID (refViewIdx) from that of the target picture. This reference block is specified by a displacement vector deriving section 352, which will be discussed later. This processing is called inter-view motion candidate deriving processing.

If the inter-view prediction flag IvMvPredFlag is 1, the inter-layer merge candidate deriving section 30371 refers to prediction parameters (such as a motion vector) of a reference picture of a layer different from that of the target picture (a viewpoint different from that of the target picture) so as to derive an inter-view merge candidate IV and an inter-view shift merge candidate IVShift.

Assuming that the top-left coordinates of a block are (xPb, yPb), that the width and the height of the block are respectively nPbW and nPbH, and that the displacement vector derived by the displacement vector deriving section 352 is (mvDisp[0], mvDisp[1]), the inter-layer merge candidate deriving section 30371 derives the reference coordinates (xRef, yRef) from the following equations so as to derive the inter-view merge candidate IV.

xRefIVFull=xPb+(nPbW>>1)+((mvDisp[0]+2)>>2)

yRefIVFull=yPb+(nPbH>>1)+((mvDisp[1]+2)>>2)

xRefIV=Clip3(0,PicWidthInSamplesL−1,(xRefIVFull>>3)<<3)

yRefIV=Clip3(0,PicHeightInSamplesL−1,(yRefIVFull>>3)<<3)

Assuming that the horizontal direction of a disparity vector of the target block is mvDisp[0] and that the vertical direction of the disparity vector is mvDisp[1], the inter-layer merge candidate deriving section 30371 derives the horizontal direction and the vertical direction of the disparity vector of the target block which are converted into the integer precision from (mvDisp[0]+2)>>2 and (mvDisp[1]+2)>>2, respectively. That is, in order to normalize the disparity vector mvDisp having a pixel precision of 1/N to the integer precision, a round constant (N/2) is added to the disparity vector and the resulting value is shifted rightward by log 2(N) so that the pixel precision can be 1/N. In this example, it is assumed that the disparity vector has a 1/4 precision, that is, N=4. Accordingly, the round constant is 2 and the amount of right shift is 2 (=log 2(4)).

Additionally, the inter-layer merge candidate deriving section 30371 restricts the intermediate coordinates (xRef, yRef) to a multiple of M (M=8 in this example) by clipping the intermediate coordinates (xRef, yRef) onto a frame size (PicWidthInSamplesL, PicHeightInSamplesL) and by shifting the intermediate coordinates (xRef, yRef) rightward by three bits and then shifting them leftward by three bits. This operation can restrict the position of a motion vector which is referred to in a reference picture to an M×M grid. Motion vectors can thus be stored in units of M×M grids, thereby decreasing a memory space required for storing motion vectors. M is not limited to 8, and may be 16. In this case, the intermediate coordinates (xRef, yRef) may be restricted to a multiple of 16 by shifting them rightward by four bits and then shifting them leftward by four bits in the following manner (this is also applied to the following description in the specification).

xRef=Clip3(0,PicWidthInSamplesL−1,(xRefFull>>4)<<4)

yRef=Clip3(0,PicHeightInSamplesL−1,(yRefFull>>4)<<4)

Assuming that the top-left coordinates of a block are (xPb, yPb), that the width and the height of the block are respectively nPbW and nPbH, and that the displacement vector derived by the displacement vector deriving section 352 is (mvDisp[0], mvDisp[1]), the inter-layer merge candidate deriving section 30371 derives the reference coordinates (xRef, yRef) from the following equations so as to derive the inter-view shift merge candidate IVShift.

xRefIVShiftFull=xPb+(nPbW+K)+((mvDisp[0]+2)>>2)

yRefIVShiftFull=yPb+(nPbH+K)+((mvDisp[1]+2)>>2)

xRefIVShift=Clip3(0,PicWidthInSamplesL−1,(xRefIVShiftFull>>3)<<3)

yRefIVShift=Clip3(0,PicHeightInSamplesL−1,(yRefIVShiftFull>>3)<<3)

In the above-described equations, the constant K is set to be a constant of M−8 to M−1 so that the reference position can be restricted to be a multiple of M. In this example, K is a constant of 0 to 7 so that M can be 8.

The reference coordinates (xRef, yRef) may alternatively be derived by using the variable offsetBLFlag which becomes 1 in the case of an inter-view merge candidate (IV) and becomes 0 in the case of an inter-view shift merge candidate (IVShift) according to the following equations.

xRefFull=xPb+(offsetBLFlag?(nPbW+K):(nPbW>>1)+((mvDisp[0]+2)>>2))

yRefFull=yPb+(offsetBLFlag?(nPbH+K):(nPbH>>1)+((mvDisp[1]+2)>>2))

xRef=Clip3(0,PicWidthInSamplesL−1,(xRefFull>>3)<<3)

yRef=Clip3(0,PicHeightInSamplesL−1,(yRefFull>>3)<<3)

The constant is set to be a predetermined constant of 0 to 7, as described above. The present inventors have found through experiments that K would preferably be one of 1, 2, and 3 in terms of enhancing the coding efficiency.

If the coordinates of the reference block are restricted to a multiple of 16, the equations for deriving xRef and yRef are replaced by the following equations.

xRef=Clip3(0,PicWidthInSamplesL−1,(xRefFull>>4)<<4)

yRef=Clip3(0,PicHeightInSamplesL−1,(yRefFull>>4)<<4)

The reference position is restricted to M=16, and the constant K, which is a constant of M−8 to M−1, is thus a constant of 8 to 15.

Figure 1:
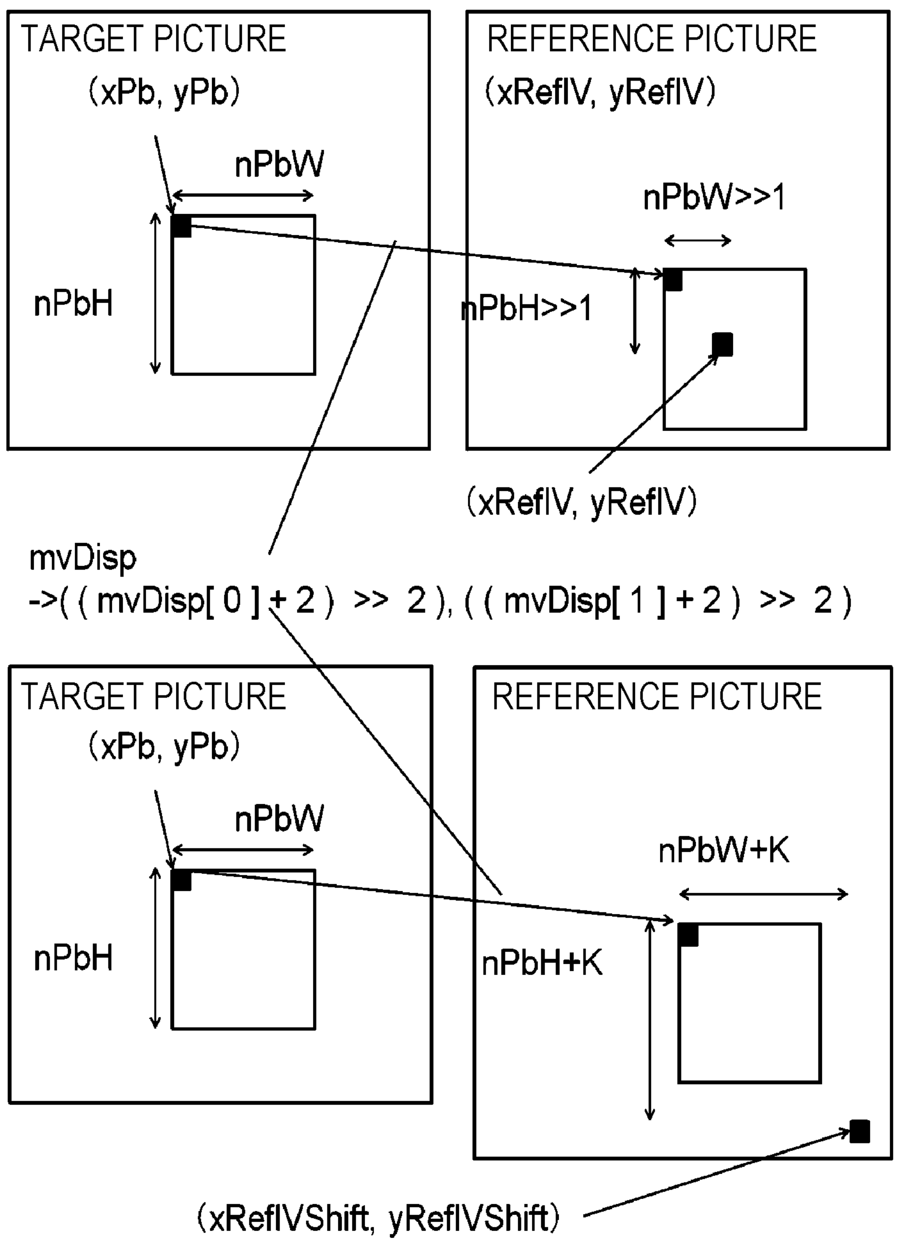
FIG. 1 illustrates the position (xRefIV, yRefIV) of an inter-view merge candidate IV and the position (xRefIVShift, yRefIVShift) of an inter-view shift merge candidate IVShift according to this embodiment.

FIG. 1 illustrates the position (xRefIV, yRefIV) of an inter-view merge candidate IV and the position (xRefIVShift, yRefIVShift) of an inter-view shift merge candidate IVShift.

As shown in the drawing, the position (xRefIV, yRefIV) of the inter-view merge candidate IV is derived from a position (xRefIVFull, yRefIVFull) obtained by adding a normalized disparity vector to the position (xPb, yPb) of a target block and by adding a displacement (nPbW>>1, nPbH>>1) corresponding to half (nPbW/2, nPbH/2) the block size to the resulting position.

As shown in the drawing, the position (XRefIVShift, yRefIVShift) of the inter-view shift merge candidate IVShift is derived from a position (xRefIVShiftFull, yRefIVShiftFull) obtained by adding a normalized disparity vector to the position (xPb, yPb) of a target block and by adding a displacement (nPbW+K, nPbH+K), which is obtained by adding a predetermined constant to the block size, to the resulting position.

The inter-layer merge candidate deriving section 30371 uses an inter-view motion candidate deriving section 303711 to derive motion vectors of the inter-view merge candidate IV and the inter-view shift merge candidate IVShift from the motion vectors positioned at the derived coordinates (xRefIV, yRefIV) and (xRefIVShift, yRefIVShift) of the reference blocks.

In this embodiment, the inter-view merge candidate IV and the inter-view shift merge candidate IVShift both utilize the same normalized disparity vector ((mvDisp[0]+2)>>2) and (mvDisp[1]+2)>>2)). Processing can thus be facilitated.

FIG. 15 is a diagram for explaining the necessity of the constant K. FIG. 15 is a diagram illustrating how xRefIV and xRefIVShift, which are reference positions normalized by a multiple of 8 (M=8), vary in response to a change in the block size nPbW and the disparity vector MvDisp[0] with respect to K of −1 to 4. The vertical positions yRefIV and yRefIVShift can be obtained by replacing the block size nPbW and the disparity vector MvDisp[0] by nPbH and MvDisp[1], respectively. The drawing shows that, when K is −1 or 0, the reference position xRefIV of the inter-view merge candidate and the reference position xRefIVShift of the inter-view shift merge candidate become equal to each other in many cases. In contrast, when K is 1, 2, or 3, the reference position xRefIV of the inter-view merge candidate and the reference position xRefIVShift of the inter-view shift merge candidate become equal to each other in some cases. When K is 4, the reference positions xRefIV and xRefIVShift of the two candidates never become equal to each other. When K is 1, 2, or 3, the reference position xRefIV of the inter-view merge candidate and the reference position xRefIVShift of the inter-view shift merge candidate become equal to each other only when the disparity vector MvDisp[0] is small. In this case, the vertical reference position of the inter-view merge candidate and that of the inter-view shift merge candidate become equal to each other when a disparity vector is almost, but not necessarily, be 0, in a situation such as where a camera is horizontally placed (when the vertical disparity vector is almost 0), which is typically found in three-dimensional video images.

The inter-layer merge candidate deriving section 30371 uses the inter-view motion candidate deriving section 303711, which is not shown, to perform inter-view motion candidate deriving processing on each of the inter-view merge candidate IV and the inter-view shift merge candidate IVShift, based on the reference blocks (xRef, yRef).

The inter-view motion candidate deriving section 303711 derives, as the coordinates (xIvRefPb, yIvRefPb), the top-left coordinates of a prediction unit (luminance prediction block) on the reference picture ivRefPic including the coordinates represented by the position (xRef, yRef) of the reference block. Then, from a reference picture list refPicListLYIvRef, a prediction list flag predFlagLYIvRef[x] [y], a vector mvLYIvRef[x] [y], and a reference picture index refIdxLYIvRef[x] [y] for the prediction unit at the coordinates (x, y) on the reference picture ivRefPic, the inter-view motion candidate deriving section 303711 derives a prediction available flag availableFlagLXInterView, a vector mvLXInterView, and a reference picture index refIdxLX, which are prediction parameters for a motion candidate, according to the following processing.

(Deriving Processing for availFlagLXInterView, mvLXInterView, and refIdxLX)

If the prediction use flag predFlagLYIvRef[xIvRefPb] [yIvRefPb] is 1, the inter-view motion candidate deriving section 303711 determines whether PicOrderCnt(refPicListLYIvRef[refIdxLYIvRef[xvRefPb] [yIvRef Pb]]), which is the POC of a prediction unit on a reference picture ivRefPic, is equal to PicOrderCnt(RefPicListLX[i]), which is the POC of a reference picture of a target prediction unit, with respect to the index i of 0 to (the number of elements of the reference picture list−1) (num_ref_idx_lX_active_minus1). If the two POCs are equal to each other (that is, if mvLYIvRef[xIvRefPb] [yIvRefPb]) is a displacement vector), the inter-view motion candidate deriving section 303711 derives the prediction available flag availableFlagLXInterView, the vector mvLXInterView, and the reference picture index refIdxLX from the following equations.

availableFlagLXInterView=1 mvLXInterView=mvLYIvRef[xIvRefPb][yIvRefPb]

refIdxLX=i

That is, if the reference picture referred to by the target prediction unit and the reference picture referred to by the prediction unit on the reference picture ivRefPic are the same, the inter-view motion candidate deriving section 303711 derives the vector mvLXInterView and the reference picture index refIdxLX by using the prediction parameters of the prediction unit on the reference picture ivRefPic.

In the case of an inter-view merge candidate, prediction parameters may be assigned in units of sub-blocks divided from a prediction unit. For example, assuming that the width and the height of a prediction unit are respectively nPbW and nPbH and that the minimum size of a sub-block is SubPbSize, the width nSbW and the height nSbH of the sub-block are derived from the following equations.

minSize=DepthFlag?MpiSubPbSize:SubPbSize nSbW=(nPbW % minSize=0||nPbH % minSize!=0)?nPbW:minSize nSbH=(nPbW % minSize!=0||nPbH % minSize!=0)?nPbH:minSize Subsequently, the above-described inter-view motion candidate deriving section 303711 derives a vector spMvLX [xBlk] [yBlk], a reference picture index spRefIdxLX[xBlk] [yBlk], and a prediction use flag spPredFlagLX[xBlk] [yBlk] for each sub-block.

In this example, (xBlk, yBlk) denotes relative coordinates of a sub-block within a prediction unit (coordinates based on the top-left coordinates of the prediction unit), and takes an integer of (nPbW/nSbW−1) from 0 and an integer of (nPbH/nSbH−1) from 0. Assuming that the coordinates of the prediction unit are (xPb, yPb) and that the relative coordinates of the sub-block within the prediction unit are (xBlk, yBlk), the coordinates of the sub-block within the picture is represented by (xPb+xBlk*nSbW, yPb+yBlk*nSbH).

By inputting the coordinates (xPb+xBlk*nSbW, yPb+yBlk*nSbH) of the sub-block within the picture and the width nSbW and the height nSbH of the sub-block into (xPb, yPb), nPbW, and nPbH, the inter-view motion candidate deriving section 303711 performs inter-view motion candidate deriving processing in units of sub-blocks. In the above-described processing, for a sub-block for which the prediction available flag availableFlagLXInterView is 0, the inter-view motion candidate deriving section 303711 derives a vector spMvLX, a reference picture index spRefIdxLX, and a prediction use flag spPredFlagLX corresponding to the sub-block from the vector mvLXInterView, the reference picture index refIdxLXInterView, and the prediction use flag availableFlagLXInterView of the inter-view merge candidate according to the following equations.

spMvLX[xBlk][yBlk]=mvLXInterView spRefIdxLX[xBlk][yBlk]=refIdxLXInterView spPredFlagLX[xBlk][yBlk]=availableFlagLXInterView In these equations, (xBlk, yBlk) is a sub-block address, and takes a value of (nPbW/nSbW−1) from 0 and a value of (nPbH/nSbH−1) from 0. The vector mvLXInterView, the reference picture index refIdxLXInterView, and the prediction use flag availableFlagLXInterView of the inter-view merge candidate are derived as a result of the inter-view motion candidate deriving section 303711 performing inter-view motion candidate deriving processing by using (xPb+(nPbW/nSbW/2)*nSbW, yPb+(nPbH/nSbH/2)*nSbH) as the coordinates of a reference block. If the vector, the reference picture index, and the prediction use flag are derived in units of sub-blocks, the inter-view motion candidate deriving section 303711 included in a merge mode parameter deriving unit 1121 (prediction-vector deriving device) of this embodiment sets 0 in offsetFlag, which is a parameter for controlling the reference position, so that the reference position of the inter-view merge candidate (IV) can be used instead of that of the inter-view shift merge candidate (IVShift).

(Depth Merge Candidate)

The depth merge candidate D is derived by a depth merge candidate deriving section, which is not shown, within the extended merge candidate deriving section 30370. The depth merge candidate D is a merge candidate using a depth value dispDerivedDepthVal as a pixel value of a predicted image. The depth value dispDerivedDepthVal is obtained by converting a displacement mvLXD[xRef] [yRef] [0] of a prediction block at the coordinates (xRef, yRef), which is input from the displacement deriving unit 30363, according to the following equations.

dispVal=mvLXD[xRef][yRef][0]

dispDerivedDepthVal=DispToDepthF(refViewIdx, dispVal)

DispToDepthF(X, Y) is a function for deriving a depth value from a displacement Y if the picture having a view index X is a reference picture.

(Configuration of Inter-View Shift Merge Candidate of Comparative Example)

Figure 24:
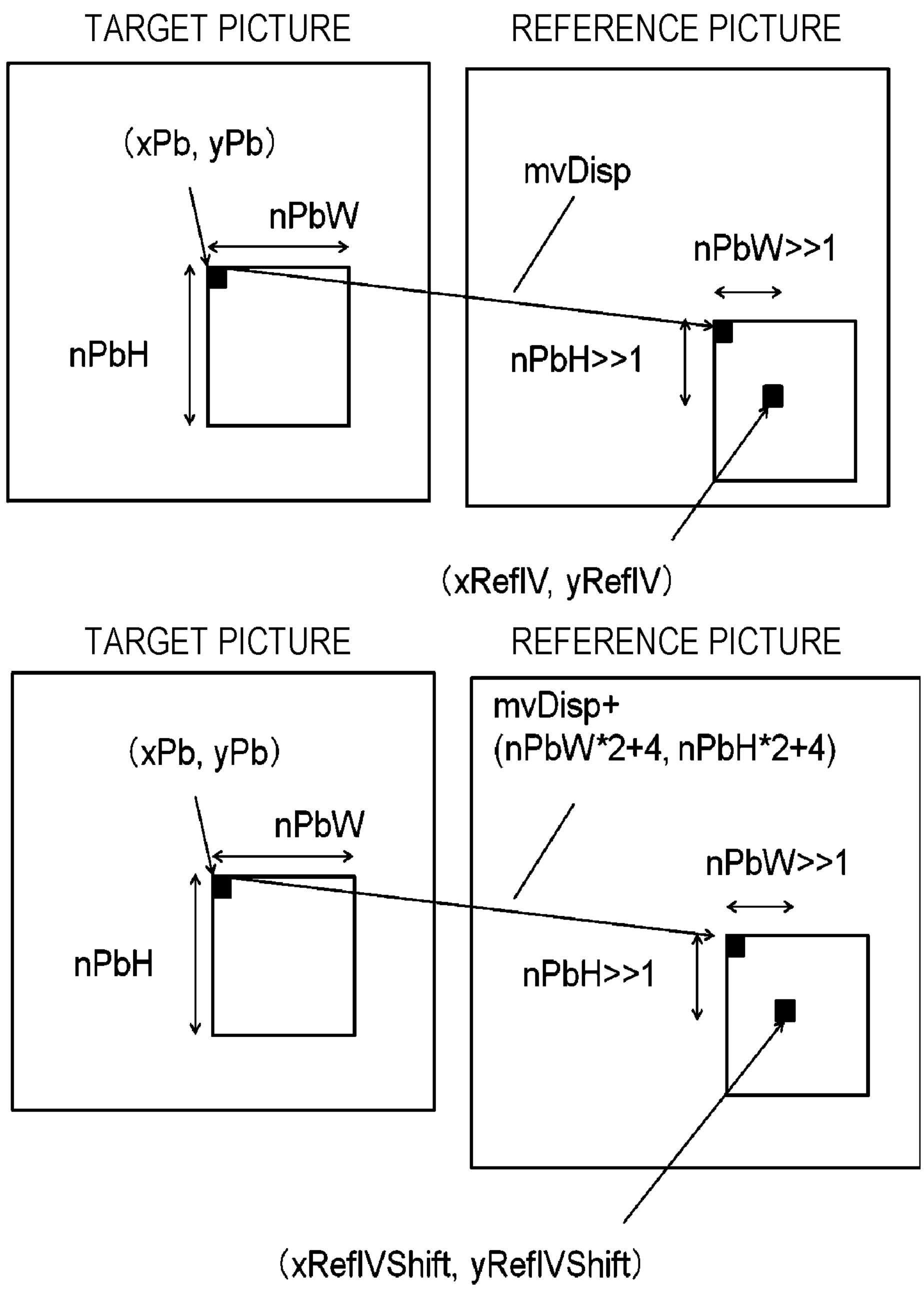
FIG. 24 illustrates the position (xRefIV, yRefIV) of an inter-view merge candidate IV and the position (xRefIVShift, yRefIVShift) of an inter-view shift merge candidate IVShift according to a comparative example.

In contrast to the inter-view shift merge candidate of this embodiment, an inter-view shift merge candidate of a comparative example will be discussed below. FIG. 24 illustrates the position (xRefIV, yRefIV) of an inter-view merge candidate IV and the position (xRefIVShift, yRefIVShift) of an inter-view shift merge candidate IVShift according to the comparative example.

As shown in FIG. 24, concerning the inter-view shift merge candidate of the comparative example, as a reference position of the inter-view shift merge candidate IVShift, the following disparity vector mvDisp' is derived by modifying a disparity vector mvDisp of a target block by using the size nPbW and nPbH of the target block.

mvDisp'[0]=mvDisp[0]+nPbW*2+4+2 mvDisp'[1]=mvDisp[1]+nPbH*2+4+2

Then, the position (xRef, yRef) of the reference block is derived by using the above-described modified disparity vector mvDisp' according to the following equations.

xRefFull=xPb+(nPbW>>1)+((mvDisp[0]+2)>>2)

yRefFull=yPb+(nPbH>>1)+((mvDisp[1]+2)>>2)

xRef=Clip3(0,PicWidthInSamplesL−1,(xRefFull>>3)<<3)

yRef=Clip3(0,PicHeightInSamplesL−1,(yRefFull>>3)<<3)

(Advantages of Merge Mode Parameter Deriving Unit of the Embodiment)

The merge mode parameter deriving unit 1121 (prediction-vector deriving device) of this embodiment derives the position (xRef, yRef) of a direct reference block from the position of a target block, a disparity vector mvDisp, and the size nPbW and nPbH of the target block, instead of deriving the position (xRef, yRef) of the reference block from the size nPbW and nPb of the target block and the modified disparity vector. Processing can thus be facilitated.

The position (xRef, yRef) of the direct reference block is derived by adding an integer disparity vector mvDisp to the position (xPb, yPb) of a target block and by adding a size nPbW+K and a size nPbH+K to the resulting position and then by normalizing the resulting reference position to a multiple of M. With this configuration, even in the case of normalizing the reference position to a multiple of 8 by such as performing three-bit right shift and then performing three-bit left shift, the position (xRef, yRef) of a reference block of the inter-view shift merge candidate IV becomes different from the position (xRef, yRef) of a reference block of the inter-view shift merge candidate IVShift in many cases. It is thus possible to differentiate the two merge candidates from each other.

(Displacement Merge Candidate)

A displacement merge candidate deriving section 30373 derives a displacement merge candidate (DI) and a shift displacement merge candidate (DIShift) from a displacement vector input from the displacement vector deriving section 352. Based on the input displacement vector (mvDisp[0], mvDisp[1]), the displacement merge candidate deriving section 30373 generates a vector having a horizontal component mvDisp[0] and a vertical component 0 as a displacement merge candidate (DI) according to the following equations.

mvL0DI[0]=DepthFlag?(mvDisp[0]+2)>>2:mvDisp[0]

mvL0DI[1]=0

In the above-described equations, DepthFlag is a variable which becomes 1 in the case of a depth picture and becomes 0 in the case of a texture picture.

The displacement merge candidate deriving section 30373 outputs, as a merge candidate, the generated vector and a reference picture index refIdxLX of a layer image pointed by the displacement vector (for example, an index of a base layer image having the same POC as a decoding target picture) to the merge candidate storage 303611.

The displacement merge candidate deriving section 30373 derives, as a shift displacement merge candidate (DI), a merge candidate having a vector generated by shifting the displacement merge candidate in the horizontal direction according to the following equations.

mvLXDIShift[0]=mvL0DI[0]+4 mvLXDIShift[1]=mvL0DI[1]

(VSP Merge Candidate)

A VSP merge candidate deriving section 30374 (hereinafter will be called a VSP predicting section 30374) derives a VSP (View Synthesis Prediction) merge candidate if the viewpoint synthesis prediction flag ViewSynthesisPredFlag is 1. That is, the VSP predicting section 30374 derives the viewpoint synthesis prediction available flag availableFlagVSP according to the following equations. The VSP predicting section 30374 then derives a VSP merge candidate only when availableFlagVSP is 1, and does not derive a VSP merge candidate if availableFlagVSP is 0. If one or more of the following conditions (1) through (5) are satisfied, availableFlagVSP is set to be 0.

(1) ViewSynthesisPredFlag is 0.
(2) DispAvailFlag is 0.
(3) ic_flag[xCb] [yCb] is 1.
(4) iv_res_pred_weight_idx[xCb] [yCb] is not 0.
(5) dbbp_flag[xCb] [yCb] is 1.

The VSP predicting section 30374 divides a prediction unit into multiple sub-blocks (sub prediction units), and sets a vector mvLX, a reference picture index refIdxLX, and a view ID RefViewIdx in units of divided sub-blocks. The VSP predicting section 30374 outputs the derived VSP merge candidates to the merge candidate storage 303611.

A partitioning section, which is not shown, of the VSP predicting section 30374 determines a sub-block size by selecting one of a landscape rectangle (8×4 in this example) and a portrait rectangle (4×8 in this example) in accordance with a split flag horSplitFlag derived by a split flag deriving section 353. More specifically, the partitioning section sets the width nSubBlkW and the height nSubBlkH of the sub-block according to the following equations.

nSubBlkW=horSplitFlag?8:4 nSubBlkH=horSplitFlag?4:8

For each sub-block having the derived sub-block size, a depth vector deriving section, which is not shown, of the VSP predicting section 30374 derives a vector mvLX[ ] by setting a motion vector disparitySampleArray[ ] derived by the depth DV deriving unit 351 to be a motion vector mvLX[0] of a horizontal component and by setting 0 to be a motion vector mvLX[1] of a vertical component, thereby deriving prediction parameters of the VSP merge candidate.

The VSP predicting section 30374 may perform control to determine whether to add a VSP merge candidate to the merge candidate list mergeCandList in accordance with the residual prediction index iv_res_pred_weight_idx and the illumination compensation flag ic_flag input from the inter prediction parameter decoding controller 3031. More specifically, the VSP predicting section 30374 may add a VSP merge candidate as an element of the merge candidate list mergeCandList only when the residual prediction index iv_res_pred_weight_idx is 0 and the illumination compensation flag ic_flag is 0.

The base merge candidate deriving section 30380 includes a spatial merge candidate deriving section 30381, a temporal merge candidate deriving section 30382, a combined merge candidate deriving section 30383, and a zero merge candidate deriving section 30384. Base merge candidates are merge candidates used in a base layer, that is, merge candidates used, not in scalable coding, but in HEVC (HEVC main profile, for example), and include at least a spatial merge candidate or a temporal merge candidate.

The spatial merge candidate deriving section 30381 reads prediction parameters (prediction use flag PredFlagLX, vector mvLX, and reference picture index refIdxLX) stored in the prediction parameter memory 307 according to the predetermined rules, and derives the read prediction parameters as spatial merge candidates. Prediction parameters to be read are parameters of each of neighboring blocks positioned within a predetermined range from a prediction unit (for example, all or some of the blocks positioned at the bottom left, top left, and top right sides of the prediction unit). The derived spatial merge candidates are stored in the merge candidate storage 303611.

Concerning the merge candidates derived by the temporal merge candidate deriving section 30382, the combined merge candidate deriving section 30383, and the zero merge candidate deriving section 30384, the VSP mode flag VspModeFlag is set to be 0.

The temporal merge candidate deriving section 30382 reads from the prediction parameter memory 307 prediction parameters of blocks within a reference image including the bottom-right coordinates of a prediction unit, and sets the read prediction parameters as merge candidates. The reference image can be specified by using a collocated picture col_ref_idx specified by a slice header and a reference picture index refIdxLX specified by RefPicListX[col_ref_idx] selected from a reference picture list RefPicListX. The derived merge candidates are stored in the merge candidate storage 303611.

The combined merge candidate deriving section 30383 derives, as L0 and L1 vectors, a combined merge candidate by combining vectors and reference picture indexes of two different derived merge candidates stored in the merge candidate storage 303611. The derived merge candidate is stored in the merge candidate storage 303611.

The zero merge candidate deriving section 30384 derives merge candidates for which the reference picture index refIdxLX is i and the X component and the Y component of the vector mvLX are both 0 until the maximum number of merge candidates are derived. Numbers are sequentially assigned to the value i indicating the reference picture index refIdxLX from 0. The derived merge candidates are stored in the merge candidate storage 303611.

The AMVP prediction parameter deriving unit 3032 reads vectors stored in the prediction parameter memory 307, based on the reference picture index refIdx, so as to generate a vector candidate list mvpListLX. The AMVP prediction parameter deriving unit 3032 selects, from among the vector candidates mvpListLX, a vector mvpListLX[mpv_lX_flag] indicated by a prediction vector flag mvp_LX_flag as a prediction vector mvpLX. The AMVP prediction parameter deriving unit 3032 adds the prediction vector mvpLX to a difference vector mvdLX input from the inter prediction parameter decoding controller so as to calculate a vector mvLX, and outputs the vector mvLX to the predicted image generator 308.

The inter prediction parameter decoding controller 3031 decodes the partition mode part_mode, the merge_flag merge_flag, the merge index merge_idx, the inter prediction identifier inter_pred_idc, the reference picture index refIdxLX, the prediction vector flag mvp_LX_flag, the difference vector mvdLX, and the inter prediction identifier inter_pred_idc indicating whether L0 prediction L0 (PRED_L0), L1 prediction (PRED_L1), or bi-prediction (PRED_BI) will be applied to a prediction unit.

A residual prediction index decoder decodes the residual prediction index iv_res_pred_weight_idx from the coded data by using the variable-length decoder 301 if the residual prediction flag IvResPredFlag is 1, and if a reference picture use flag RpRefPicAvailFlag indicating that a reference picture used for residual prediction is present in a DPB is 1, and if the coding unit CU is used for inter prediction (if CuPredMode[x0] [y0] is a mode other than intra prediction), and if the partition mode PartMode (part_mode) of the coding unit CU is 2N×2N.

rpEnableFlag=IvResPredFlag && RpRefPicAvailFlag && (CuPredMode[x0] [y0]!=MODE_INTRA)&&(PartMode==PART_2N×2N)

Otherwise, the residual prediction index decoder sets (infers) 0 in iv_res_pred_weight_idx. If the residual prediction flag IvResPredFlag is 1, the residual prediction index iv_res_pred_weight_idx is not decoded from the coded data and is set to be 0. The residual prediction flag IvResPredFlag can control the ON/OFF operation of residual prediction of the texture extension tool. The residual prediction index decoder outputs the decoded residual prediction index iv_res_pred_weight_idx to the merge mode parameter deriving unit 3036 and the inter predicted image generator 309. The residual prediction index is a parameter for varying the operation of residual prediction. In this embodiment, the residual prediction index is an index indicating a weight used for residual prediction, and takes a value of 0, 1, or 2. If iv_res_pred_weight_idx is 0, residual prediction is not conducted. Instead of varying the weight for residual prediction in accordance with the index, a vector used for residual prediction may be changed. Instead of using a residual prediction index, a flag (residual prediction flag) indicating whether residual prediction will be performed may be used.

An illumination compensation flag decoder decodes the illumination compensation flag ic_flag from the coded data by using the variable-length decoder 301 if the partition mode PartMode is 2N×2N. Otherwise, the illumination compensation flag decoder sets (infers) 0 in ic_flag. The illumination compensation flag decoder outputs the decoded illumination compensation flag ic_flag to the merge mode parameter deriving unit 3036 and the inter predicted image generator 309.

The displacement vector deriving section 352, the split flag deriving section 353, and the depth DV deriving unit 351, which form means for deriving prediction parameters, will now sequentially be discussed below.

(Displacement Vector Deriving Section 352)

The displacement vector deriving section 352 extracts a displacement vector (hereinafter will be indicated by MvDisp[x] [y] or mvDisp[x] [y]) of a coding unit (target CU) to which a target PU belongs, from blocks spatially or temporally adjacent to the coding unit. More specifically, the displacement vector deriving section 352 uses, as reference blocks, a block Col temporally adjacent to the target CU, a second block AltCol temporally adjacent to the target CU, a block A1 spatially left-adjacent to the target CU, and a block B1 spatially top-adjacent to the target CU, and sequentially extracts the prediction flags predFlagLX, the reference picture indexes refIdxLX and the vectors mvLX of these reference blocks. If the extracted vector mvLX of a reference block is a displacement vector, the displacement vector deriving section 352 outputs the displacement vector of this adjacent block. If a displacement vector is not found in the prediction parameters of an adjacent block, the displacement vector deriving section 352 reads prediction parameters of the next adjacent block and similarly derives a displacement vector. If the displacement vector deriving section 352 fails to derive a displacement vector in any of the adjacent blocks, it outputs a zero vector as a displacement vector. The displacement vector deriving section 352 also outputs the reference picture index and the view ID (RefViewIdx[x] [y]), where (xP, yP) are coordinates) of a block from which a displacement vector has been derived.

The displacement vector obtained as described above is called a NBDV (Neighbour Base Disparity Vector). The displacement vector deriving section 352 also outputs the displacement vector NBDV to the depth DV deriving unit 351. The depth DV deriving unit 351 derives a depth-orientated displacement vector disparitySampleArray. The displacement vector deriving section 352 updates the displacement vector by using the displacement vector disparitySampleArray as the horizontal component mvLX[0] of a motion vector. The updated motion vector is called DoNBDV (Depth Orientated Neighbour Base Disparity Vector). The displacement vector deriving section 352 outputs the displacement vector (DoNBDV) to the inter-layer merge candidate deriving section 30371, the displacement merge candidate deriving section 30373, and the VSP merge candidate deriving section 30374. The displacement vector deriving section 352 also outputs the obtained displacement vector (NBDV) to the inter predicted image generator 309.

(Split Flag Deriving Section 353)

The split flag deriving section 353 derives a split flag horSplitFlag by referring to a depth image corresponding to a target block. A description will be given, assuming that, as input into the split flag deriving section 353, the coordinates of the target block are (xP, yP), the width and height thereof are nPSW and nPSH, respectively, and the displacement vector thereof is mvDisp. The split flag deriving section 353 refers to a depth image if the width and the height of the target block are equal to each other. If, however, the width and the height of the target block are not equal to each other, the split flag deriving section 353 may derive the split flag horSplitFlag without referring to a depth image. Details of the split flag deriving section 353 will be discussed below.

The split flag deriving section 353 reads from the reference picture memory 306 a depth image refDepPels having the same POC as a decoding target picture and having the same view ID as the view ID (RefViewIdx) of a reference picture indicated by the displacement vector mvDisp.

The split flag deriving section 353 then derives the coordinates (xTL, yTL), which are displaced from the top-left coordinates (xP, yP) of the target block by an amount of the displacement vector MvDisp, according to the following equations.

xTL=xP+((mvDisp[0]+2)>>2)

yTL=yP+((mvDisp[1]+2)>>2)

where mvDisp[0] and mvDisp[1] are respectively the X component and the Y component of the displacement vector MvDisp. The derived coordinates (xTL, yTL) represent the coordinates of a block on the depth image refDepPels corresponding to the target block.

If the width nPSW or the height nPSH of the target block is not a multiple of 8, the split flag deriving section 353 sets a flag minSubBlkSizeFlag to be 1 according to the following equation.

minSubBlkSizeFlag=(nPSW %8!=0)||(nPSH %8!=0)

In a case in which the flag minSubBlkSizeFlag is 1, the split flag deriving section 353 sets 1 in horSplitFlag if the height of the target block is not a multiple of 8 (if nPSH % 8 is true) and otherwise sets 0 according to the following equation.

horSplitFlag=(nPSH % 8 !=0)

That is, if the height of the target block is not a multiple of 8 (if nPSH % 8 is true), 1 is set in horSplitFlag, and if the width of the target block is not a multiple of 8 (if nPSW % 8 is true), 0 is set in horSplitFlag.

The split flag deriving section 353 derives a sub-block size from the depth value. By comparing the four points (TL, TR, BL, and BR) at the corners of a prediction block, the split flag deriving section 353 derives the sub-block size. If the flag minSubBlkSizeFlag is 0, assuming that the pixel value of a depth image at the coordinates on the top left (TL) of the target block is refDepPelsP0, the pixel value on the top right (TR) thereof is refDepPelsP1, the pixel value on the bottom left (BL) thereof is refDepPelsP2, and the pixel value on the bottom right (BR) thereof is refDepPelsP3, the split flag deriving section 353 determines whether the following conditional equation (horSplitFlag) holds true.

horSplitFlag=(refDepPelsP0>refDepPelsP3)==(refDepPelsP1>refDepPelsP2)

The following equation in which the signs are changed from those of the above-described equation may alternatively be used to derive horSplitFlag.

horSplitFlag=(refDepPelsP0<refDepPelsP3)==(refDepPelsP1<refDepPelsP2)

The split flag deriving section 353 outputs horSplitFlag to the VSP predicting section 30374.

The split flag deriving section 353 may derive horSplitFlag in the following manner. If the width nPSW and the height nPSH of the target block are different from each other, the split flag deriving section 353 derives horSplitFlag in accordance with the width and the height of the target block by using the following expressions.

If nPSW>nPSH,horSplitFlag=1

Otherwise, if nPSH>nPSW,horSplitFlag=0

Otherwise, if the width and the height of the target block are equal to each other, the split flag deriving section 353 derives horSplitFlag by referring to a depth image according to the following equation.

horSplitFlag=(refDepPelsP0>refDepPelsP3)==(refDepPelsP1>refDepPelsP2)

In the case of viewpoint synthesis prediction, the target block used by the split flag deriving section 353 is a prediction unit. In the case of DBBP, however, the target block is a block for which the width and the height are equal to each other. In the case of DBBP, since the width and the height of the target block are equal to each other, the split flag deriving section 353 derives the split flag horSplitFlag by referring to the four corners of a depth image.

(Depth DV Deriving Unit 351)

The depth DV deriving unit 351 derives a disparity array disparitySamples (horizontal vector), which is a horizontal component of a depth-orientated displacement vector, by using a specified block (sub-block). A depth DV transform table DepthToDisparityB, the width nBlkW and the height nBlkH of the block, a split flag splitFlag, a depth image refDepPels, the coordinates (xTL, yTL) of a corresponding block on the depth image refDepPels, and the view ID refViewIdx are input into the depth DV deriving unit 351. The disparity array disparitySamples (horizontal vector) is output from the depth DV deriving unit 351. By performing the following processing, The depth DV deriving unit 351 sets pixels used for deriving the depth representative value maxDep for each target block. More specifically, assuming that the relative coordinates from a prediction block (xTL, yTL) on the top left side of the target block is (xSubB, ySubB), the depth DV deriving unit 351 finds the left X coordinate xP0, the right X coordinate xP1, the top Y coordinate yP0, and the bottom Y coordinate yP1 of the sub-block according to the following equations.

xP0=Clip3(0,pic_width_in_luma_samples−1,xTL+xSubB)

yP0=Clip3(0,pic_height_in_luma_samples−1,yTL+ySubB)

xP1=Clip3(0,pic_width_in_luma_samples−1,xTL+xSubB+nBlkW−1)

$$yP1=Clip3(0,pic\_height\_in\_luma\_samples-1,yTL+ySubB+nBlkH-1)$$

where pic_width_in_luma_samples and pic_height_in_luma_samples respectively denote the width and the height of the image.

The depth DV deriving unit 351 then derives the depth representative value maxDep of the target block. More specifically, the depth DV deriving unit 351 derives the representative value maxDep, which is the maximum value among the pixel values refDepPels[xP0] [yP0], refDepPels [xP0] [yP1], refDepPels[xP1] [yP0], and refDepPels[xP1] [yP1] of the depth image at four points of the corners and neighboring areas of the sub-block, according to the following equations.

$$maxDep=0$$

$$maxDep=Max(maxDep,refDepPels[xP0][yP0])$$

$$maxDep=Max(maxDep,refDepPels[xP0][yP1])$$

$$maxDep=Max(maxDep,refDepPels[xP1][yP0])$$

$$maxDep=Max(maxDep,refDepPels[xP1][yP1])$$

The function Max(x, y) is a function which returns x if a first argument x is equal to or greater than a second argument y and returns y otherwise.

By using the depth representative value maxDep, the depth DV transform table DepthToDisparityB, and the view ID refViewIdx of a layer indicated by the displacement vector (NBDV), the depth DV deriving unit 351 derives a disparity array disparitySamples, which is a horizontal component of a depth-orientated displacement vector, for each pixel (x, y) (x is 0 to nBlkW−1 and y is 0 to nBlkH−1) within a target block according to the following equation.

$$disparitySamples[x][y]=DepthToDisparityB[refViewIdx][maxDep] \quad \text{(Equation A)}$$

The depth DV deriving unit 351 outputs the derived disparity array disparitySamples[ ] to the displacement vector deriving section 352 as the horizontal component of the displacement vector DoNBDV. The depth DV deriving unit 351 also outputs the derived disparity array disparitySamples[ ] to the VSP predicting section 30374 as the horizontal component of the displacement vector.

(Inter Predicted Image Generator 309)

Figure 11:
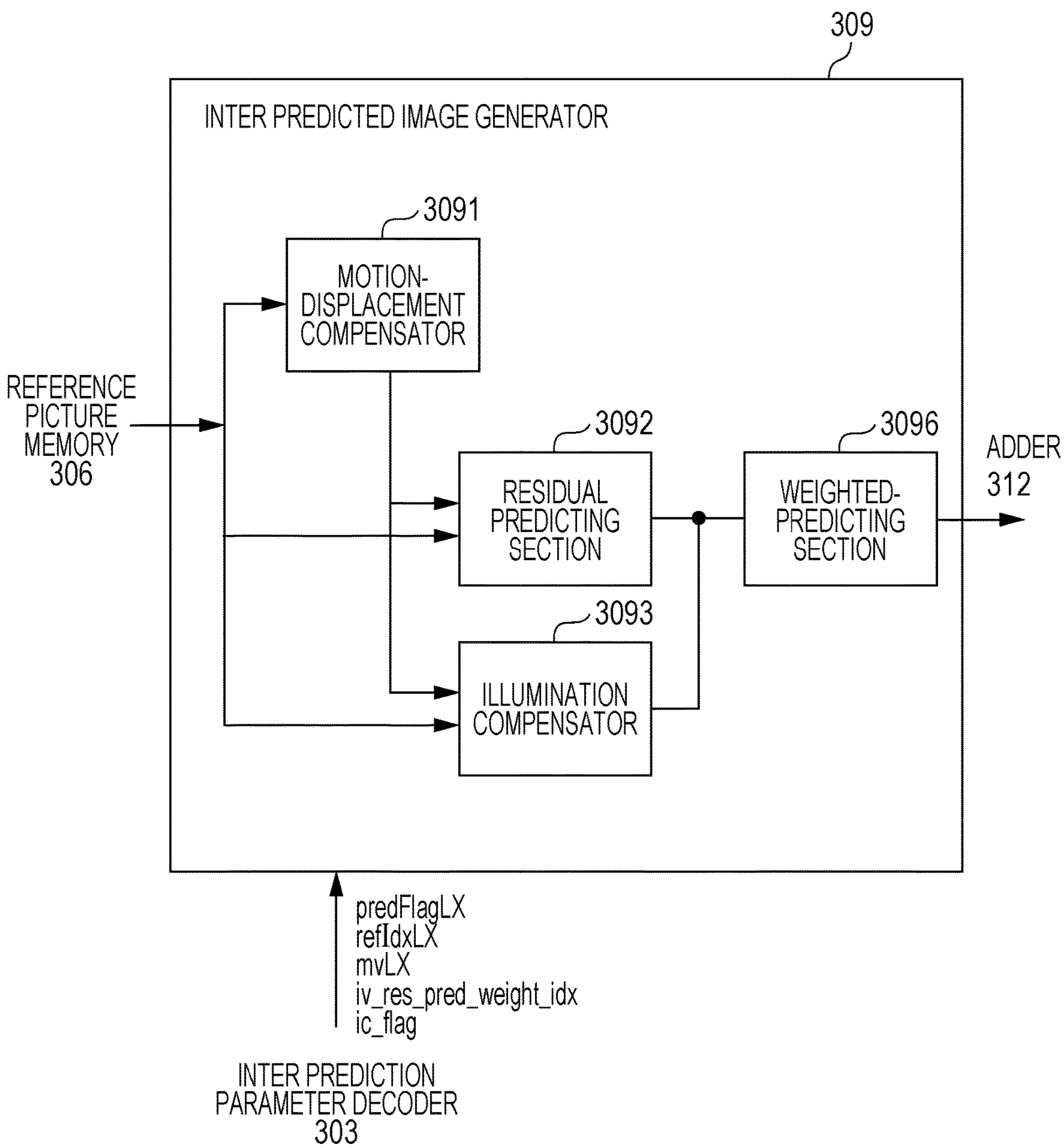
FIG. 11 is a schematic diagram illustrating the configuration of an inter predicted image generator 309 according to this embodiment.

FIG. 11 is a schematic diagram illustrating the configuration of the inter predicted image generator 309 according to this embodiment. The inter predicted image generator 309 includes a motion-displacement compensator 3091, a residual predicting section 3092, an illumination compensator 3093, and a weighted-predicting section 3096.

The inter predicted image generator 309 performs the following processing in units of sub-blocks if a sub-block motion compensation flag subPbMotionFlag input from the inter prediction parameter decoder 303 is 1. The inter predicted image generator 309 performs the following processing according to the prediction unit if the sub-block motion compensation flag subPbMotionFlag is 0. The sub-block motion compensation flag subPbMotionFlag is set to be 1 when an inter-view merge candidate or a VSP merge candidate is selected as the merge mode. The inter predicted image generator 309 derives a predicted image predSamples by using the motion-displacement compensator 3091 based on prediction parameters. If the residual prediction index iv_res_pred_weight_idx is not 0, the inter predicted image generator 309 sets 1 in a residual prediction flag resPredFlag, which indicates that residual prediction will be performed, and then outputs the residual prediction flag resPredFlag to the motion-displacement compensator 3091 and the residual predicting section 3092. In contrast, if the residual prediction index iv_res_pred_weight_idx is 0, the inter predicted image generator 309 sets 0 in the residual prediction flag resPredFlag, and outputs it to the motion-displacement compensator 3091 and the residual predicting section 3092.

In the case of uni-prediction (predFlagL0=1 or predFlagL1=1), the motion-displacement compensator 3091, the residual predicting section 3092, the illumination compensator 3093 derive an L0 motion-compensated image predSamplesL0 or an L1 motion-compensated image predSamplesL0, and output predSamplesL0 or predSamplesL0 to the weighted-predicting section 3096. In the case of bi-prediction (predFlagL0=1 and predFlagL1=1), the motion-displacement compensator 3091, the residual predicting section 3092, the illumination compensator 3093 derive an L0 motion-compensated image predSamplesL0 and an L1 motion-compensated image predSamplesL0, and output predSamplesL0 and predSamplesL0 to the weighted-predicting section 3096. In the case of uni-prediction, the weighted-predicting section 3096 derives a predicted image predSamples from the single motion-compensated image predSamplesL0 or predSamplesL0. In the case of bi-prediction, the weighted-predicting section 3096 derives a predicted image predSamples from the two motion-compensated images predSamplesL0 and predSamplesL0.

(Motion-Displacement Compensation)

The motion-displacement compensator 3091 generates a motion-prediction image predSampleLX, based on the prediction use flag predFlagLX, the reference picture index refIdxLX, and the vector mvLX (which is a motion vector or a displacement vector). Based on the position of a prediction unit of a reference picture specified by the reference picture index refIdxLX as a start point, the motion-displacement compensator 3091 reads from the reference picture memory 306 a block located at a position displaced from this start point by an amount of the vector mvLX and interpolates the read block, thereby generating a motion-prediction image. If the vector mvLX is not an integer vector, the motion-displacement compensator 3091 applies a filter for generating pixels at decimal positions, which is called a motion compensation filter (or a displacement compensation filter), to the vector mvLX, thereby generating a predicted image. Typically, if the vector mvLX is a motion vector, the above-described processing is called motion compensation, and if the vector mvLX is a displacement vector, the above-described processing is called displacement compensation. Motion compensation and displacement compensation will collectively be called motion-displacement compensation. Hereinafter, a predicted image subjected to L0 prediction will be called predSamplesL0, and a predicted image subjected to L1 prediction will be called predSamplesL0. If the two predicted images are not distinguished from each other, a predicted image will be called predSamplesLX. A description will be given of an example in which residual prediction and illumination compensation will be performed on a predicted image predSamplesLX generated by the motion-displacement compensator 3091. Output images obtained as a result of performing residual prediction and illumination compensation will also be called predicted images predSamplesLX. If an input image and an output image are distinguished from each other when performing residual prediction and illumination compensation, which will be discussed later, the input image will be called predSamplesLX and the output image will be called predSamplesLX'.

If the residual prediction flag resPredFlag is 0, the motion-displacement compensator 3091 generates a motion-compensated image predSamplesLX by using an 8-tap motion compensation filter for luminance components and a 4-tap motion compensation filter for chrominance components. If the residual prediction flag resPredFlag is 1, the motion-displacement compensator 3091 generates a motion-compensated image predSamplesLX by using a 2-tap motion compensation filter for both of the luminance components and the chrominance components.

If the sub-block motion compensation flag subPbMotionFlag is 1, the motion-displacement compensator 3091 performs motion compensation in units of sub-blocks. More specifically, the vector, the reference picture index, and the reference list use flag of the sub-block at coordinates (xCb, yCb) are derived from the following equations.

MvL0[xCb+x][yCb+y]=subPbMotionFlag?SubPbMvL0[xCb+x][yCb+y]:mvL0

MvL1[xCb+x][yCb+y]=subPbMotionFlag?SubPbMvL1[xCb+x][yCb+y]:mvL1

RefIdxL0[xCb+x][yCb+y]=subPbMotionFlag?SubPbRefIdxL0[xCb+x][yCb+y]:refIdxL0

RefIdxL1[xCb+x][yCb+y]=subPbMotionFlag?SubPb RefIdxL1[xCb+x][yCb+y]:refIdxL1

PredFlagL0[xCb+x][yCb+y]=subPbMotionFlag?SubPbPredFlagL0[xCb+x][yCb+y]:predFlagL0

PredFlagL1[xCb+x][yCb+y]=subPbMotionFlag?SubPbPredFlagL1[xCb+x][yCb+y]:predFlagL1 where SubPbMvLX, SubPbRefIdxLX, and SubPbPredFlagLX (X is 0, 1) respectively correspond to subPbMvLX, subPbRefIdxLX, and subPbPredFlagLX discussed when referring to the inter-layer merge candidate deriving section 30371.

(Residual Prediction)

If the residual prediction flag resPredFlag is 1, the residual predicting section 3092 performs residual prediction. If the residual prediction flag resPredFlag is 0, the residual predicting section 3092 outputs an input predicted image predSamplesLX without performing further processing. In refResSamples residual prediction, a residual of the motion-compensated image predSamplesLX generated by motion prediction or displacement prediction is estimated, and the estimated residual is added to the predicted image predSamplesLX of a target layer. More specifically, if the prediction unit uses motion prediction, it is assumed that a residual comparable to that of a reference layer will be generated in the target layer, and the residual of a derived reference layer is used as the estimated value of the residual of the target layer. If the prediction unit uses displacement prediction, the residual difference between the picture of the target layer and that of a reference layer having a time (POC) different from the target picture is used as the estimated value of the residual of the target layer.

If the sub-block motion compensation flag subPbMotionFlag is 1, the residual predicting section 3092 performs residual prediction in units of sub-blocks, as in the motion-displacement compensator 3091.

Figure 12:
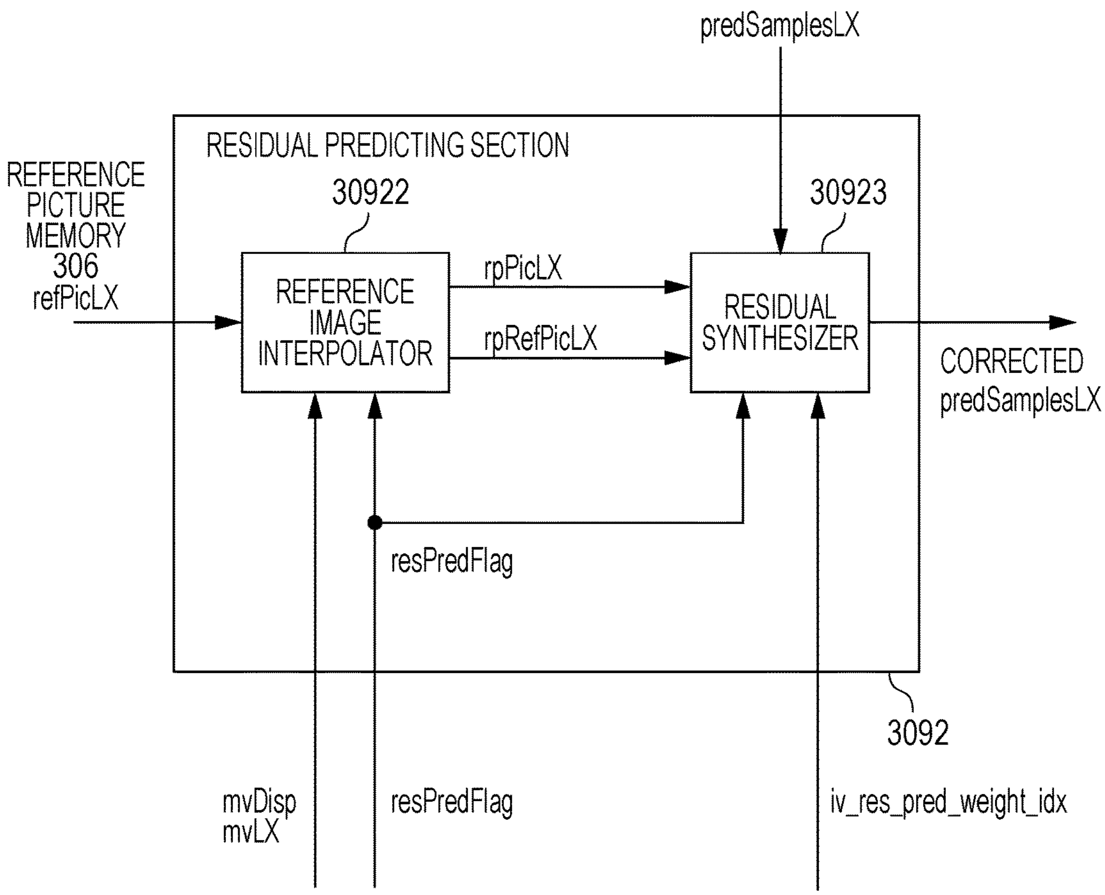
FIG. 12 is a schematic diagram illustrating the configuration of a residual predicting section 3092 according to this embodiment.

FIG. 12 is a block diagram illustrating the configuration of the residual predicting section 3092. The residual predicting section 3092 includes a reference image interpolator 30922 and a residual synthesizer 30923.

If the residual prediction flag resPredFlag is 1, the reference image interpolator 30922 generates two residual-prediction motion-compensated images (a corresponding block rpPicLX and a reference block rpRefPicLX) by using the vector mvLX and a residual-prediction displacement vector mvDisp input from the inter prediction parameter decoder 303 and a reference picture stored in the reference picture memory 306.

The residual predicting section 3092 derives an inter-view prediction flag ivRefFlag, which is a flag indicating whether motion prediction or displacement prediction will be applied to the target block, from (DiffPicOrderCnt(currPic, RefPicListX[refIdxLX])==0). DiffPicOrderCnt(X, Y) indicates a difference in the POC between picture X and picture Y (this definition will also be applied in the following description of the specification). If the POC of the target picture currPic and the POC of the reference picture RefPicListX[refIdxLX] indicated by the reference picture index refIdxLX and the reference picture list RefPicListX are 0, the residual predicting section 3092 determines that displacement prediction will be applied to the target block, and sets 1 in ivRefFlag. Otherwise, the residual predicting section 3092 determines that motion prediction will be applied to the target block, and sets 0 in ivRefFlag.

Figure 13:
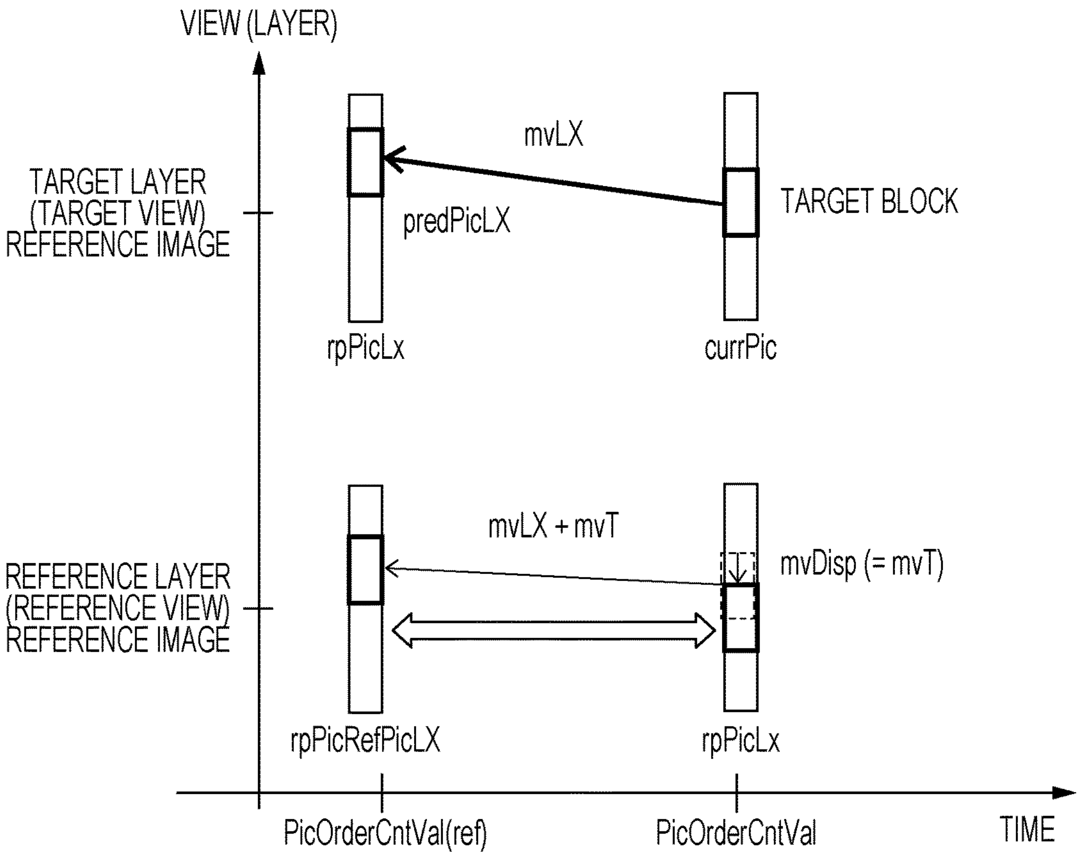
FIG. 13 is a conceptual diagram for explaining residual prediction (motion vectors) according to this embodiment.

FIG. 13 is a diagram for explaining a corresponding block rpPicLX and a reference block rpRefPicLX when the vector mvLX is a motion vector (inter-view prediction flag ivRefFlag is 0). As shown in FIG. 13, based on the position of the prediction unit of the image on the reference layer as a start point, the corresponding block of the prediction unit on the target layer is located at a position displaced from this start point by an amount of the displacement vector mvDisp, which is a vector indicating the positional relationship between the reference layer and the target layer.

Figure 14:
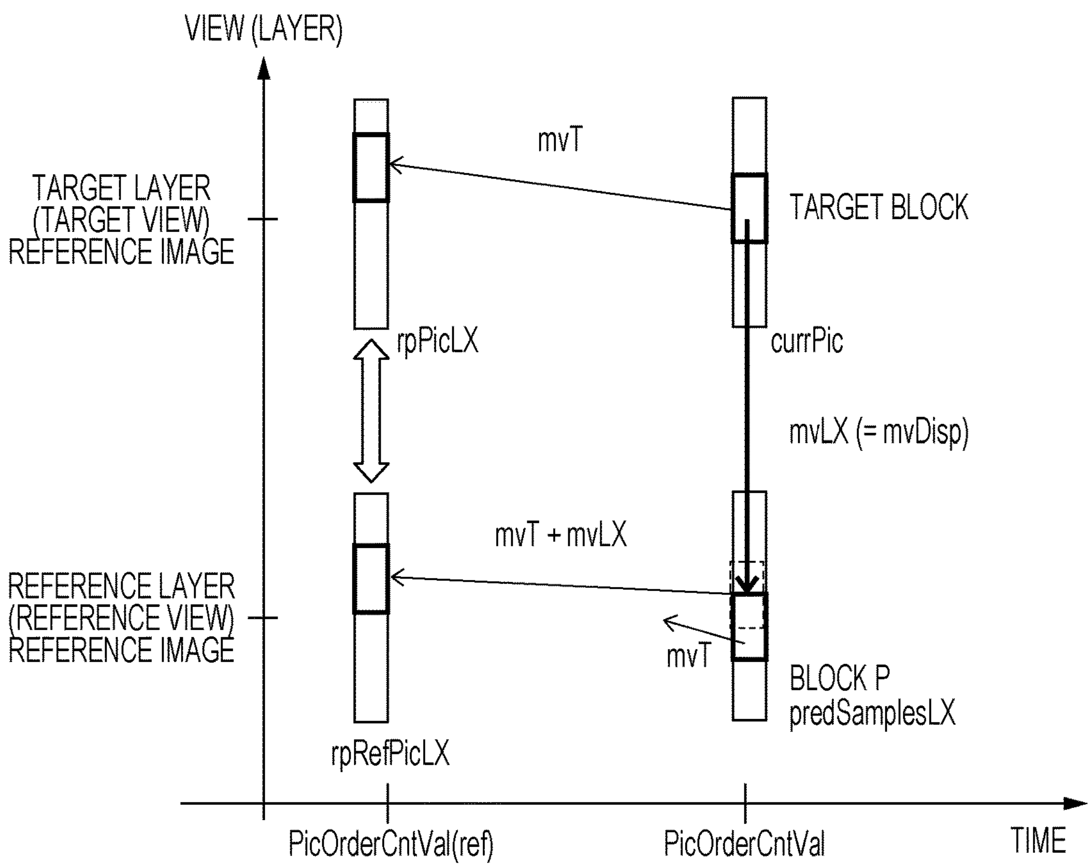
FIG. 14 is a conceptual diagram for explaining residual prediction (disparity vectors) according to this embodiment.

FIG. 14 is a diagram for explaining a corresponding block rpPicLX and a reference block rpRefPicLX when the vector mvLX is a displacement vector (inter-view prediction flag ivRefFlag is 1). As shown in FIG. 14, the corresponding block rpPicLX is a block on the reference picture rpPic having a different time from that of the target picture and having the same view ID as the target picture. The residual predicting section 3092 derives a vector mvT of a prediction unit on the picture mvPicT pointed by the vector mvLX (=displacement vector mvDisp) of the target block. The corresponding block rpPicLX is located at a position displaced from the position of the prediction unit (target block) by an amount of the vector mvT.

(Deriving of Reference Picture for Residual Prediction)

The residual predicting section 3092 derives reference pictures rpPic and rpPicRef, which will be referred to when deriving residual-prediction motion-compensated images (rpPicLX and rpRefPicLX), and vectors mvRp and mvRpRef indicating the position of a reference block (relative coordinates of the reference block based on the coordinates of a target block).

The residual predicting section 3092 sets, as the reference picture rpPic, a picture having the same display time (POC) as the target picture to which a target block belongs or having the same view ID as the target picture.

More specifically, if motion prediction is applied to the target block (if the inter-view prediction flag ivRefFlag is 0), the residual predicting section 3092 derives the reference picture rpPic, based on the conditions that PicOrderCntVal, which is the POC of the reference picture rpPic, is equal to PicOrderCntVal, which is the POC of the target picture, and that the view ID of the reference picture rpPic and the reference view ID RefViewIdx[xP] [yP] of the prediction unit are equal to each other (the view ID of the target picture is different from this reference view ID). The residual predicting section 3092 also sets a displacement vector MvDisp in the vector mvRp of the reference picture rpPic.

If displacement prediction is applied to the target block (if the inter-view prediction flag ivRefFlag is 1), the residual predicting section 3092 sets, as the reference picture rpPic, a reference picture used for generating a predicted image of a target block. That is, assuming that the reference index of the target block is RpRefIdxLY and the reference picture list thereof is RefPicListY, the reference picture rpPic is derived from RefPicListY[RpRefIdxLY]. The residual predicting section 3092 also includes a residual-predicting-vector deriving section 30924, which is not shown. The residual-predicting-vector deriving section 30924 derives a vector mvT, which is pointed by the vector mvLX (equal to the displacement vector MvDisp) of the target block and which is a vector of a prediction unit on a picture having the same POC as the target picture and having a different view ID from that of the target picture. The residual-predicting-vector deriving section 30924 then sets this motion vector mvT in the vector mvRp of the reference picture rpPic.

Then, the residual predicting section 3092 sets, as the reference picture rpPicRef, a reference picture having a different display time (POC) from that of the target picture and having a different view ID from that of the target picture.

More specifically, if motion prediction is applied to the target block (if the inter-view prediction flag ivRefFlag is 0), the residual predicting section 3092 derives the reference picture rpPicRef, based on the conditions that the POC of the reference picture rpPicRef and the POC of the reference picture RefPicListY[RpRefIdxLY] of the target block are equal to each other and that the view ID of the reference picture rpPicRef and the view ID RefViewIdx[xP] [yP] of the reference picture of the displacement vector MvDisp are equal to each other. The residual predicting section 3092 then sets a sum (mvRp+mvLX) of the vector mvRp and a vector mvLX, which is obtained by scaling the motion vector of the prediction block, in the vector mvRpRef of the reference picture rpPicRef.

If displacement prediction is applied to the target prediction unit (if the inter-view prediction flag ivRefFlag is 1), the residual predicting section 3092 derives the reference picture rpPicRef, based on the conditions that the POC of the reference picture rpPicRef and the POC of the reference picture rpPic are equal to each other and that the view ID of the reference picture rpPicRef and the view ID RefViewIdx [xP] [yP] of the prediction unit are equal to each other. The residual predicting section 3092 then sets a sum (mvRp+mvLX) of the vector mvRp and the motion vector mvLX of the prediction block in the vector mvRpRef of the reference picture rpPicRef.

That is, the residual predicting section 3092 derives mvRp and mvRpRef in the following manner.

If the inter-view prediction flag ivRefFlag is 0, $$mvRp=MvDisp \quad \text{Equation (B-1)}$$

$$mvRpRef=mvRp+mvLX(=mvLX+MvDisp) \quad \text{Equation (B-2)}$$

If the inter-view prediction flag ivRefFlag is 1, $$mvRp=mvT \quad \text{Equation (B-3)}$$

$$mvRpRef=mvRp+mvLX(=mvLX+mvT) \quad \text{Equation (B-4)}$$

(Residual-Predicting-Vector Deriving Section 30924)

The residual-predicting-vector deriving section 30924 derives a vector mvT of a prediction unit on a picture different from a target picture. By using, as input, a reference picture, the coordinates (xP, yP) of a target block, the size nPSW and nPSH of the target block, and a vector mvLX, the residual-predicting-vector deriving section 30924 derives the vector mvT and the view ID from motion compensation parameters (a vector, a reference picture index, and a view ID) of a prediction unit on the reference picture. The residual-predicting-vector deriving section 30924 derives the coordinates (xRef, yRef) of the reference block according to the following equations, as the center coordinates of a block on the reference picture which is located at a position displaced from the target block by an amount of the vector mvLX.

$$xRef=Clip3(0,PicWidthInSamplesL-1,xP+(nPSW>>1)+((mvDisp[0]+2)>>2))$$

$$yRef=Clip3(0,PicHeightInSamplesL-1,yP+(nPSH>>1)+((mvDisp[1]+2)>>2))$$

The residual-predicting-vector deriving section 30924 derives the vector mvLX of a refPU, which is a prediction unit including the coordinates (xRef, yRef) of the reference block, and the reference picture index refPicLX.

If displacement prediction is applied to the target prediction unit (DiffPicOrderCnt(currPic, refPic) is 0) and if motion prediction is applied to the reference prediction unit refPU (DiffPicOrderCnt(refPic, refPicListRefX[refIdxLX]) is other than 0), the vector of the refPU is set to be mvT, and a reference available flag availFlagT is set to be 1. This processing makes it possible to derive, as the vector mvT, the vector of a block using a picture having the same POC as the target picture and having a different view ID from that of the target picture as a reference picture.

The residual-predicting-vector deriving section 30924 derives the vector of a prediction unit on a picture different from the target picture. The residual-predicting-vector deriving section 30924 derives the coordinates (xRef, yRef) of a reference block in the following manner, by using as input the coordinates (xP, yP) of the target block, the size nPbW and nPbH of the target block, and the displacement vector mvDisp.

$$xRef=Clip3(0,PicWidthInSamplesL-1,xP+(nPSW>>1)+((mvDisp[0]+2)>>2))$$

$$yRef=Clip3(0,PicHeightInSamplesL-1,yP+(nPSH>>1)+((mvDisp[1]+2)>>2))$$

The residual-predicting-vector deriving section 30924 derives the vector mvLX of a refPU, which is a prediction unit including the coordinates (xRef, yRef) of the reference block, and the reference picture index refPicLX.

If motion prediction is applied to the target prediction unit (DiffPicOrderCnt(currPic, refPic) is other than 0) and if displacement prediction is applied to the reference prediction unit refPU (DiffPicOrderCnt(refPic, refPicListRefX[refIdxLX]) is 0), the reference available flag availFlagT is set to be 1. This makes it possible to derive, as the vector mvT, the vector of a block using a picture having the same POC as the target picture and having a different view ID from that of the target picture as a reference picture.

(Reference Image Interpolator 30922)

The reference image interpolator 30922 generates an interpolated image of the reference block rpPicLX by setting the above-described vector mvC in the vector mvLX. As the coordinates (x, y) of a pixel of the interpolated image, the reference image interpolator 30922 derives a pixel located at a position displaced by an amount of the vector mvLX of a prediction unit by using linear interpolation (bilinear interpolation). Considering that the displacement vector LX has a decimal precision of 1/4 pels, the reference image interpolator 30922 derives an X coordinate xInt and a Y coordinate yInt of a pixel R0 having an integer precision when the coordinates of a pixel of a prediction unit are (xP, yP) and also derives the fractional part xFrac of the X component and the fractional part yFrac of the Y component of the displacement vector mvDisp according to the following equations (equations C-1):

xInt=xPb+(mvLX[0])>>2)

yInt=yPb+(mvLX[1])>>2)

xFrac=mvLX[0]& 3 yFrac=mvLX[1]& 3 where X & 3 is a mathematical expression for only extracting the lowest two bits of X.

Then, considering that the vector mvLX has a decimal precision of 1/4 pels, the reference image interpolator 30922 generates an interpolation pixel predPartLX[x] [y]. The reference image interpolator 30922 first derives the coordinates of integer pixels A (xA, yB), B(xB, yB), C(xC, yC), and D(xD, yD) according to the following equations (equations C-2).

xA=Clip3(0,picWidthInSamples−1,xInt)

xB=Clip3(0,picWidthInSamples−1,xInt+1)

xC=Clip3(0,picWidthInSamples−1,xInt)

xD=Clip3(0,picWidthInSamples−1,xInt+1)

yA=Clip3(0,picHeightInSamples−1,yInt)

yB=Clip3(0,picHeightInSamples−1,yInt)

yC=Clip3(0,picHeightInSamples−1,yInt+1)

yD=Clip3(0,picHeightInSamples−1,yInt+1)

The integer pixel A is a pixel corresponding to the pixel R0, and the integer pixels B, C, and D are pixels having an integer precision positioned adjacent to the integer pixel A on the right, bottom, and bottom right sides of the integer pixel A. The reference image interpolator 30922 reads from the reference picture memory 306 the reference pixels refPicLX[xA] [yA], refPicLX[xB] [yB], refPicLX[xC] [yC], and refPicLX[xD] [yD] corresponding to the integer pixels A, B, C, and D, respectively.

By using the reference pixels refPicLX[xA] [yA], refPicLX[xB] [yB], refPicLX[xC] [yC], and refPicLX[xD] [yD] and the fractional part xFrac of the X component and the fractional part yFrac of the Y component of the vector mvLX, the reference image interpolator 30922 derives the interpolation pixel prePartLX[x] [y], which is a pixel located at a position displaced from the pixel R0 by an amount of the fractional part of the vector mvLX, based on linear interpolation (bilinear interpolation). More specifically, the reference image interpolator 30922 derives the interpolation pixel prePartLX[x] [y] according to the following equations (C-3).

predPartLX[x][y]=(refPicLX[xA][yA]*(8−xFrac)*(8−yFrac)+refPicLX[xB][yB]*(8−yFrac)*xFrac+refPicLX[xC][yC]*(8−xFrac)*yFrac+refPicLX[xD][yD]*xFrac*yFrac)>>6

In the above-described example, the reference image interpolator 30922 derives the interpolation pixel by one-step bilinear interpolation using pixels at four positions around the target pixel. Alternatively, the reference image interpolator 30922 may perform two-step linear interpolation, that is, horizontal linear interpolation and vertical linear interpolation, to generate a residual-prediction interpolated image.

The reference image interpolator 30922 performs the above-described interpolation pixel deriving processing for each pixel within a prediction unit, and groups a set of interpolation pixels into an interpolation block predPartLX. The reference image interpolator 30922 outputs the derived interpolation block predPartLX to the residual synthesizer 30923 as the corresponding block rpPicLX.

The reference image interpolator 30922 derives a reference block rpRefPicLX by performing processing similar to the processing for deriving the corresponding block rpPicLX, except that the displacement vector mvLX is replaced by the vector mvR. The reference image interpolator 30922 then outputs the reference block rpRefPicLX to the residual synthesizer 30923.

(Residual Synthesizer 30923)

If the residual prediction flag resPredFlag is 1, the residual synthesizer 30923 derives a residual from the difference between the two residual-prediction motion-compensated images (rpPicLX and rpRefPicLX) and adds this residual to the motion-compensated image, thereby deriving a predicted image. More specifically, the residual synthesizer 30923 derives a corrected predicted image predSamplesLX' from the predicted image predSamplesLX, the corresponding block rpPicLX, the reference block rpRefPicLX, and the residual prediction index iv_res_pred_weight_idx. The corrected predicted image predSamplesLX' is determined by using the following equation:

predSamplesLX'[x][y]=predSamplesLX[x][y]+((rpPicLX[x][y]−rpRefPicLX[x][y]>>(iv_res_pred_weight_idx−1))

where x is 0 to (the width of the prediction block−1) and y is 0 to (the height of the prediction block−1). If the residual prediction flag resPredFlag is 0, the residual synthesizer 30923 outputs the predicted image predSamplesLX according to the following equation without performing correction processing.

predSamplesLX'[x][y]=predSamplesLX[x][y]

(Illumination Compensation)

If the illumination compensation flag ic_flag is 1, the illumination compensator 3093 performs illumination compensation on the input predicted image predSamplesLX. If the illumination compensation flag ic_flag is 0, the illumination compensator 3093 outputs the input predicted image predSamplesLX without performing illumination compensation.

(Weighted Prediction)

In the case of uni-prediction (predFlagL0=1/predFlagL1=0 or predFlagL0=0/predFlagL1=1), the weighted-predicting section 3096 derives a predicted image predSamples from the L0 motion-compensated image predSampleL0 or the L1 motion-compensated image predSampleL1. More specifically, the weighted-predicting section 3096 derives the predicted image predSamples by using the following equation for L0 prediction and the following equation for L1 prediction:

predSamples[x][y]=Clip3(0,(1<<bitDepth)−1,predSamplesL0[x][y]*w0+o0))

predSamples[x][y]=Clip3(0,(1<<bitDepth)−1,predSamplesL0[x][y]*w1+o1))

where w0 and w1 are weights and o0 and o1 are offsets, each of which is coded by a parameter set, and bitDepth is the value indicating the bit depth.

In the case of bi-prediction (predFlagL0=1/predFlagL1=1), the weighted-predicting section 3096 generates a predicted image from the L0 motion-compensated image predSampleL0 and the L1 motion-compensated image predSampleL1.

(predSamplesL0[x][y]*w0+predSamplesL0[x][y]*w1+((o0+o1+1)<<log 2Wd))>>(log 2Wd+1))

where w0 and w1 are weights, o0 and o1 are offsets, and log 2Wd is a shift value, each of which is coded by a parameter set, and bitDepth is the value indicating the bit depth.

(Configuration of Image Coding Apparatus)

Figure 22:
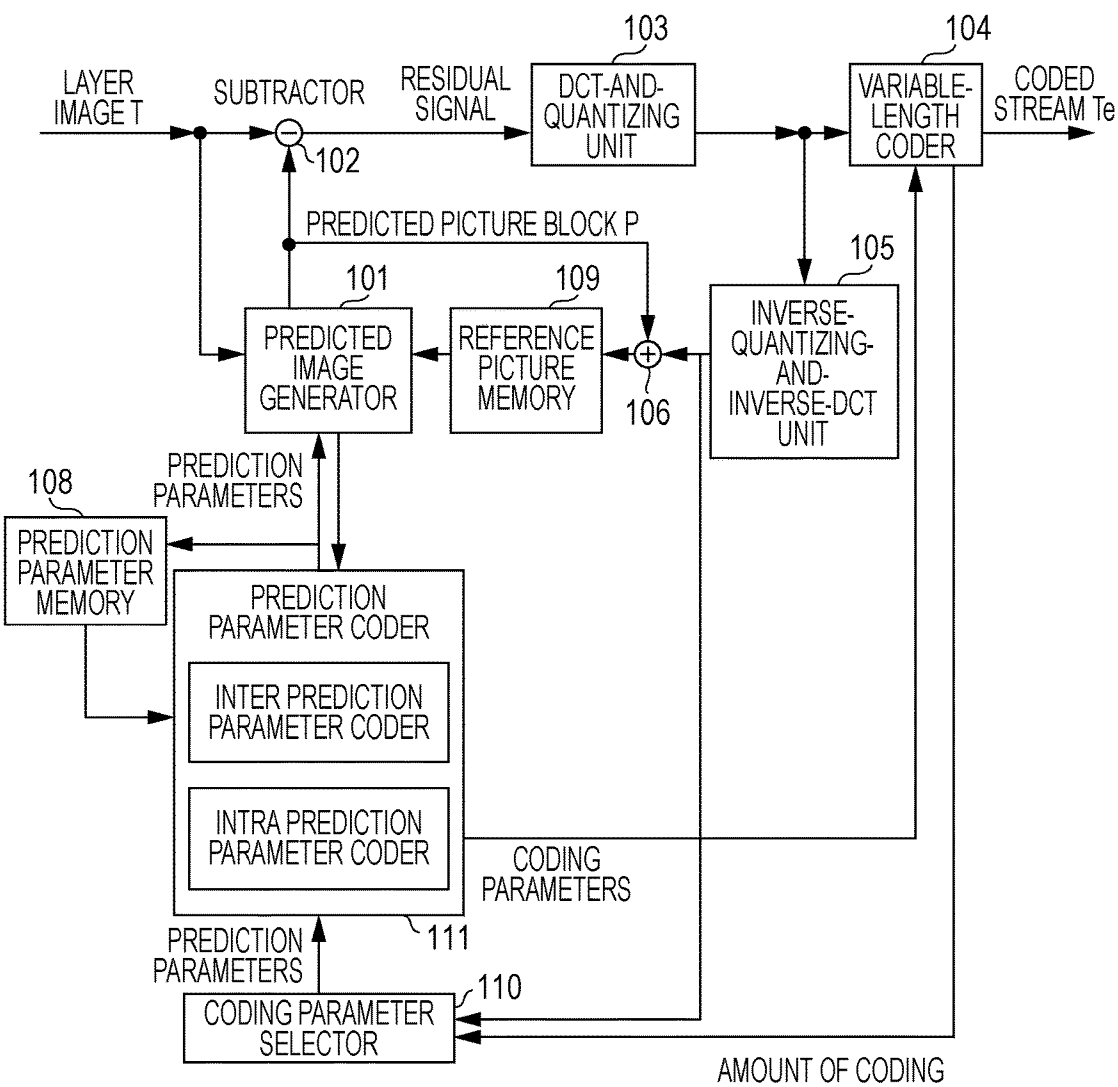
FIG. 22 is a block diagram illustrating the configuration of an image coding apparatus 11 according to this embodiment.

The configuration of the image coding apparatus 11 according to this embodiment will now be described below. FIG. 22 is a block diagram illustrating the configuration of the image coding apparatus 11 according to this embodiment. The image coding apparatus 11 includes a predicted image generator 101, a subtractor 102, a DCT-and-quantizing unit 103, a variable-length coder 104, an inverse-quantizing-and-inverse-DCT unit 105, an adder 106, a prediction parameter memory (a prediction parameter storage unit and a frame memory) 108, a reference picture memory (a reference image storage unit and a frame memory) 109, a coding parameter selector 110, and a prediction parameter coder 111. The prediction parameter coder 111 includes an inter prediction parameter coder 112 and an intra prediction parameter coder 113.

Concerning a picture for each viewpoint of layer images T input from an external source, the predicted image generator 101 generates a predicted picture block predSamples for each of the blocks divided from this picture. The predicted image generator 101 reads a reference picture block from the reference picture memory 109, based on prediction parameters input from the prediction parameter coder 111. An example of the prediction parameters input from the prediction parameter coder 111 is a motion vector or a displacement vector. The predicted image generator 101 reads a reference picture block located at a position pointed by the motion vector or the displacement vector which has been predicted by using a coding prediction unit as a start point. The predicted image generator 101 generates predicted picture blocks predSamples for the read reference picture block by using one of the multiple prediction methods. The predicted image generator 101 outputs the generated predicted picture blocks predSamples to the subtractor 102 and the adder 106. The predicted image generator 101 is operated similarly to the above-described predicted image generator 308, and details of the generation of the predicted picture blocks predSamples will thus be omitted.

When selecting a prediction method, the predicted image generator 101 selects, for example, a prediction method which can minimize the error value indicating the difference between the signal value of each pixel forming a block included in a layer image and the signal value of the corresponding pixel forming a predicted picture block predSamples. The prediction method may be selected based on another factor.

If a picture to be coded is a base-view picture, the multiple prediction methods are intra prediction, motion prediction, and a merge mode. Motion prediction is, among the above-described inter prediction methods, a method for predicting a display time difference. The merge mode is a mode in which prediction is performed by using the same reference picture and the same prediction parameters as those of a coded block positioned within a predetermined range from a prediction unit. If a picture to be coded is a picture other than a base-view picture, the multiple prediction methods are intra prediction, motion prediction, a merge mode (including viewpoint synthesis prediction), and displacement prediction. Displacement prediction (disparity prediction) is, among the above-described inter prediction methods, prediction between different layer images (different viewpoints). Additional prediction (residual prediction and illumination compensation) may be performed on the result of displacement prediction (disparity prediction). Alternatively, such additional prediction may not be performed on the result of displacement prediction (disparity prediction).

When the predicted image generator 101 has selected intra prediction, it outputs the prediction mode PredMode, which indicates the intra prediction mode used for generating predicted picture blocks predSamples, to the prediction parameter coder 111.

When the predicted image generator 101 has selected motion prediction, it stores the motion vector mvLX used for generating predicted picture blocks predSamples in the prediction parameter memory 108, and also outputs the motion vector mvLX to the inter prediction parameter coder 112. The motion vector mvLX indicates a vector starting from the position of a coding prediction unit until the position of a reference picture block used for generating predicted picture blocks predSamples. Information indicating the motion vector mvLX may include information concerning the reference picture (a reference picture index refIdxLX and a picture order count POC, for example), and may indicate prediction parameters. The predicted image generator 101 also outputs the prediction mode PredMode indicating the inter prediction mode to the prediction parameter coder 111.

When the predicted image generator 101 has selected displacement prediction, it stores a displacement vector used for generating predicted picture blocks predSamples in the prediction parameter memory 108, and also outputs the displacement vector to the inter prediction parameter coder 112. The displacement vector dvLX indicates a vector starting from the position of a coding prediction unit until the position of a reference picture block used for generating predicted picture blocks predSamples. Information indicating the displacement vector dvLX may include information concerning the reference picture (a reference picture index refIdxLX and a view ID view id, for example), and may indicate prediction parameters. The predicted image generator 101 also outputs the prediction mode PredMode indicating the inter prediction mode to the prediction parameter coder 111.

When the predicted image generator 101 has selected the merge mode, it outputs the merge index merge_idx indicating the selected reference picture block to the inter prediction parameter coder 112. The predicted image generator 101 also outputs the prediction mode PredMode indicating the merge mode to the prediction parameter coder 111.

In the above-described merge mode, if the VSP mode flag VspModeFlag indicates that viewpoint synthesis prediction will be performed, the predicted image generator 101 performs viewpoint synthesis prediction by using the VSP predicting section 30374 included in the predicted image generator 101, as discussed above. In motion prediction, displacement prediction, or the merge mode, if the residual prediction flag resPredFlag indicates that residual prediction will be performed, the predicted image generator 101 performs residual prediction by using the residual predicting section 3092 included in the predicted image generator 101, as discussed above.

The subtractor 102 subtracts, for each pixel, the signal value of a predicted picture block predSamples input from the predicted image generator 101 from the signal value of a corresponding block of a layer image T which is input from the external source, thereby generating a residual signal. The subtractor 102 outputs the generated residual signal to the DCT-and-quantizing unit 103 and the coding parameter selector 110.

The DCT-and-quantizing unit 103 conducts DCT on the residual signal input from the subtractor 102 so as to calculate a DCT coefficient. The DCT-and-quantizing unit 103 then quantizes the calculated DCT coefficient to generate a quantized coefficient. The DCT-and-quantizing unit 103 then outputs the generated quantized coefficient to the variable-length coder 104 and the inverse-quantizing-and-inverse-DCT unit 105.

The variable-length coder 104 receives the quantized coefficient from the DCT-and-quantizing unit 103 and coding parameters from the coding parameter selector 110. Examples of the coding parameters are a reference picture index refIdxLX, a prediction vector flag mvp_LX_flag, a difference vector mvdLX, a prediction mode PredMode, a merge index merge_idx, a residual prediction index iv_res_pred_weight_idx, and an illumination compensation flag ic_flag.

The variable-length coder 104 performs entropy coding on the input quantized coefficient and coding parameters so as to generate a coded stream Te, and outputs the generated coded stream Te to the outside.

The inverse-quantizing-and-inverse-DCT unit 105 inverse-quantizes the quantized coefficient input from the DCT-and-quantizing unit 103 so as to find the DCT coefficient. The inverse-quantizing-and-inverse-DCT unit 105 then performs inverse DCT on the DCT coefficient so as to calculate a decoded residual signal. The inverse-quantizing-and-inverse-DCT unit 105 then outputs the calculated decoded residual signal to the adder 106 and the coding parameter selector 110.

The adder 106 adds, for each pixel, the signal value of a predicted picture block predSamples input from the predicted image generator 101 and the signal value of the decoded residual signal input from the inverse-quantizing-and-inverse-DCT unit 105 so as to generate a reference picture block. The adder 106 stores the generated reference picture block in the reference picture memory 109.

The prediction parameter memory 108 stores prediction parameters generated by the prediction parameter coder 111 at predetermined locations according to the picture and the block to be coded.

The reference picture memory 109 stores reference picture blocks generated by the adder 106 at predetermined locations according to the picture and the block to be coded.

The coding parameter selector 110 selects one of multiple sets of coding parameters. The coding parameters include the above-described prediction parameters and parameters to be coded, which are generated in relation to these prediction parameters. The predicted image generator 101 generates predicted picture blocks predSamples by using each of the coding parameters of the selected set.

The coding parameter selector 110 calculates the cost value indicating the amount of information and coding errors for each of the multiple sets of coding parameters. The cost value is a sum of the amount of coding and the value obtained by multiplying the squared errors by the coefficient $\lambda$. The amount of coding is the amount of information concerning the coded stream Te generated as a result of performing entropy coding on quantization errors and coding parameters. The squared errors indicate the sum of the squares of the residual values of the residual signals calculated by the subtractor 102 for the individual pixels. The coefficient $\lambda$ is a preset real number greater than zero. The coding parameter selector 110 selects a set of coding parameters for which the minimum cost value has been calculated. Then, the variable-length coder 104 outputs the selected set of coding parameters as the coded stream Te to the outside and does not output sets of coding parameters which have not been selected.

The prediction parameter coder 111 derives prediction parameters to be used for generating predicted pictures, based on parameters input from the predicted image generator 101, and codes the derived prediction parameters so as to generate sets of coding parameters. The prediction parameter coder 111 outputs the sets of coding parameters to the variable-length coder 104.

The prediction parameter coder 111 stores, among the generated sets of coding parameters, the prediction parameters corresponding to the set of coding parameters selected by the coding parameter selector 110 in the prediction parameter memory 108.

If the prediction mode PredMode input from the predicted image generator 101 indicates the inter prediction mode, the prediction parameter coder 111 operates the inter prediction parameter coder 112. If the prediction mode PredMode input from the predicted image generator 101 indicates the intra prediction mode, the prediction parameter coder 111 operates the intra prediction parameter coder 113.

The inter prediction parameter coder 112 derives inter prediction parameters, based on the prediction parameters input from the coding parameter selector 110. In terms of deriving inter prediction parameters, the inter prediction parameter coder 112 has the same configuration as that of the inter prediction parameter decoder 303. The configuration of the inter prediction parameter coder 112 will be described below.

The intra prediction parameter coder 113 sets the intra prediction mode IntraPredMode indicated by the prediction mode PredMode input from the coding parameter selector 110 as a set of inter prediction parameters.

(Configuration of Inter Prediction Parameter Coder)

Figure 23:
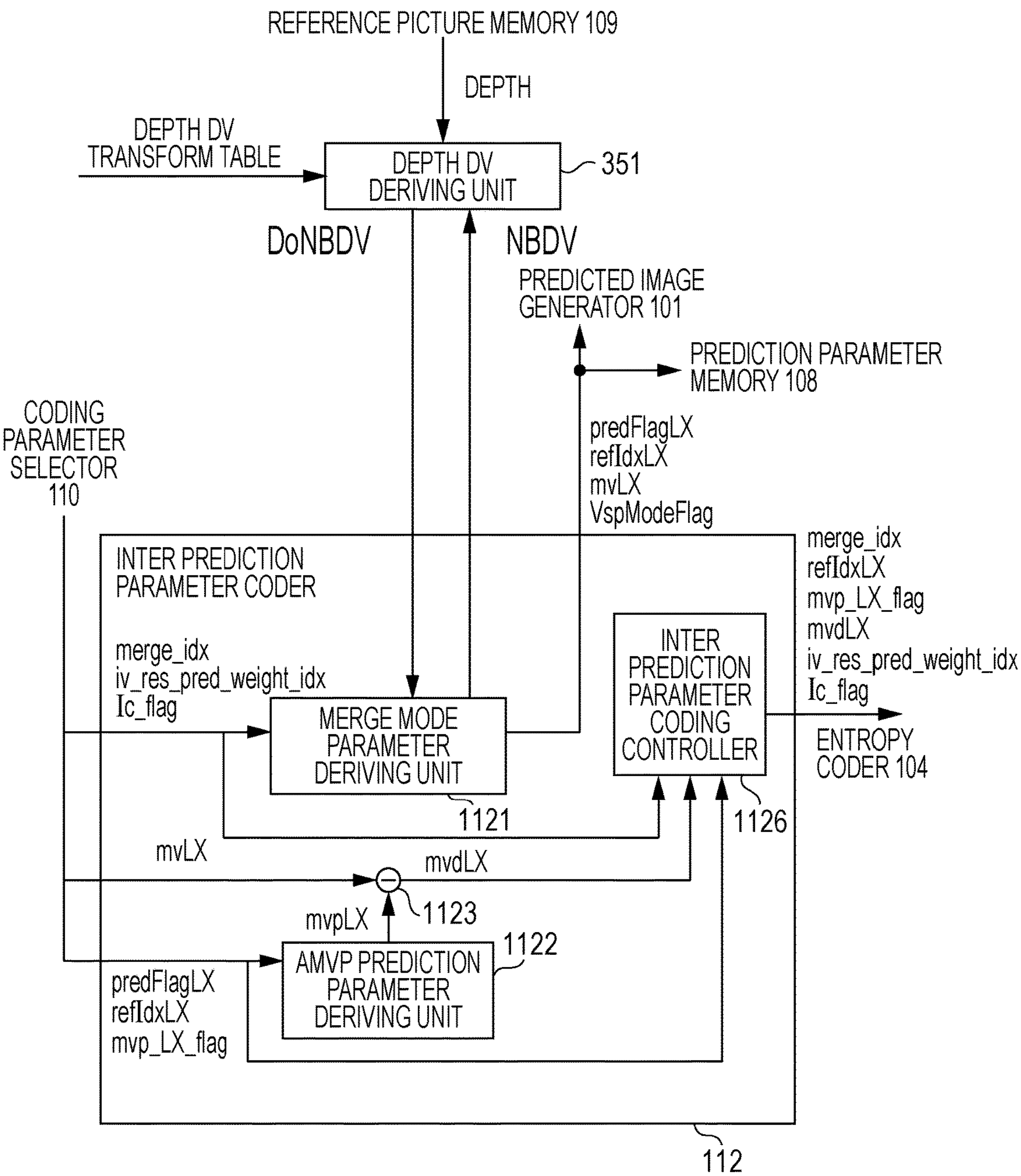
FIG. 23 is a schematic diagram illustrating the configuration of an inter prediction parameter coder 112 according to this embodiment.

The configuration of the inter prediction parameter coder 112 will now be described below. The inter prediction parameter coder 112 forms means corresponding to the inter prediction parameter decoder 303. FIG. 23 is a schematic diagram illustrating the configuration of the inter prediction parameter coder 112 according to this embodiment. The inter prediction parameter coder 112 includes a merge mode parameter deriving unit 1121, an AMVP prediction parameter deriving unit 1122, a subtractor 1123, and an inter prediction parameter coding controller 1126.

The configuration of the merge mode parameter deriving unit 1121 (prediction-vector deriving device) is similar to that of the above-described merge mode parameter deriving unit 3036 (see FIG. 9). The merge mode parameter deriving unit 1121 thus achieves the same advantages as those obtained by the merge mode parameter deriving unit 3036. More specifically, the merge mode parameter deriving unit 3036 is a merge mode parameter deriving unit including a merge candidate deriving section which derives, as base merge candidates, at least a spatial merge candidate, a temporal merge candidate, a combined merge candidate, and a zero merge candidate, and, as extended merge candidates, at least an inter-view merge candidate IV, a displacement merge candidate DI, and an inter-view shift merge candidate IVShift. The merge mode parameter deriving unit 3036 stores merge candidates in the merge candidate list in the order of a first group of extended merge candidates, a first group of base merge candidates, a second group of extended merge candidates, and a second group of base merge candidates.

The merge mode parameter deriving unit 1121 (prediction-vector deriving device) according to this embodiment derives the position (xRef, yRef) of a direct reference block from the position of a target block, a disparity vector mvDisp, and the size nPbW and nPbH of the target block, instead of deriving the position (xRef, yRef) of the reference block from a disparity vector modified by the size nPbW and nPb of the target block. Processing can thus be facilitated.

The configuration of the AMVP prediction parameter deriving unit 1122 is similar to that of the above-described AMVP prediction parameter deriving unit 3032.

The subtractor 1123 subtracts the prediction vector mvpLX input from the AMVP prediction parameter deriving unit 1122 from the vector mvLX input from the coding parameter selector 110 so as to generate a difference vector mvdLX. The difference vector mvdLX is output to the inter prediction parameter coding controller 1126.

The inter prediction parameter coding controller 1126 instructs the variable-length coder 104 to decode codes (syntax elements) related to inter prediction so as to code codes (syntax elements) to be included in the coded data, such as a partition mode part_mode, a merge_flag merge_flag, a merge index merge_idx, an inter prediction identifier inter_pred_idc, a reference picture index refIdxLX, a prediction vector flag mvp_LX_flag, and a difference vector mvdLX.

The inter prediction parameter coding controller 1126 includes a residual prediction index coder 10311, an illumination compensation flag coder 10312, a merge index coder, a vector candidate index coder, a partition mode coder, a merge_flag coder, an inter prediction identifier coder, a reference picture index coder, and a difference vector coder. The partition mode coder, the merge_flag coder, the merge index coder, the inter prediction identifier coder, the reference picture index coder, the vector candidate index coder, and the difference vector coder respectively code the partition mode part_mode, the merge_flag merge_flag, the merge index merge_idx, the inter prediction identifier inter_pred_idc, the reference picture index refIdxLX, the prediction vector flag mvp_LX_flag, and the difference vector mvdLX.

The residual prediction index coder 10311 codes the residual prediction index iv_res_pred_weight_idx to indicate whether residual prediction will be performed.

The illumination compensation flag coder 10312 codes the illumination compensation flag ic_flag to indicate whether illumination compensation will be performed.

If the prediction mode PredMode input from the predicted image generator 101 indicates the merge mode, the inter prediction parameter coding controller 1126 outputs the merge index merge_idx input from the coding parameter selector 110 to the variable-length coder 104 and causes the variable-length coder 104 to code the merge index merge_idx.

If the prediction mode PredMode input from the predicted image generator 101 indicates the inter prediction mode, the inter prediction parameter coding controller 1126 performs the following processing.

The inter prediction parameter coding controller 1126 integrates the reference picture index refIdxLX and the prediction vector flag mvp_LX_flag input from the coding parameter selector 110 and the difference vector mvdLX input from the subtractor 1123 with each other. The inter prediction parameter coding controller 1126 then outputs the integrated codes to the variable-length coder 104 and causes it to code the integrated codes.

The predicted image generator 101 forms means corresponding to the above-described predicted image generator 308. For generating a predicted image from prediction parameters, processing performed by the predicted image generator 101 is the same as that by the predicted image generator 308.

In this embodiment, as in the predicted image generator 308, the predicated image generator 101 also includes the above-described residual synthesizer 30923. That is, if the size of a target block (prediction block) is equal to or smaller than a predetermined size, the predicated image generator 101 does not perform residual prediction. The predicated image generator 101 of this embodiment performs residual prediction only when the partition mode part_mode of a coding unit CU is 2N×2N. That is, the predicated image generator 101 sets the residual prediction index iv_res_pred_ weight_idx to be 0. The residual prediction index coder 10311 of this embodiment codes the residual prediction index iv_res_pred_weight_idx only when partition mode part_mode of a coding unit CU is 2N×2N.

In the image coding apparatus including the residual predicting section 3092, the residual prediction index coder codes the residual prediction index only when the partition mode of a coding unit including a target block is 2N×2N. Otherwise, the residual prediction index coder does not code the residual prediction index. That is, the residual predicting section 3092 performs residual prediction when the residual prediction index is other than 0.

In the image coding apparatus 11 of this embodiment, when coding syntax elements in a parameter set corresponding to each of the values of 0 to 1 of a loop coefficient d, the variable-length coder 104 codes the present_flag 3d_sps_param_present_flag[k] indicating whether the syntax set corresponding to each value of the loop variable d is present in the above-described parameters. If the present flag 3d_sps_param_present_flag[k] is 1, the variable-length coder 104 codes the syntax set corresponding to the loop variable d. This makes it possible to independently turn ON or OFF a tool used for texture pictures by using the present flag 3d_sps_param_present_flag[0] and turn ON or OFF a tool used for texture pictures by using the present_flag 3d_sps_param_present_flag[1]. With the above-described configuration, when the same parameter set is not used for texture pictures and depth pictures, but a texture parameter set is used for texture pictures and a depth parameter set is used for depth pictures, parameters used only for texture pictures or parameters used only for depth pictures can be decoded.

The present invention may be described as follows.

<Aspect 1>

A prediction-vector deriving device, wherein:

coordinates of a reference block of an inter-view merge candidate IV are derived from a sum of top-left coordinates of a target block, half a size of the target block, and a disparity vector of the target block which is converted into an integer precision, a value of the sum being normalized to a multiple of 8 or a multiple of 16;

coordinates of a reference block of an inter-view shift merge candidate IVShift are derived from a sum of top-left coordinates of a target block, a size of the target block, a predetermined constant of K, and a disparity vector of the target block which is converted into an integer precision, a value of the sum being normalized to a multiple of 8 or a multiple of 16; and from motion vectors positioned at the derived coordinates of the reference blocks, a motion vector of the inter-view merge candidate IV and a motion vector of the inter-view shift merge candidate IVShift are derived.

<Aspect 2>

The prediction-vector deriving device according to Aspect 1, wherein, assuming that a horizontal direction of the disparity vector of the target block is mvDisp[0] and that a vertical direction of the disparity vector is mvDisp[1], the horizontal direction and the vertical direction of the disparity vector of the target block which are converted into the integer precision are derived from (mvDisp[0]+2)>>2 and (mvDisp[1]+2)>>2, respectively.

<Aspect 3>

The prediction-vector deriving device according to Aspect 2, wherein, assuming that the top-left coordinates of the target block are (xPb, yPb) and that the size of the target block is (nPbW and nPbH), the coordinates (xRefIV, yRefIV) of the reference block of the inter-view merge candidate IV are derived from:

xRefIVFull=xPb+(nPbW>>1)+((mvDisp[0]+2)>>2)

yRefIVFull=yPb+(nPbH>>1)+((mvDisp[1]+2)>>2)

xRefIV=Clip3(0,PicWidthInSamplesL−1,(xRefIVFull>>3)<<3)

yRefIV=Clip3(0,PicHeightInSamplesL−1,(yRefIVFull>>3)<<3), and the coordinates (xRefIVShift, yRefIVShift) of the reference block of the inter-view shift merge candidate IVShift are derived by using the predetermined constant K from:

xRefIVShiftFull=xPb+(nPbW+K)+((mvDisp[0]+2)>>2)

yRefIVShiftFull=yPb+(nPbH+K)+((mvDisp[1]+2)>>2)

xRefIVShift=Clip3(0,PicWidthInSamplesL−1,(xRefIVShiftFull>>3)<<3)

yRefIVShift=Clip3(0,PicHeightInSamplesL−1,(yRefIVShiftFull>>3)<<3).

<Aspect 4>

The prediction-vector deriving device according to Aspect 3, wherein, by using a variable offsetFlag which becomes 1 in a case of an inter-view shift merge candidate (IVShift) and which becomes 0 in the other cases, the cooridnates (xRefIV, yRefIV) of the reference block and the coordinates (xRef, yRef) of the reference block of the inter-view merge candidate IV and the coordinates (xRef, yRef) of the reference block of the inter-view shift merge candidate IVShift are derived by using the predetermined constant K from:

xRefFull=xPb+(offsetFlag?(nPbW+K):(nPbW>>1)+((mvDisp[0]+2)>>2))

yRefFull=yPb+(offsetFlag?(nPbH+K):(nPbH>>1)+((mvDisp[1]+2)>>2))

xRef=Clip3(0,PicWidthInSamplesL−1,(xRefFull>>3)<<3)

yRef=Clip3(0,PicHeightInSamplesL−1,(yRefFull>>3)<<3).

<Aspect 5>

The prediction-vector deriving device according to one of Aspects 1 to 4, wherein, if the coordinates of the reference block are restricted to be a multiple of M, the predetermined constant K is M−8 to M−1.

<Aspect 6>

The prediction-vector deriving device according to Aspect 5, wherein the predetermined constant K is one of 1, 2, and 3.

<Aspect 7>

An image decoding apparatus including the prediction-vector deriving device according to one of Aspect 1 to Claim 6.

<Aspect 8>

An image coding apparatus including the prediction-vector deriving device according to one of Aspects 1 to 6.

<Aspect 9>

An image decoding apparatus for decoding a syntax set in a parameter set corresponding to each value of a loop coefficient d, wherein the image decoding apparatus decodes a present_flag 3d_sps_param_present_flag[k] indicating whether a syntax set corresponding to each value of the loop variable d is present in the parameters, and if the present flag 3d_sps_param_present_flag[k] is 1, the image decoding apparatus decodes the syntax set corresponding to the loop variable d.

<Aspect 10>

The image decoding apparatus according to Aspect 9, wherein the image decoding apparatus decodes a syntax set indicating whether a tool is ON or OFF.

<Aspect 11>

The image decoding apparatus according to Aspect 9 or 10, wherein the image decoding apparatus decodes at least a VY viewpoint synthesis prediction flag view_synthesis_pred_flag if d is 0, and decodes at least an intra SDC wedge segmentation flag intra_sdc_wedge_flag if d is 1.

<Aspect 12>

An image decoding apparatus including:

a variable-length decoder that decodes IntraSdcWedgeFlag, IntraContourFlag, dim_not_present_flag, and depth_intra_mode_flag; and a DMM predicting section that performs DMM prediction, wherein, if dim_not_present_flag is 0, and if IntraSdcWedgeFlag is 1, and if IntraContourFlag is 1, the variable-length decoder decodes depth_intra_mode_flag from coded data, and if depth_intra_mode_flag is not included in the coded data, the variable-length decoder derives depth_intra_mode_flag by performing logical operation between IntraSdcWedgeFlag and IntraContourFlag.

<Aspect 13>

The image decoding apparatus according to Aspect 12, wherein, if depth_intra_mode_flag is not included in the coded data, the variable-length decoder derives depth_intra_mode_flag by performing logical operation of !IntraSdcWedgeFlag||IntraContourFlag.

<Aspect 14>

An image decoding apparatus including:

a variable-length decoder that decodes IntraSdcWedgeFlag, IntraContourFlag, dim_not_present_flag, and depth_intra_mode_flag; and a DMM predicting section that performs DMM prediction, wherein, if dim_not_present_flag is 0, and if IntraSdcWedgeFlag is 1, and if IntraContourFlag is 1, the variable-length decoder decodes depth_intra_mode_flag from coded data, and derives DepthIntraMode according to a logical equation concerning dim_not_present_flag, IntraContourFlag, and IntraSdcWedgeFlag and from dim_not_present_flag.

<Aspect 15>

The image decoding apparatus according to Aspect 14, wherein the variable-length decoder derives DepthIntraMode from an equation of DepthIntraMode=dim_not_present_flag[x0] [y0]?−1: (IntraContourFlag && IntraSdcWedgeFlag? depth_intra_mode_flag: (!IntraSdcWedgeFlag||IntraContourFlag).

<Aspect 16>

An image decoding apparatus including:

a receiver that receives a sequence parameter set (SPS) and coded data, the sequence parameter set (SPS) at least including a first flag indicating whether an intra contour mode will be used and a second flag indicating whether an intra wedge mode will be used, the coded data at least including a third flag indicating whether one of the intra contour mode and the intra wedge mode will be used for a prediction unit;

a decoder that decodes at least one of the first flag, the second flag, and the third flag; and a predicting section that performs prediction by using a fourth flag which specifies one of the intra contour mode and the intra wedge mode, wherein if a value of the first flag is 1, and if a value of the second flag is 1, and if a value of the third flag indicates that one of the intra contour mode and the intra wedge mode will be used for a prediction unit, the decoder decodes the fourth flag from the coded data, and if the fourth flag is not included in the coded data, the fourth flag is derived from logical operation between the first flag and the second flag.

<Aspect 17>

The image decoding apparatus according to Aspect 16, wherein the first flag is IntraContourFlag, the second flag is IntraSdcWedgeFlag, the third flag is dim_not_present_flag, and the fourth flag is depth_intra_mode_flag.

<Aspect 18>

The image decoding apparatus according to Aspect 17, wherein the depth_intra_mode_flag is derived from:

depth_intra_mode_flag[x0][y0]=
(!IntraSdcWedgeFlag||IntraContourFlag).

<Aspect 19>

An image decoding method including at least:

a step of receiving a sequence parameter set (SPS) and coded data, the sequence parameter set (SPS) at least including a first flag indicating whether an intra contour mode will be used and a second flag indicating whether an intra wedge mode will be used, the coded data at least including a third flag indicating whether one of the intra contour mode and the intra wedge mode will be used for a prediction unit;

a step of decoding at least one of the first flag, the second flag, and the third flag; and a step of performing prediction by using a fourth flag which specifies one of the intra contour mode and the intra wedge mode, wherein if a value of the first flag is 1, and if a value of the second flag is 1, and if a value of the third flag indicates that one of the intra contour mode and the intra wedge mode will be used for a prediction unit, the step of decoding decodes the fourth flag from the coded data, and if the fourth flag is not included in the coded data, the fourth flag is derived from logical operation between the first flag and the second flag.

<Aspect 20>

An image coding apparatus including:

a receiver that receives a sequence parameter set (SPS) and coded data, the sequence parameter set (SPS) at least including a first flag indicating whether an intra contour mode will be used and a second flag indicating whether an intra wedge mode will be used, the coded data at least including a third flag indicating whether one of the intra contour mode and the intra wedge mode will be used for a prediction unit;

a decoder that decodes at least one of the first flag, the second flag, and the third flag; and a predicting section that performs prediction by using a fourth flag which specifies one of the intra contour mode and the intra wedge mode, wherein if a value of the first flag is 1, and if a value of the second flag is 1, and if a value of the third flag indicates that one of the intra contour mode and the intra wedge mode will be used for a prediction unit, the decoder decodes the fourth flag from the coded data, and if the fourth flag is not included in the coded data, the fourth flag is derived from logical operation between the first flag and the second flag.

Some of the functions of the image coding apparatus 11 and the image decoding apparatus 31 in the above-described embodiment, such as the variable-length decoder 301, the prediction parameter decoder 302, the predicted image generator 101, the DCT-and-quantizing unit 103, the variable-length coder 104, the inverse-quantizing-and-inverse-DCT unit 105, the coding parameter selector 110, the prediction parameter coder 111, the variable-length decoder 301, the prediction parameter decoder 302, the predicted image generator 308, and the inverse-quantizing-and-inverse-DCT unit 311, may be implemented by using a computer. In this case, these functions may be implemented in the following manner. A program for implementing these control functions is recorded on a computer-readable recording medium, and the program recorded on the recording medium is read into a computer system and be executed. "Computer system" is a computer system built in one of the image coding apparatus 11 and the image decoding apparatus 31, and includes an OS and hardware such as peripheral devices. Examples of "a computer-readable recording medium" are portable media such as a flexible disk, a magneto-optical disk, a ROM, and a CD-ROM, and storage devices such as a hard disk built in the computer system. Other examples of "a computer-readable recording medium" may be a medium which dynamically stores the program for a short period of time, for example, communication lines used for transmitting the program via a network such as the Internet or a communication circuit such as telephone lines, and a storage for storing the program for a certain period of time, for example, a volatile memory within a computer system of a server or a client. This program may be a program for implementing some of the above-described functions, or a program for implementing the above-described functions in combination with a program which has already been recorded on the computer system.

Some or all of the functions of the image coding apparatus 11 and the image decoding apparatus 31 in the above-described embodiment may be implemented as an integrated circuit, such as a LSI (Large Scale Integration). The functional blocks of the image coding apparatus 11 and the image decoding apparatus 31 may be individually formed into processors. Alternatively, some or all of the functional blocks may be integrated and formed into a processor. Some or all of the functional blocks may be integrated by using a dedicated circuit or a general-purpose processor, instead of using a LSI. Moreover, due to the progress of semiconductor technologies, if a circuit integration technology which replaces the LSI technology is developed, an integrated circuit formed by such a technology may be used.

While the present invention has been described in detail through illustration of an embodiment with reference to the drawings, it is to be understood that specific configurations are not limited to the disclosed embodiment, and various design changes, for example, may be made without departing from the spirit of this invention.

INDUSTRIAL APPLICABILITY

The present invention can be suitably applied to an image decoding apparatus for decoding coded data generated by coding image data and to an image coding apparatus for generating coded data by coding image data. The present invention can also be suitably applied to a data structure of coded data generated by the image coding apparatus and referred to by the image decoding apparatus.

REFERENCE SIGNS LIST

1 image transmission system
11 image coding apparatus
101 predicted image generator
102 subtractor
103 a DCT-and-quantizing unit
10311 residual prediction index coder
10312 illumination compensation flag coder
104 variable-length coder
105 inverse-quantizing-and-inverse-DCT unit
106 adder
108 prediction parameter memory (frame memory)
109 reference picture memory (frame memory)
110 coding parameter selector
111 prediction parameter coder
112 inter prediction parameter coder
1121 merge mode parameter deriving unit
1122 AMVP prediction parameter deriving unit
1123 subtractor
1126 inter prediction parameter coding controller
113 intra prediction parameter coder
141 prediction unit setter
142 reference pixel setter
143 switch
145 predicted-image deriving unit
145D DC predicting section
145P planar predicting section
145A angular predicting section
145T DMM predicting section
145T1 DC predicted-image deriving section
145T2 DMM1 wedgelet pattern deriving section
145T3 DMM4 contour pattern deriving section
145T4 wedgelet pattern table generator
145T5 buffer
145T6 DMM1 wedgelet pattern table deriving section
21 network
31 image decoding apparatus
301 variable-length decoder
302 prediction parameter decoder
303 inter prediction parameter decoder
3031 inter prediction parameter decoding controller
3032 AMVP prediction parameter deriving unit
3036 merge mode parameter deriving unit (merge mode parameter deriving device, prediction-vector deriving device)
30361 merge candidate deriving section
303611 merge candidate storage
30362 merge candidate selector
30370 extended merge candidate deriving section
30371 inter-layer merge candidate deriving section (inter-view merge candidate deriving section)
30373 displacement merge candidate deriving section
30374 VSP merge candidate deriving section (VSP predicting section, viewpoint synthesis predicting means, partitioning section, depth vector deriving section)
30380 base merge candidate deriving section
30381 spatial merge candidate deriving section
30382 temporal merge candidate deriving section
30383 combined merge candidate deriving section
30384 zero merge candidate deriving section
304 intra prediction parameter decoder
306 reference picture memory (frame memory)
307 prediction parameter memory (frame memory)
308 predicted image generator
309 inter predicted image generator
3091 motion-displacement compensator
3092 residual predicting section
30922 reference image interpolator
30923 residual synthesizer
30924 residual-predicting-vector deriving section
3093 illumination compensator
3096 weighted-predicting section
310 intra predicted image generator
311 inverse-quantizing-and-inverse-DCT unit
312 adder
351 depth DV deriving unit
352 displacement vector deriving section
353 split flag deriving section
41 image display apparatus

The invention claimed is:

1. An image decoding apparatus comprising:

a receiver that receives a sequence parameter set and coded data, wherein the sequence parameter set (SPS) at least includes a first flag indicating whether an intra contour mode will be used and a second flag indicating whether an intra wedge mode will be used and the coded data at least includes a third flag indicating whether one of the intra contour mode and the intra wedge mode will be used for a prediction unit;

a decoder that decodes at least one of the first flag, the second flag, and the third flag; and a predicting section that performs prediction by using a fourth flag which specifies one of the intra contour mode and the intra wedge mode, wherein if a value of the first flag is 1, and if a value of the second flag is 1, and if a value of the third flag indicates that one of the intra contour mode and the intra wedge mode will be used for the prediction unit, the decoder decodes the fourth flag from the coded data, and if the fourth flag is not included in the coded data, the fourth flag is derived from logical operation between the first flag and the second flag.

2. The image decoding apparatus according to claim 1, wherein the first flag is IntraContourFlag, the second flag is IntraSdcWedgeFlag, the third flag is dim_not_present_flag, and the fourth flag is depth_intra_mode_flag.

3. The image decoding apparatus according to claim 2, wherein the depth_intra_mode_flag is derived from:

depth_intra_mode_flag[x0][y0]=(!IntraSdcWedgeFlag||IntraContourFlag).

4. An image decoding method comprising at least:

a step of receiving a sequence parameter set and coded data, wherein the sequence parameter set at least includes a first flag indicating whether an intra contour mode will be used and a second flag indicating whether an intra wedge mode will be used, and the coded data at least includes a third flag indicating whether one of the intra contour mode and the intra wedge mode will be used for a prediction unit;

a step of decoding at least one of the first flag, the second flag, and the third flag; and a step of performing prediction by using a fourth flag which specifies one of the intra contour mode and the intra wedge mode, wherein if a value of the first flag is 1, and if a value of the second flag is 1, and if a value of the third flag indicates that one of the intra contour mode and the intra wedge mode will be used for the prediction unit, the step of decoding decodes the fourth flag from the coded data, and if the fourth flag is not included in the coded data, the fourth flag is derived from logical operation between the first flag and the second flag.

5. An image encoding apparatus comprising:

a receiver that receives a sequence parameter set and image data, wherein the sequence parameter set at least includes a first flag indicating whether an intra contour mode will be used and a second flag indicating whether an intra wedge mode will be used, and the image data at least includes a third flag indicating whether one of the intra contour mode and the intra wedge mode will be used for a prediction unit;

an encoder that encodes at least one of the first flag, the second flag, and the third flag; and a predicting section that performs prediction by using a fourth flag which specifies one of the intra contour mode and the intra wedge mode, wherein if a value of the first flag is 1, and if a value of the second flag is 1, and if a value of the third flag indicates that one of the intra contour mode and the intra wedge mode will be used for the prediction unit, the encoder encodes the fourth flag from the image data, and if the fourth flag is not included in the image data, the fourth flag is derived from logical operation between the first flag and the second flag.

* * * * *